United States Patent [19]

Usui et al.

[11] Patent Number: 5,583,700
[45] Date of Patent: Dec. 10, 1996

[54] ZOOM LENS

[75] Inventors: Fumiaki Usui; Kunio Takeshi; Jun Hosoya; Chiaki Terasawa, all of Kanagawa-ken, Japan

[73] Assignee: Canon Kabushiki Kaisha, Tokyo, Japan

[21] Appl. No.: 189,651

[22] Filed: Feb. 1, 1994

[30] Foreign Application Priority Data

Mar. 31, 1993 [JP] Japan ..................................... 5-098935

[51] Int. Cl.$^6$ ...................................................... G02B 15/14
[52] U.S. Cl. ............................................. 359/688; 359/683
[58] Field of Search ....................................... 359/683, 688

[56] References Cited

U.S. PATENT DOCUMENTS 4,634,237  1/1987  Aono et al. .............................. 359/688

FOREIGN PATENT DOCUMENTS 51-14034   4/1976  Japan .
54-127322  3/1979  Japan .............................. G02B 15/16

*Primary Examiner*—Georgia Y. Epps
*Assistant Examiner*—Jordan M. Schwartz
*Attorney, Agent, or Firm*—Fitzpatrick, Cella, Harper & Scinto

[57] ABSTRACT

A high range zoom lens is disclosed, comprising, from front to rear, a first lens unit of positive refractive power, a second lens unit of negative refractive power, a third lens unit of positive or negative refractive power and a fourth lens unit of positive refractive power, the second and third lens units being movable for zooming, wherein an aspheric surface is introduced into the second or third lens unit at a specified location so that the variation of aberrations with zooming is as far reduced for high performance as possible.

4 Claims, 45 Drawing Sheets f = 9.5
F$_{NO}$/1.7
e-LINE
-0.40   0.40
SPHERICAL ABERRATION

ω = 30.1°
ΔM  ΔS
-0.40   0.40
ASTIGMATISM

ω = 30.1°
-10.00   10.00
DISTORTION(%)

f = 15.2
F$_{NO}$/1.7
e-LINE
-0.40   0.40
SPHERICAL ABERRATION

ω = 19.9°
ΔM  ΔS
-0.40   0.40
ASTIGMATISM

ω = 19.9°
-10.00   10.00
DISTORTION(%)

SPHERICAL ABERRATION

ASTIGMATISM

DISTORTION(%)

SPHERICAL ABERRATION

ASTIGMATISM

DISTORTION(%)

SPHERICAL ABERRATION

ASTIGMATISM

DISTORTION(%)

SPHERICAL ABERRATION

ASTIGMATISM

DISTORTION(%)

SPHERICAL ABERRATION

ASTIGMATISM

DISTORTION(%)

SPHERICAL ABERRATION

ASTIGMATISM

DISTORTION(%)

SPHERICAL ABERRATION

ASTIGMATISM

DISTORTION(%)

SPHERICAL ABERRATION

ASTIGMATISM

DISTORTION(%)

SPHERICAL ABERRATION

ASTIGMATISM

DISTORTION (%)

SPHERICAL ABERRATION

ASTIGMATISM

DISTORTION (%)

SPHERICAL ABERRATION

ASTIGMATISM

DISTORTION (%)

SPHERICAL ABERRATION

ASTIGMATISM

DISTORTION (%)

SPHERICAL ABERRATION

ASTIGMATISM

DISTORTION(%)

SPHERICAL ABERRATION

ASTIGMATISM

DISTORTION(%)

f = 16.0
Fno /1.8 e-LINE

SPHERICAL ABERRATION

ω = 19.0°

ΔM   ΔS

ASTIGMATISM

ω = 19.0°

DISTORTION(%)

f = 31.62
Fno /1.8 e-LINE

SPHERICAL ABERRATION

ω = 9.9°

ΔS   ΔM

ASTIGMATISM

ω = 9.9°

DISTORTION(%)

SPHERICAL ABERRATION

ASTIGMATISM

DISTORTION(%)

SPHERICAL ABERRATION

ASTIGMATISM

DISTORTION(%)

SPHERICAL ABERRATION

ASTIGMATISM

DISTORTION (%)

SPHERICAL ABERRATION

ASTIGMATISM

DISTORTION (%)

f = 30.04
F$_{NO}$/1.7
e-LINE
SPHERICAL ABERRATION

ω = 10.4°
ΔS
ΔM
ASTIGMATISM

ω = 10.4°
DISTORTION(%)

f = 57.95
F$_{NO}$/1.7
e-LINE
SPHERICAL ABERRATION

ω = 5.4°
ΔS
ΔM
ASTIGMATISM

ω = 5.4°
DISTORTION(%)

f = 104.5
F$_{NO}$/1.7 e-LINE

-0.40    0.40
SPHERICAL ABERRATION

ω = 3.0°

ΔM    ΔS

-0.40    0.40
ASTIGMATISM

ω = 3.0°

-10.00    10.00
DISTORTION(%)

f = 10.0
F$_{NO}$/1.7 e-LINE

-0.40    0.40
SPHERICAL ABERRATION

ω = 28.8°

ΔS

ΔM

-0.40    0.40
ASTIGMATISM

ω = 28.8°

-10.00    10.00
DISTORTION(%)

SPHERICAL ABERRATION

ASTIGMATISM

DISTORTION(%)

SPHERICAL ABERRATION

ASTIGMATISM

DISTORTION(%)

f=61.0
Fno/1.7
e-LINE
SPHERICAL ABERRATION

ω=5.2°
ΔS
ΔM
ASTIGMATISM

ω=5.2°
DISTORTION(%)

f=110.0
Fno/1.7
e-LINE
SPHERICAL ABERRATION

ω=2.9°
ΔS
ΔM
ASTIGMATISM

ω=2.9°
DISTORTION(%)

SPHERICAL ABERRATION

ASTIGMATISM

DISTORTION (%)

SPHERICAL ABERRATION

ASTIGMATISM

DISTORTION (%)

f = 40.0
F_NO /1.8 e-LINE

-0.40    0.40

SPHERICAL ABERRATION

ω = 7.8°

ΔS
ΔM

-0.40    0.40

ASTIGMATISM

ω = 7.8°

-10.00    10.00

DISTORTION(%)

f = 90.0
F_NO /1.8 e-LINE

-0.40    0.40

SPHERICAL ABERRATION

ω = 3.5°

ΔS
ΔM

-0.40    0.40

ASTIGMATISM

ω = 3.5°

-10.00    10.00

DISTORTION(%)

SPHERICAL ABERRATION

ASTIGMATISM

DISTORTION (%)

SPHERICAL ABERRATION

ASTIGMATISM

DISTORTION (%)

f = 16.0
Fno/1.8
e-LINE

SPHERICAL ABERRATION

ω = 19.0°
ΔS
ΔM

ASTIGMATISM

ω = 19.0°

DISTORTION(%)

f = 40.0
Fno/1.8
e-LINE

SPHERICAL ABERRATION

ω = 7.8°
ΔS
ΔM

ASTIGMATISM

ω = 7.8°

DISTORTION(%)

f = 90.0
F_NO/1.8
e-LINE

-0.40   0.40

SPHERICAL ABERRATION

ω = 3.5°
ΔS   ΔM

-0.40   0.40

ASTIGMATISM

ω = 3.5°

-10.00   10.00

DISTORTION (%)

f = 170.0
F_NO/1.8
e-LINE

-0.40   0.40

SPHERICAL ABERRATION

ω = 1.9°
ΔS   ΔM

-0.40   0.40

ASTIGMATISM

ω = 1.9°

-10.00   10.00

DISTORTION (%)

fw
(WIDE-ANGLE END)

fd
$(= ft \times \frac{F_{NO.} \text{ AT WIDE-ANGLE END}}{F_{NO.} \text{ AT TELEPHOTO END}})$ ft
(TELEPHOTO END)

fw
(WIDE-ANGLE END)

ft'
($=fw \times Z^{3/4}$)

ft
(TELEPHOTO END)

SPHERICAL ABERRATION

ASTIGMATISM

DISTORTION(%)

SPHERICAL ABERRATION

ASTIGMATISM

DISTORTION(%)

SPHERICAL ABERRATION

ASTIGMATISM

DISTORTION(%)

SPHERICAL ABERRATION

ASTIGMATISM

DISTORTION(%)

f=223.46
Fno/2.2
d-LINE
g-LINE
-0.40  0.40
SPHERICAL ABERRATION

ω=2.1°
ΔS
ΔM
-0.40  0.40
ASTIGMATISM

ω=2.1°
-10.00  10.00
DISTORTION (%)

f=12.5
Fno/1.6
d-LINE
g-LINE
-0.40  0.40
SPHERICAL ABERRATION

ω=32.6°
ΔS
ΔM
-0.40  0.40
ASTIGMATISM

ω=32.6°
-10.00  10.00
DISTORTION (%)

f = 22.0
F_NO /1.6
d-LINE
g-LINE
-0.40   0.40
SPHERICAL ABERRATION

ω = 20.0°
ΔS
ΔM
-0.40   0.40
ASTIGMATISM

ω = 20.0°
-10.00   10.00
DISTORTION(%)

f = 45.3
F_NO /1.6
g-LINE
d-LINE
-0.40   0.40
SPHERICAL ABERRATION

ω = 10.0°
ΔS
ΔM
-0.40   0.40
ASTIGMATISM

ω = 10.0°
-10.00   10.00
DISTORTION(%)

FIG.26(D)-1 FIG.26(D)-2 FIG.26(D)-3
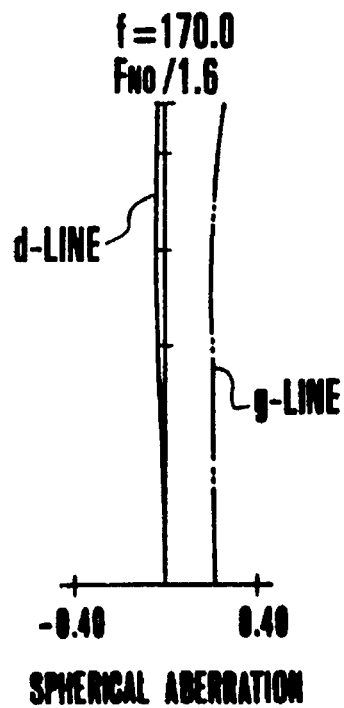 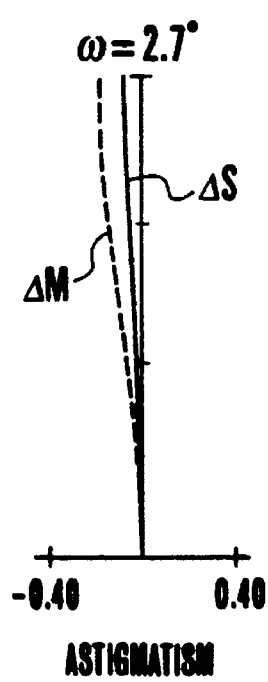 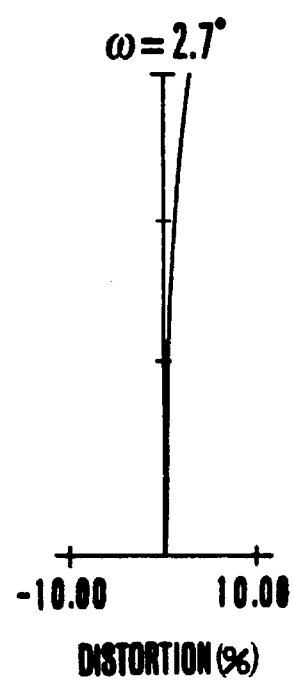
FIG.26(E)-1 FIG.26(E)-2 FIG.26(E)-3
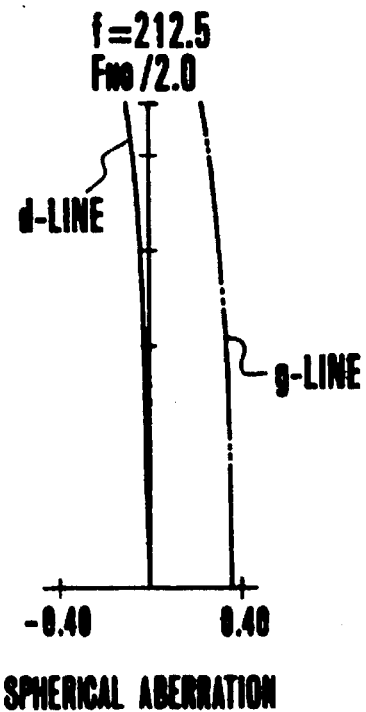 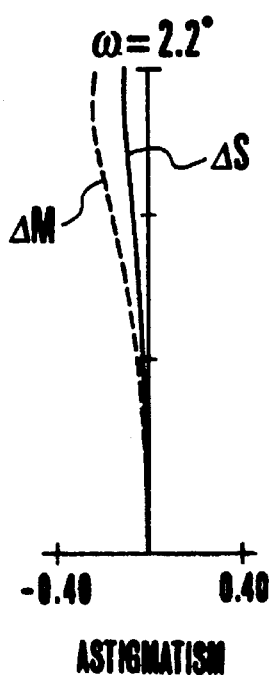 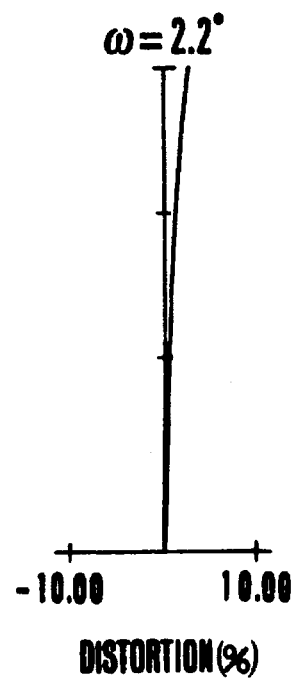

SPHERICAL ABERRATION

ASTIGMATISM

DISTORTION (%)

SPHERICAL ABERRATION

ASTIGMATISM

DISTORTION (%)

SPHERICAL ABERRATION

ASTIGMATISM

DISTORTION(%)

SPHERICAL ABERRATION

ASTIGMATISM

DISTORTION(%)

SPHERICAL ABERRATION

ASTIGMATISM

DISTORTION(%)

VARIATION OF SPHERICAL
ABERRATION FOR PARAXIAL
IMAGE PLANE

VARIATION OF SPHERICAL
ABERRATION FOR PARAXIAL
IMAGE PLANE
( AFTER INTRODUCTION
OF ASPHERIC SURFACE )

f = 12.2 f(fM) = 162.21 f = 223.46

SPHERICAL ABERRATION

ASTIGMATISM

DISTORTION (%)

SPHERICAL ABERRATION

ASTIGMATISM

DISTORTION (%)

SPHERICAL ABERRATION

ASTIGMATISM

DISTORTION(%)

SPHERICAL ABERRATION

ASTIGMATISM

DISTORTION(%)

SPHERICAL ABERRATION

ASTIGMATISM

DISTORTION (%)

ZOOM LENS

BACKGROUND OF THE INVENTION

1. Field of the Invention:

This invention relates to zoom lenses and, more particularly, to zoom lenses using an aspheric surface in the lens system at an appropriate location to get as large a relative aperture as 1.7 in F-number for the wide-angle end with as high a zoom ratio as 10 to 25, while still maintaining good optical performance throughout the entire zooming range, and suited to television cameras, photographic cameras, or video cameras.

2. Description of the Related Art:

In the field of art of television cameras, photographic cameras, or video cameras, there has been a growing demand for zoom lenses of large relative aperture and high range with good optical performance.

Of these, especially the color television camera for broadcasting has to be quick and easy in handling and good in manageability, which are regarded as important. To meet such requirements, even the image pickup devices in recent years are taking a smaller size of CCD (solid-state image sensor) such as ⅔, or ½ inch ones in the main stream.

This CCD has its resolution almost uniform over the entire area of the image frame. To ensure that a zoom lens is usable with this CCD, therefore, the resolving power of the zoom lens must be uniform from the central to the marginal zone of the full aperture.

For this purpose, of all aberrations, for example, astigmatism, distortion and lateral chromatic aberration are necessarily subjected to good correction for high optical performance over the entire area of the image frame. It is further desired that the zoom ratio is high, while the size and the weight are nonetheless small and light. In addition, the back focal distance is so long that a color separating system and various filters can be put in front of the image pickup device.

The zoom lens of the type comprising, from front to rear, a focusing or first lens unit of positive refractive power, a second lens unit of negative power for varying the focal length, a third lens unit of positive or negative refractive power for compensating for the image shift with zooming and a fourth lens unit of positive refractive power for forming an image, or the so-called 4-unit zoom lens, has found its use in many color television cameras for broadcasting, since it is comparatively easy to increase the zoom ratio and the relative aperture.

Of the 4-unit zoom lenses, a large relative aperture, high range one of 1.6 to 1.8 in F-number whose range is 20 is proposed in, for example, Japanese Laid-Open Patent Applications No. Sho 54-127322 and No. Sho 51-14034.

Given a zoom lens of large relative aperture (F-number: 1.6–1.8) and high range (zoom ratio: 10–40), to include high optical performance over the entire zooming range, there is need to set forth proper design rules for the refractive power of each lens unit and for the construction and arrangement of the constituent lenses.

In general, to maintain good stability of aberration correction for the high optical performance throughout the entire zooming range, it becomes necessary to increase the degree of freedom on the aberration correction by, for example, increasing the number of lens elements in each lens unit.

For this reason, if it is attempted to get the large relative aperture, high range zoom lens, the total number of constituent lenses would unavoidably increase and a problem would arise in that the size of the entire system comes to increase largely.

In respect to the imaging performance, as one sees the central zone of the full aperture which gives best contrast to the image, or the so-called best image focus, variation of it with zooming comes to be a problem. This is ascribable mainly to the variation of spherical aberration with zooming.

The variation with zooming of spherical aberration in general is shown in FIG. 17, where letting the zoom ratio be denoted by Z and the shortest focal length by fw, the spherical aberration increases in the minus direction, or, its under-correction for the Gauss image plane grows, as zooming goes from the wide-angle end, where the spherical aberration is zero, to a position for a focal length $fw'=fw \times Z^{1/4}$. After having left that zooming position, the amount of under-correction starts to decrease, reaching zero at a certain zooming position. From this on, the spherical aberration now changes to over-correction.

The over-correction increases to a maximum at or near a zooming position for a focal length $fd=ft\times(F_{NO.w}/F_{NO.t})$, where ft is the longest focal length and $F_{NO.w}$ and $F_{NO.t}$ are the F-numbers at the wide-angle and telephoto ends, respectively. It is at this zooming position that the F-number starts to increase (the lens system gets darker). In other words, the F drop begins from this position. As zooming goes on, the amount of over-correction decreases, reaching almost zero in the telephoto end.

Meanwhile, if the F-number in the telephoto end is greater by 5% or below than that in the wide-angle end, or, almost no F drop takes place, the zoom lens has its spherical aberration, as shown in FIG. 18, most over-corrected just before the telephoto end, or at a zooming position for a focal length $ft'=fw\times Z^{3/4}$. On going past this zooming position, the amount of over-correction decreases. In the telephoto end, it tends to change to slight under-correction.

So, if correction is otherwise made to bring the spherical aberration to almost zero in the telephoto end, the over-correction in the zooming position for the focal length ft' even grows greater.

In such a manner, for the zoom lenses, particularly the one having the start point of the F drop within the zooming range, the spherical aberration in the telephoto end is very difficult to control. In the prior art, therefore, it has been the common practice to increase the number of constituent lenses in either of the lens unit for focusing and the lens unit for varying the focal length in order to lessen the variation of spherical aberration with zooming. For this reason, there is a problem that the whole lens system increases in the bulk and size and becomes complicated in the structure of construction.

SUMMARY OF THE INVENTION:

The present invention in application to the so-called 4-unit zoom lens sets forth proper rules for the refractive power of every lens unit and for the determination of the F-number. As the off-axial and on-axial rays of light travel throughout the lens surfaces, at least one lens surface which satisfies certain conditions for the heights of incidence of the rays of light thereon is selected to apply aspheric sphere thereto. When these rules and conditions are satisfied at once, the variation with zooming of spherical aberration is minimized and, particularly on the telephoto side, the spherical aberration is corrected well. It is, therefore, an object of the invention to provide a zoom lens having as large a relative aperture as about 1.7 in F-number in the wide-angle end and as high a range as 10 to 25, while still maintaining high optical performance throughout the entire zooming range.

A zoom lens of the invention comprises, from front to rear, a first lens unit of positive refractive power which is stationary during zooming, a second lens unit of negative refractive power for varying the focal length, a third lens unit of negative refractive power for compensating for the image shift with zooming, and a fixed fourth lens unit of positive refractive power, wherein the F-number of the entire system starts to increase at an arbitrary zooming position when zooming goes from the wide-angle end to the telephoto end, wherein the first lens unit has a focal length f16 and an F-number $F_{NO.1}$, the second lens unit has a lateral magnification β2win the wide-angle end and has a focal length f2, and an axial light beam is incident on the last lens surface in the second lens unit at a height h2m, wherein the second lens unit is constructed with at least four lens surfaces, and at least one of the fourth and later lens surfaces of the second lens unit satisfying $$1.09 < hm/ht \ldots \quad (1\text{-}4)$$

where hm is the maximum height of incidence of the axial beam and ht is the maximum height of incidence of the axial beam in the telephoto end, is an aspheric surface, and wherein, letting the F-number of the second lens unit be denoted by $F_{NO.2}$, the focal length and F-number of the entire system in the telephoto end by ft and $F_{NO.t}$, respectively, and the zoom ratio by Z, and putting $$F_{NO.1} = F1/(ft/F_{NO.t})$$

$$F_{NO.2} = f2/(2 \times h2m)$$

the following conditions are satisfied:

$$10 < Z$$

$$1.01 < F_{NO.1} < 1.65 \ldots \quad (1\text{—}1)$$

$$0.65 < F_{NO.2} < 1.25 \ldots \quad (1\text{-}2)$$

$$-0.40 < β2w < -0.15 \ldots \quad (1\text{-}3)$$

In particular, the aspheric surface described above, when applied to a positive refracting surface, is of such shape that the positive refractive power gets progressively stronger toward the marginal zone of the full aperture, or when applied to a negative refracting surface, is of such shape that the negative refractive power gets progressively weaker toward the marginal zone. In either case, a characteristic feature is that, letting the aspheric amounts at 1.0, 0.9 and 0.7 of the effective lens diameter of the aspheric surface be denoted by Δ10, Δ9 and Δ7, respectively, the following conditions are satisfied:

$$\left.\begin{array}{ccccc} 3.7 \times 10^{-5} & < & |Δ10/f2| & < & 7.7 \times 10^{-4} \\ 1.8 \times 10^{-5} & < & |Δ9/f2| & < & 3.8 \times 10^{-4} \\ 0 & < & |Δ7/f2| & < & 1.25 \times 10^{-4} \end{array}\right\} . \quad (1\text{-}5)$$

Another zoom lens of the invention comprises, from front to rear, a first lens unit of positive refractive power which is stationary during zooming, a second lens unit of negative refractive power for varying the focal length, a third lens unit of negative refractive power for compensating for the image shift with zooming, and a fixed fourth lens unit of positive refractive power, wherein, letting the zoom ratio be denoted by Z, the focal length and F-number of the first lens unit by f1 and $F_{NO.1}$, respectively, the lateral magnification in the wide-angle end of the second lens unit by β2w, the focal length of the second lens unit by f2, and the height of incidence of an axial light beam on the last surface in the second lens unit by h2m, wherein the second lens unit is constructed with at least four lens surfaces, and one of the fourth and later lens surfaces in the second lens unit satisfying the following condition:

$$1.17 < ht/hz \ldots \quad (2\text{-}4)$$

where hz is the maximum height of incidence of the axial light beam in a zooming position where the zoom ratio takes a value of $Z^{3/4}$, and ht is the maximum height of incidence of the axial light beam in the telephoto end, is an aspheric surface, and wherein, letting the F-number of the second lens unit be denoted by $F_{NO.2}$, the focal length and F-number in the telephoto end and the F-number in the wide-angle end of the entire system by ft, $F_{NO.t}$ and $F_{NO.w}$, respectively, and putting $$F_{NO.1} = f1/(ft/F_{NO.t})$$

$$F_{NO.2} = f2/(2 \times h2m)$$

$$F_{NO.R} = F_{NO.t}/F_{NO.w}$$

the following conditions are satisfied:

$$10 < Z$$

$$F_{NO.R} < 1.05$$

$$1.01 < F_{NO.1} < 1.65 \ldots \quad (2\text{-}1)$$

$$0.65 < F_{NO.2} < 1.28 \ldots \quad (2\text{—}2)$$

$$-0.40 < β2w < -0.16 \ldots \quad (2\text{-}3)$$

In particular, the aspheric surface described above, when in application to a positive refracting surface, is of such shape that the positive refractive power gets progressively weaker toward the marginal zone of the full aperture, or when in application to a negative refracting surface, is of such shape that the negative refractive power gets progressively stronger toward the marginal zone. A characteristic feature is that, letting the aspheric amounts at 1.0, 0.9 and 0.7 of the effective lens diameter of the aspheric surface be denoted by Δ10, Δ9 and Δ7, respectively, the following conditions are satisfied:

$$\left.\begin{array}{ccccc} 3.85 \times 10^{-5} & < & |Δ10/f2| & < & 7 \times 10^{-4} \\ 1.95 \times 10^{-5} & < & |Δ9/f2| & < & 3.2 \times 10^{-4} \\ 0 & < & |Δ7/f2| & < & 4.7 \times 10^{-5} \end{array}\right\} . \quad (2\text{-}5)$$

A further zoom lens of the invention comprises, from front to rear, a first lens unit of positive refractive power which is stationary during zooming, a second lens unit of negative refractive power for varying the focal length, a third lens unit of positive refractive power for compensating for the image shift with zooming and a fixed fourth lens unit of positive refractive power, wherein the entire system varies its focal length from the shortest one fw to the longest one ft in a zoom ratio Z with the F-numbers $F_{NO.w}$ and $F_{NO.t}$ in the wide-angle and telephoto ends, respectively, the first lens unit has a focal length f1 and an F-number $F_{NO.1}$, the second lens unit during zooming varies its magnifying power in a range including unity, the variation of its lateral magnification amounting to a range Z2, the third lens unit during zooming varies its magnifying power in a range including unity, an axial light beam is incident on the third lens unit at a maximum height h3m during zooming and at a maximum height h3T in the telephoto end, the third lens unit includes at least one cemented lens of which media on the front and rear sides of the cemented surface differ in the refractive index from each other by an amount Δn3, and the third lens unit has a focal length F3 and an F-number $F_{NO.3}$, the following conditions being satisfied:

$$1.25 < F_{NO.1} < 1.6 \ldots \quad (3)$$

where $$F_{NO.1} = f1/(ft/F_{NO.t})$$

$$5 < Z2 \ldots \quad (4)$$

$$0.2 < Z2/Z < 0.3 \ldots \quad (5)$$

$$0.8 < F_{NO.3} < 1.2 \ldots \quad (6)$$

where $$F_{NO.3} = f3 \ (2 \times h3m)$$

$$0.17 < \Delta n3 \ldots \quad (7)$$

and wherein an aspheric surface is applied to at least one of lens surfaces in the third lens unit which satisfies the following condition:

$$1.15 < h3m/h3 \cdot \ldots \quad (8)$$

In particular, the aspheric surface described above is of such shape that the positive refractive power gets progressively stronger toward the-marginal zone of the full aperture, satisfying the following conditions:

$$0 < \Delta X_7/f3 < 4 \times 10^{-5}$$

$$9 \times 10^{-6} < \Delta X_9/f3 < 3 \times 10^{-4}$$

$$3 \times 10^{-5} < \Delta X_{10}/f3 < 6 \times 10^{-4}$$

where $\Delta X_{10}$, $\Delta X_9$ and $\Delta X_7$ are the aspheric amounts at 1.0 0.9 and 0.7 of the effective lens diameter of the aspheric surface, respectively.

A furthermore feature of the invention as applied to the zoom lens comprising, from front to rear, a focusing system, a zooming system and a relay system is that, letting the shortest and longest focal lengths be denoted by fw and ft, respectively, the zoom ratio by Z, an aspheric surface is applied to at least one lens surface on which a ray of light coming from the maximum angle of field of view is incident at a height hW in the wide-angle end and at a height hM in a zooming position where the focal length takes a value of $fM = fW \times Z^{1/4}$, and the highest of the rays of the axial light beam is incident at a height hT in the telephoto end, the aforesaid lens surface satisfying the following condition:

$$1.2 < hW/hM, \text{ and } hT < hW \ldots \quad (9)$$

BRIEF DESCRIPTION OF THE DRAWINGS

FIGS. 26(A) to 26(E) are aberration curves of the numerical example 10.

DETAILED DESCRIPTION OF THE PREFERRED EMBODIMENTS

Figure 1:
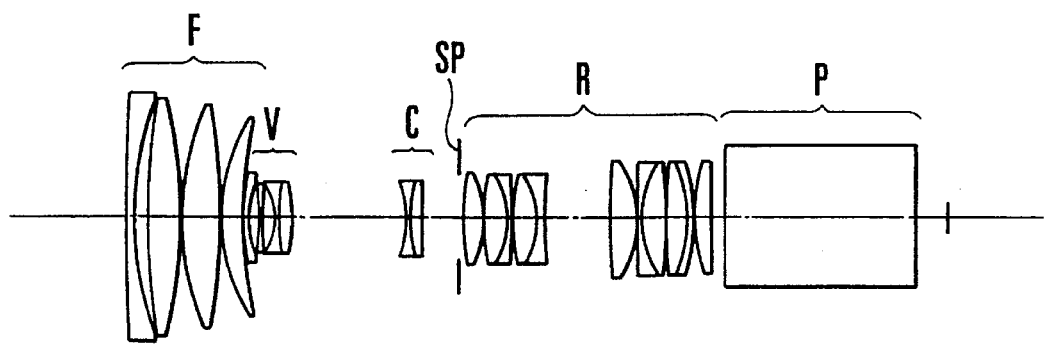
FIG. 1 is a lens block diagram of a numerical example 1 of the invention.

FIGS. 1 to 8 in block diagrams show the numerical examples 1 to 8 of zoom lenses of the invention in the wide-angle end.

The first four examples 1–4 show a case where the zoom lens starts to increase in the F-number (to become slower in the speed) at a certain zooming position during zooming from the wide-angle end to the telephoto end, or, an F drop occurs.

The next three examples 5–8 constitute another case where the amount by which the F-number in the telephoto end, is larger than that in the wide-angle end is not more than 5%, or, almost no F drop occurs.

In FIGS. 1–8, F denotes a first lens unit of positive refractive power, or a focusing lens unit (or front lens members).

V denotes a second lens unit for varying the focal length, or a variator of negative refractive power. As it moves axially toward the image side monotonously, the focal length varies from the shortest to the longest one. A compensator C of negative refractive power moves axially non-linearly in a locus convex toward the object side to compensate for the shift of an image plane with zooming. The variator V and the compensator C constitute a zooming system.

SP (R19) stands for a stop, and R stands for a relay lens unit of positive refractive power as the fixed fourth lens unit. P denotes a color separation prism and optical filters shown in FIGS. 1–8 as a glass block.

To realize a zoom lens whose zoom ratio Z is 10 or higher, while still permitting great increase of the aperture ratio throughout the zooming range, the invention is, for a start, to make use of what is so fast as to satisfy the before-stated condition (1-1) or (2-1) in the front lens unit F. By this, the great increase of the aperture ratio of the entire lens system is achieved in such a manner that the spherical aberration is well corrected in the telephoto end.

When the lower limit of the condition (1-1) or (2-1) is exceeded, it becomes difficult to well correct spherical aberration in the telephoto end. When the upper limit is exceeded, it becomes difficult to get the much desired increase of the aperture ratio.

The variator V is also made so as to satisfy the before-stated condition (1-2) or (2-2) for the F-number. By this, similarly to the condition (1-1) or (2-1), spherical aberration is well corrected in the telephoto end to make it easy to greatly increase the aperture ratio of the entire lens system.

When the lower limit of the condition (1-2) or (2-2) is exceeded, good correction spherical aberration in the telephoto end becomes difficult to perform likewise as with the condition (1-1) or (2-1). When the upper limit is exceeded, it becomes difficult to get the great increase of the aperture ratio.

Further, as regards the lateral magnification, the variator V is made also to satisfy the before-stated condition (1-3) or (2-3). This assures hold of the zoom ratio at a predetermined value, when the variation of aberrations is reduced for improvement of the optical performance over the entire zooming range.

When the lower limit of the condition (1-3) or (2-3) is exceeded, it becomes difficult to greatly increase the zoom ratio. When the upper limit is exceeded, it becomes difficult to reduce the variation of aberrations over the entire zooming range and, therefore, to obtain high optical performance.

Thus, for the zoom lenses shown in FIG. 1 to FIG. 8, good stability of aberration correction is maintained for high optical performance throughout the entire zooming range, when all the conditions mentioned above are satisfied.

Next, an explanation is given to the features of the F-drop-behaved zoom lenses shown in FIG. 1 to FIG. 4.

Figure 20A:
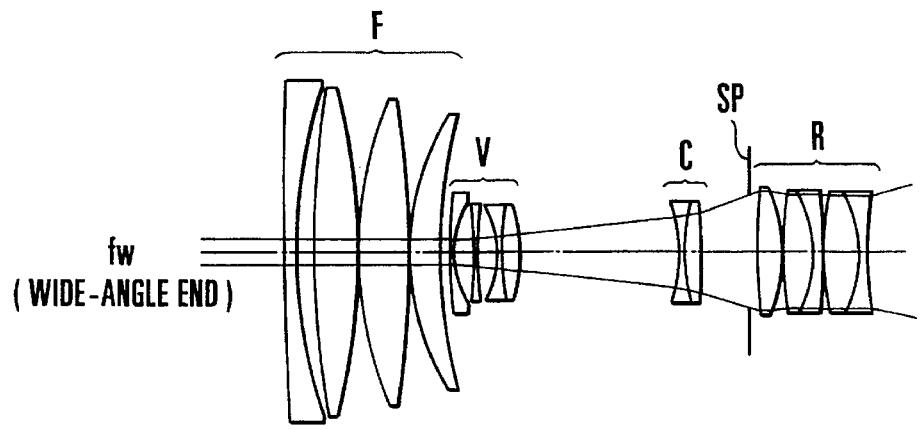
FIGS. 20 (A) to 20 (C) are diagrams showing the optical paths in the operative positions of the zoom lens.
Figure 20B:
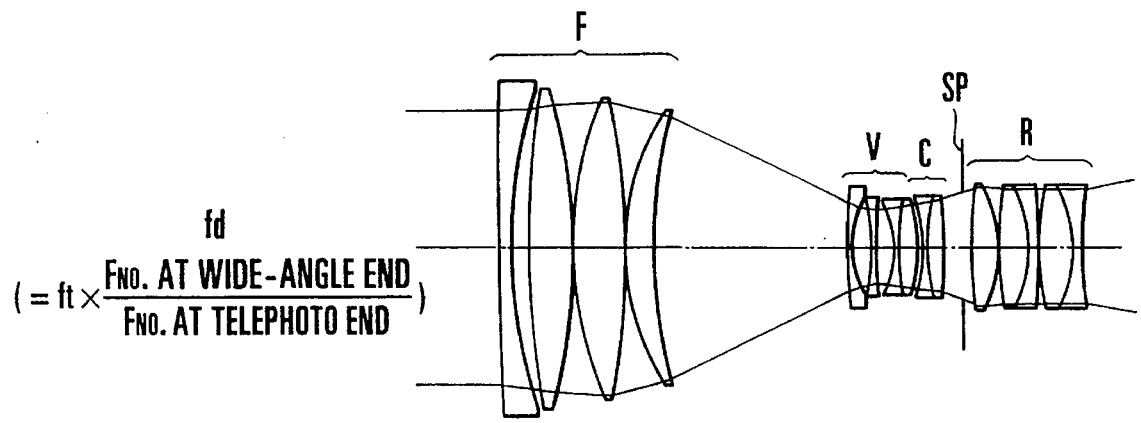
Figure 20C:
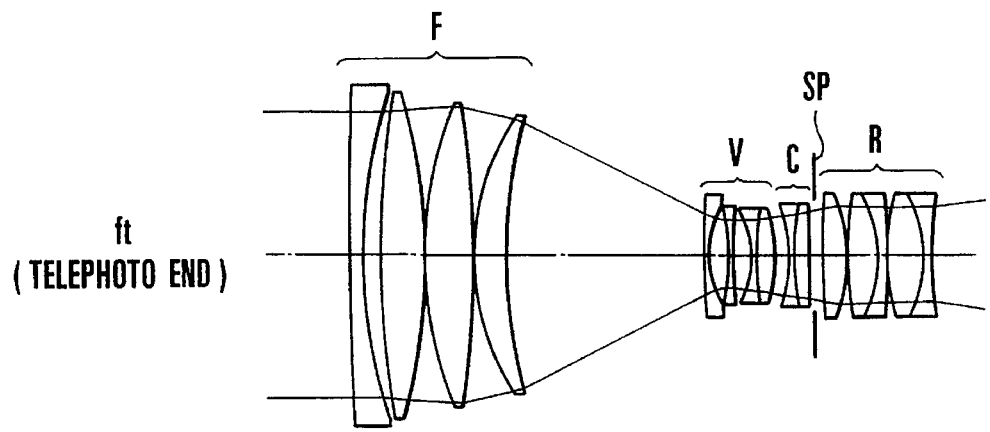

With the zoom lens of F drop behavior, as shown in FIGS. 20(A) to 20(C), the height of incidence of an axial light beam on the variator V gradually increases as zooming goes from the wide-angle end to the telephoto end, reaching a maximum at a start point of the F drop (zooming position fd shown in FIG. 20(B)). Because of the F drop, the height then becomes lower in the telephoto end than that.

The height of incidence of the axial light beam on the front lens unit F (first lens unit) gradually increases with zooming from the wide-angle end to the position for the start of the F drop and remains constant from that position to the telephoto end.

It is to be noted that FIGS. 20(A) to 20(C) show part of the optical system of FIG. 1 (or a fragmentary optical system of from the first lens unit to the third lens unit) with the rays of light in each operative position.

In the present embodiment, as far as the use of the front lens unit in correcting spherical aberration is concerned, the correction mainly for the telephoto end is preponderantly done. At or near the zooming position fd for start of the F drop, therefore, under-correction results. With the variator V in turn, the negative refractive power is made strengthened to achieve the increase of the zoom ratio with the limitation of the size of the entire lens system to a minimum.

For this reason, as zooming approaches the position for the start of the F drop at which the height of the axial light beam from the optical axis becomes high, over-corrected spherical aberrations of higher order are produced.

To take a counter-measure, it is considered that there is some lens surface in the variator on which the height of incidence of the axial light beam can reach the highest value hm at the start point of the F drop and, because of the presence of the F drop, lowers to a value ht in the telephoto end. In the practical examples of F-drop-behaved zoom lenses shown in FIGS. 1 to 4, therefore, at least one lens surface that has its ratio of the height hm to the height ht satisfying the following condition:

$$1.09 < hm/ht \ldots \quad (1\text{-}4)$$

is selected to be used for application of an aspheric sphere thereto. By this, the spherical aberrations of higher order which would be otherwise over-corrected only when zooming in a region around the start point of the F drop are well corrected, since such an effect is almost lost in the other regions.

Particularly in the present embodiment, to selectively well correct the spherical aberrations of higher order, the before-described condition (1-5) for determination of the shape of the aspheric surface is set forth. This means that the aspheric surface is almost completely spherical in the central zone and the aspheric nature gets rapidly greater toward the margin.

It should be pointed out that the condition mentioned above is given to the zooming system of the zoom lens so that the aspheric surface takes effect only in that minor region of the zooming range which lies around the start point of the F drop, and gives as little influence to spherical aberration and astigmatism as possible in the other regions of the zooming range.

Concretely speaking, of a plurality of lens surfaces constituting the variator, the first three ones, when counted from the object side, have a large influence on the off-axial light beam in the wide-angle end. To make the astigmatism and distortion for the wide-angle end leaving not influenced, the aspheric sphere is applied to the fourth or later lens surface.

That, in the condition (1-4), the ratio of the heights hm and ht approaches 1 implies that zooming from the neighborhood of the start point of the F drop to the telephoto end causes little change of the height of incidence of the axial ray on the aspheric surface. The use of the aspheric surface at such a location leads to produce the effect of correcting spherical aberration not only when zoomed in the neighborhood of the start point of the F drop, but also to extend the influence up to the telephoto end in respect to spherical aberration.

In other words, if the spherical aberration is corrected by that aspheric surface to the under direction in the zooming position for the focal length fd ($=(F_{NO,w}/F_{NO,t}) \times ft$), the spherical aberration in the telephoto end, too, is subject to the influence of this aspheric surface, being brought to a change in the under direction. Thus, the effect of correcting the variation of spherical aberration is weakened. So, it should be avoided.

Figure 19:
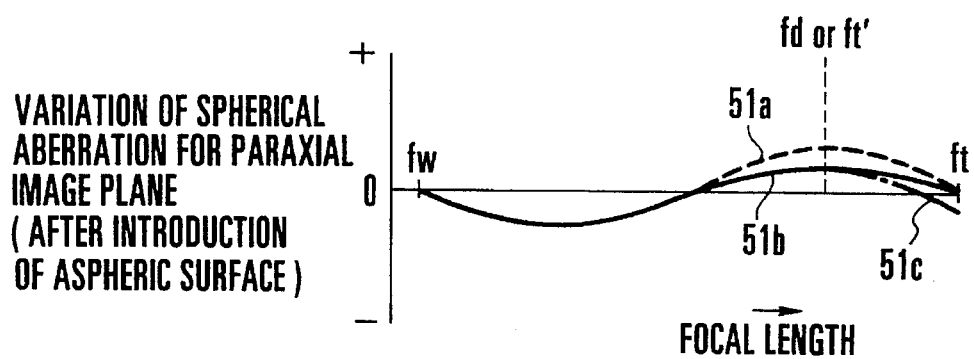
FIG. 19 is a diagram used to explain the variation of aberration of the zoom lens with zooming.

It will be appreciated that in the present embodiment, the lens surface to which the aspheric sphere is to be applied is properly chosen to minimize the influence on the spherical aberration in the telephoto end. Hence, as shown in FIG. 19, the spherical aberration in the neighborhood of the F drop is corrected so as to effect a shift from a curve (dashed line) 51*a* to another one (solid line) 51*b*. Thus, good stability of spherical aberration correction is maintained throughout the entire zooming range.

Next, an explanation is given to the features of those zoom lenses shown in FIGS. 5 to 8 whose F-number in the telephoto end increases from that in the wide-angle end to not more than 5%, or which has almost no F drop over the entire zooming range.

Figure 21A:
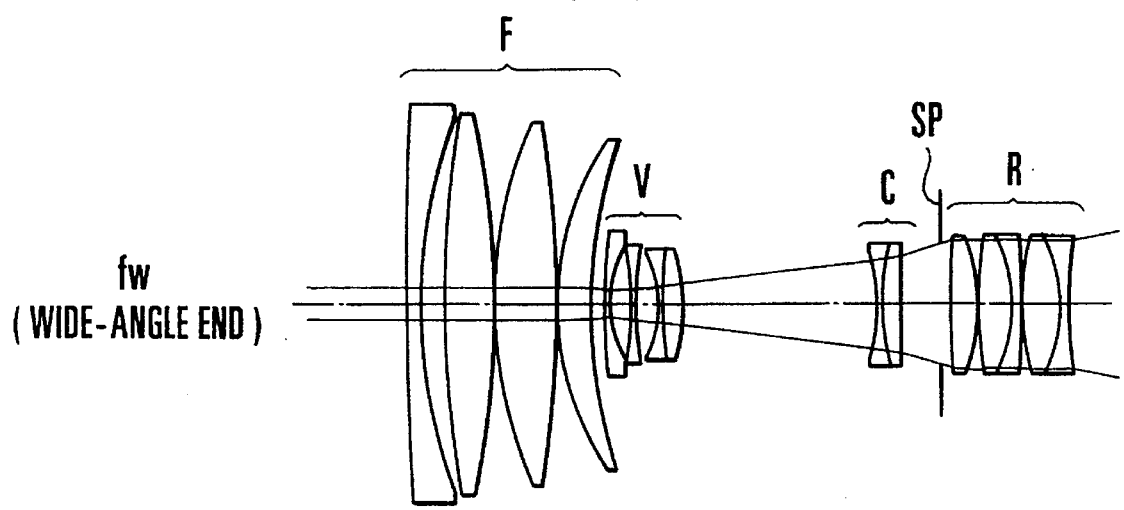
FIGS. 21 (A) to 21 (C) are diagrams showing the optical paths in the operative positions of the zoom lens.
Figure 21B:
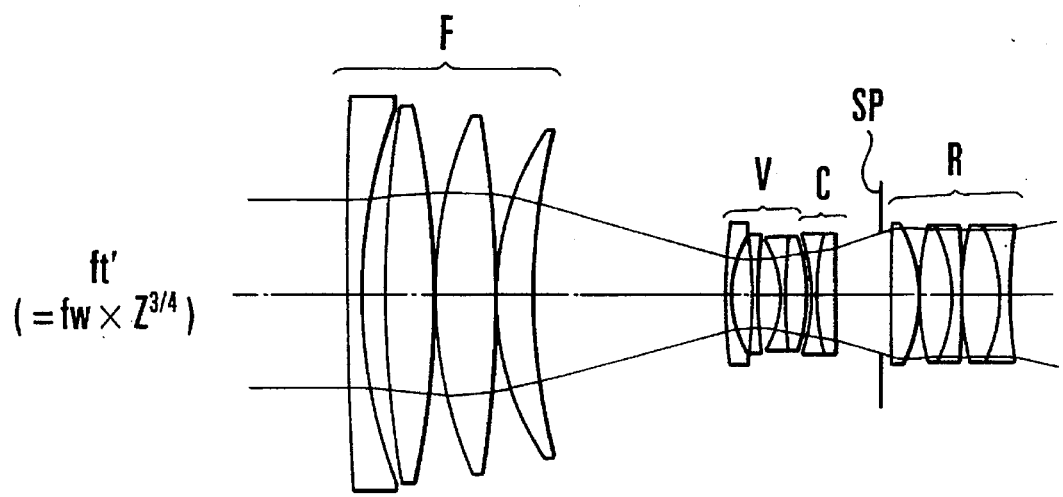
Figure 21C:
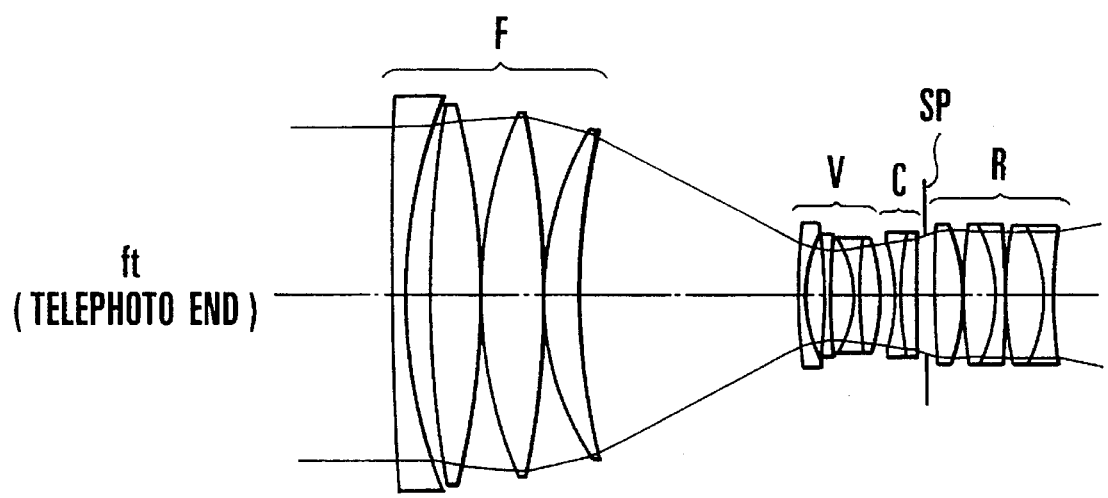

In the zoom lenses shown in FIG. 5 to FIG. 8, the height of incidence of the axial light beam on the variator V gradually increases with zooming from the wide-angle end to the telephoto end as shown in FIGS. 21(A) to 21(C), reaching the highest at or near the telephoto end (FIG. 21(C)). Likewise with this, even for the front lens unit F, the highest height takes place at or near the telephoto end.

Figure 5:
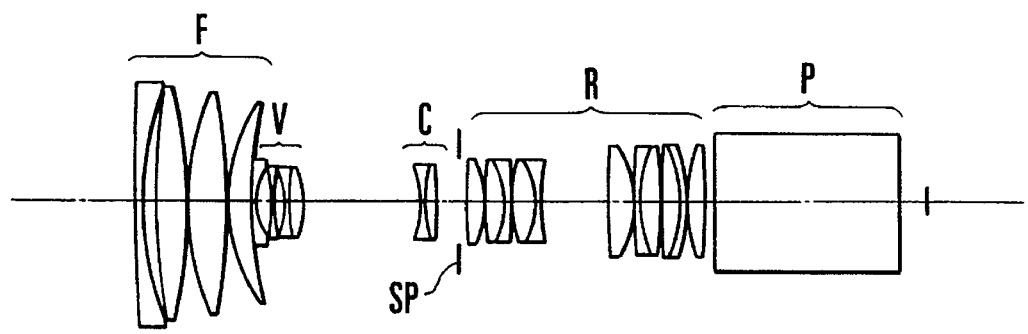
FIG. 5 is a lens block diagram of a numerical example 5 of the invention.

It is to be noted that FIGS. 21(A) to 21(*c*) show part of the optical system of FIG. 5 (or an optical system of from the first to the third lens unit) with the optical paths in the three operative positions.

As zooming begins at the wide-angle end, when a zooming position for a zoom ratio of $Z^{3/4}$ or a focal length ft' ($=fw \times Z^{3/4}$) (FIG. 21 (B)) is reached, the ray of maximum diameter of the axial beam is incident on the front lens unit F, the variator V and the compensator C at respective heights nearly equal to ½ of the full aperture. For such heights of incidence, spherical aberration correction has to be carried out in difficult situation, since the variator V has a strong refractive power. Under the influence of such a variator, over-corrected spherical aberration is apt to be produced. To correct this, measures are adopted within the front lens unit F to produce somewhat under-corrected spherical aberration.

Then, when zoomed to the telephoto end, the spherical aberration becomes even more under-corrected, because the ray of maximum diameter of the axial beam passes through the front lens unit F at higher heights.

To take a counter-measure, the variator V may otherwise produce spherical aberrations of higher order. In this case, however, under-corrected spherical aberrations of higher order are left arising entirely.

In the practical examples of zoom lenses shown in FIGS. 5 to 8, therefore, an aspheric sphere is applied to one of the lens surfaces constituting the variator so as to correct the under-corrected spherical aberrations of higher order effectively in only the zooming region near the telephoto end, but not very effectively in the other zooming region, particularly at the zooming position for a zoom ratio of $Z^{3/4}$ or a focal length of $fw \times Z^{3/4}$.

In particular, as the ray of maximum diameter of the axial beam travels through the variator V at a height hz when in the zooming position for $fw \times Z^{3/4}$ or at a height ht when in the telephoto end, an aspheric sphere is applied to at least one of lens surfaces which satisfies the following condition:

$$1.17 < ht/hz \ldots \tag{2-4}$$

By this, over-corrected spherical aberrations of higher order are produced to effect correction entirely in good balance.

Particularly in the present embodiment, the shape of the aspheric surface is determined to well correct the residual under-corrected spherical aberrations of higher order. For this purpose, the condition (2-5) described before is set forth. When this condition is satisfied, the central zone of the aspheric surface is almost spherical, and the nearer to the margin, the greater the aspheric sphere becomes.

It should be noted that the aforesaid condition is assigned to the zooming system of the zoom lens, so that the aspheric surface brings its effect into full play in only that region of the entire zooming range which lies at or near the telephoto end, and gives as little influence to spherical aberration and astigmatism as possible in the other zooming regions.

Concretely speaking, of a plurality of lens surfaces constituting the variator V, the first three ones, when counted from the object side, have a great influence on the off-axial light beam in the wide-angle end. To avert influences on astigmatism and distortion in the wide-angle end, therefore, the aspheric sphere is applied to the fourth or later lens surface.

When the condition (2-4) is violated, as this means that the ratio of the heights hz and ht is nearer to 1, and, therefore, that the height of incidence of the axial light beam changes to small extent as zooming goes from the position for $fw \times Z^{3/4}$ to the telephoto end, the aspheric surface has the effect of correcting spherical aberration not only at or near the telephoto end, but also gives the influence up to the spherical aberration in the zooming position for $fw \times Z^{3/4}$.

This leads to an objectionable result that if the spherical aberration at or near the telephoto end is corrected in the over direction by the aspheric surface, even the spherical aberration at or near the zooming position for $fw \times Z^{3/4}$ is influenced by the aspheric surface to change in the over direction. Thus, the effect of correcting the variation of spherical aberration is weakened.

It will be appreciated that in the present embodiment, the lens surface to which the aspheric surface is to be applied is properly selected so that, while giving little influence to the spherical aberration in the zooming position for $fw \times Z^{3/4}$ the spherical aberration in the neighborhood of the telephoto end is corrected as shown in FIG. 19 in such a way as to shift from a curve 51*c* (dot-and-dash line) to a curve 51*b* (solid line). Thus, good stability of spherical aberration correction is maintained throughout the entire zooming range.

The features of each of the practical examples (numerical examples) of the invention are described below.

The numerical example 1 shown in FIG. 1 has a zoom ratio of 13. A front lens unit F of from R1 to R8 for focusing has a positive refractive power. A variator V of from R9 to R15 moves toward the image side monotonously to effect variation of the focal length from the wide-angle end to the telephoto end. A compensator C of from R16 to R18 functions to compensate for the shift of an image plane with zooming and has a negative refractive power. When zooming from the wide-angle end to the telephoto end, the compensator C moves while depicting an arcuate locus convex toward the object side. SP (R19) stands for a stop. A relay lens unit R of from R20 to R37 has the image forming function. R38 and R39 define an equivalent glass block to a color separation prism.

In this numerical example 1, as an indicator of increase of the aperture ratio, the F-number $F_{NO.1}$ of the front lens unit F is defined by $F_{NO.1}=f1/(ft/F_{NO.t})$. Then, $F_{NO.1}=1.08$. With this value of F-number of the front lens unit F when sustained over the entire zooming range, as the F-number $F_{NO.2}$ of the variator V is defined by $F_{NO.2}=f2/(2\times h2m)$, it gives as large an aperture ratio as $F_{NO.2}=0.89$.

For these large values of the aperture ratio, the front lens unit F is constructed with four lenses of minus-plus-plus-plus power arrangement in this order from the object side. By the negative lens, spherical aberration is diverged, thus permitting the front lens unit F to suppress the spherical aberration from increasing in itself. The variator V is constructed with four lenses of minus-minus-minus-plus power arrangement in this order from the object side. By the positive lens, spherical aberration is converted, thus causing the variator V to suppress the spherical aberration from increasing in itself.

The lateral magnification β2w for the wide-angle end of the variator V is, because of the zoom ratio being 13, taken somewhat large in the absolute sense at β2w=−0.381.

The aspheric sphere is applied to the surface R15 and the condition (1-4) has its factor getting a value of hm/ht=1.10. The aspheric surface is so oriented that the positive refractive power gets stronger as the height of the axial light beam increases. To correct spherical aberration with good efficiency even in up to higher terms, the aspheric coefficients D and E only are in use, so that chief aberration correction is made on spherical aberration. Such an aspheric surface deviates 1.05 μm at the highest height of incidence of the axial light beam.

The spherical aberration, astigmatism and distortion of the numerical example 1 in five zooming positions are shown in FIGS. 9(A) to 9(E), respectively.

Figure 2:
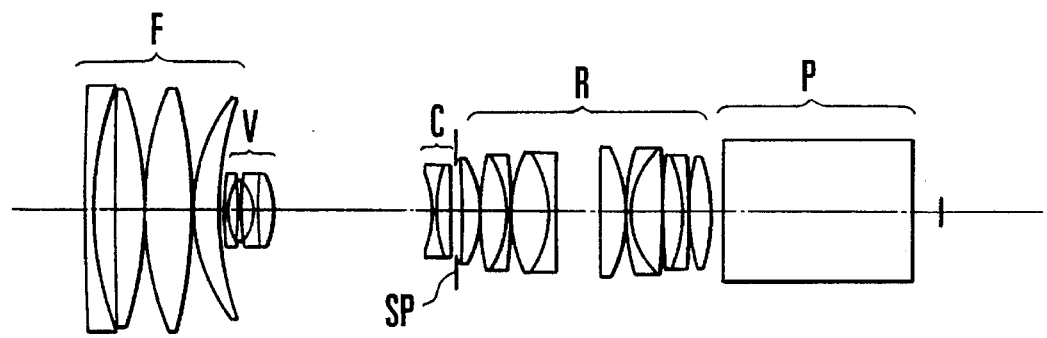
FIG. 2 is a lens block diagram of a numerical example 2 of the invention.

The numerical example 2 shown in FIG. 2 has a zoom ratio of 14. A front lens unit F for focusing has a positive refractive power with R1 to R8. A variator V of R9 to R15 moves toward the image side monotonously to vary the focal length from the wide-angle end to the telephoto end. A compensator C has a negative refractive power with R16 to R18. To compensate for the image shift with zooming, the compensator C moves axially while depicting an arcuate locus convex toward the object side, as zooming goes from the wide-angle end to the telephoto end. SP (R19) stands for a stop. A relay lens unit R of R20 to R37 has the image forming function. R38 and R39 define a glass block equivalent to a color separation prism.

In this numerical example 2, as an indicator of increase of the aperture ratio, the F-number $F_{NO.1}$ of the front lens unit F is defined by $F_{NO.1}=f1/(ft\times F_{NO.t})$. Then, $F_{NO.1}=1.06$. With this value of F-number of the front lens unit F when sustained over the entire zooming range, as the F-number $F_{NO.2}$ of the variator V is defined by $F_{NO.2}=f2/(2\times h2m)$, it gives as large an aperture ratio as $F_{NO.2}=0.679$.

For these large values of the aperture ratio, the front lens unit F is constructed with four lenses of minus-plus-plus-plus power arrangement in this order from the object side. By the negative lens, spherical aberration is diverged, permitting the front lens unit F to suppress the spherical aberration from increasing in itself. The variator V is constructed with four lenses of minus-minus-minus-plus power arrangement in this order from the object side. By the positive lens, the spherical aberration is converged, thus causing the variator V to suppress the spherical aberration from increasing in itself.

The lateral magnification β2w for the wide-angle end of the variator V is, because of the zoom ratio being 14, is taken somewhat large in the absolute sense at β2w=−0.273.

The aspheric sphere is applied to the surface R13 and the condition (1-4) has its factor getting hm/ht=1.09. The aspheric surface is so oriented that the negative refractive power gets progressively weaker as the height of incidence of the axial light beam increases. To correct spherical aberration with good efficiency even in up to higher terms, the aspheric coefficients D and E only are in use, so that chief aberration correction is made on spherical aberration. Such an aspheric surface deviates 10.0 μm at the highest height of incidence of the axial light beam.

The spherical aberration, astigmatism and distortion of the numerical example 2 in five zooming positions are shown in FIGS. 10(A) to 10(E), respectively.

Figure 3:
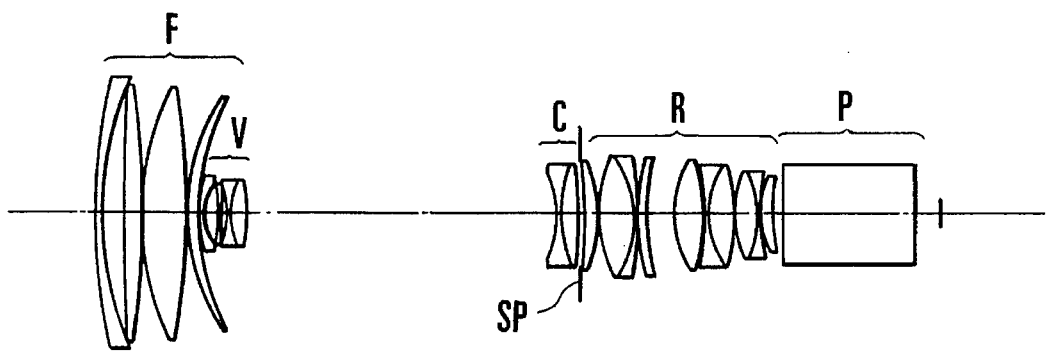
FIG. 3 is a lens block diagram of a numerical example 3 of the invention.

The numerical example 3 shown in FIG. 3 has a zoom ratio of 25. A front lens unit F for focusing has a positive refractive power with R1 to R8. A variator V of R9 to R15 moves toward the image side monotonously to vary the focal length from the wide-angle end to the telephoto end. A compensator C of R16 to R18 has a negative power. To compensate for the image shift with zooming, the compensator C moves while depicting a locus convex toward the object side, as zooming goes from the wide-angle end to the telephoto end. SP (R19) stands for a stop. A relay lens unit R of R20 to R36 has the image forming function. R37 and R38 define a glass block equivalent to a color separation prism.

In this numerical example 3, as an indicator of increase of the aperture ratio, the F-number $F_{NO.1}$ of the front lens unit F is defined by $F_{NO.1}=f1/(ft/F_{NO.t})$. Then, $F_{NO.1}=1.6$. With this value of the F-number of the front lens unit F when sustained over the entire zooming range, as the F-number $F_{NO.2}$ of the variator V is defined by $F_{NO.2}=f2/(2\times h2m)$, it gives as large an aperture ratio as $F_{NO.2}=0.868$.

For these large values of the aperture ratio, the front lens unit F is constructed with four lenses of minus-plus-plus-plus power arrangement in this order from the object side. By the negative lens, spherical aberration is diverged, permitting the front lens unit F to suppress the spherical aberration from increasing in itself. The variator V is constructed with four lenses of minus-minus-minus-plus power arrangement in this order from the object side. By the positive lens, spherical aberration is converted, causing the variator V to suppress the spherical aberration from increasing in itself.

The lateral magnification β2w for the wide-angle end of the variator V is, because of the zoom ratio being so large as 25, taken somewhat small in the absolute sense at β2w=−0.163.

The aspheric sphere is applied to the surface R12 and the condition (1-4) has its factor getting hm/ht=1.19. The aspheric surface is so oriented that the positive refractive power gets stronger as the height of incidence of the axial beam increases. To correct spherical aberration with good efficiency even in up to higher terms, the aspheric coefficients C and D only are in use, so that chief aberration correction is made on spherical aberration. Such an aspheric surface deviates 9.55 μm at the highest height of incidence of the axial light beam.

The spherical aberration, astigmatism and distortion of the numerical example 3 in five zooming positions are shown in FIGS. 11(A) to 11(E), respectively.

Figure 4:
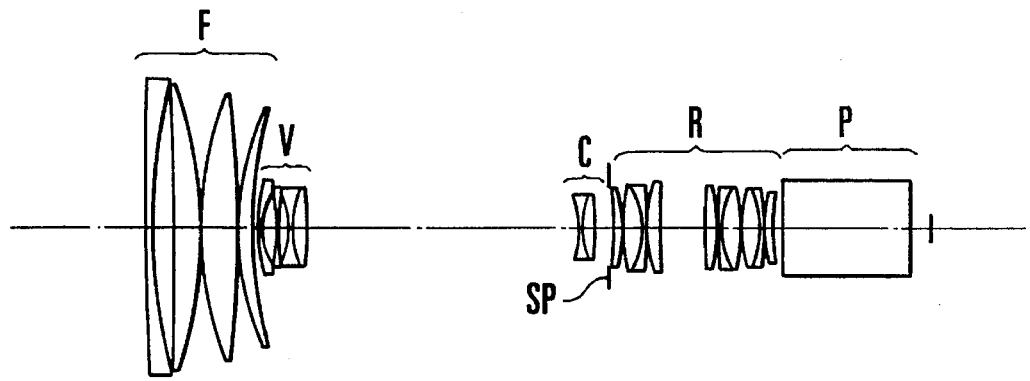
FIG. 4 is a lens block diagram of a numerical example 4 of the invention.

The numerical example 4 shown in FIG. 4 has a zoom ratio of 25. A front lens unit F for focusing has a positive refractive power with R1 to R8. A variator V of R9 to R15 moves toward the image side monotonously to vary the focal length from the wide-angle end to the telephoto end. A compensator C of R16 to R18 has a negative refractive power. To compensate for the image shift with zooming, the compensator C moves axially while depicting a locus convex toward the object side as zooming goes from the wide-angle end to the telephoto end. SP(R19) stands for a stop. A relay lens unit R of R20 to R36 has the image forming function. R37 and R38 define a glass block equivalent to a color separation prism.

In this numerical example 4, as an indicator of increase of the aperture ratio, the F-number $F_{NO.1}$ of the front lens unit F is defined by $F_{NO.1}=f1/(ft/F_{NO.t})$. Then, $F_{NO.1}=1.6$. With this value of the F-number of the front lens unit F when sustained over the entire zooming range, as the F-number $F_{NO.2}$ of the variator V is defined by $F_{NO.2}=f2/(2\times h2m)$, it gives as large an aperture ratio as $F_{NO.2}=1.21$.

For these large values of the aperture ratio, the front lens unit F is constructed with four lenses of minus-plus-plus-plus power arrangement in this order from the object side. By the negative lens, spherical aberration is diverged, permitting the front lens unit F to suppress the spherical aberration from increasing in itself. The variator V is constructed with four lenses of minus-minus-minus-plus power arrangement in this order from the object side. By the positive lens, the spherical aberration is converged, causing the variator V to suppress the spherical aberration from increasing in itself.

The lateral magnification β2w for the wide-angle end of the variator V is, because of the zoom ratio being so large as 25, taken somewhat small in the absolute sense at β2w=−0.23.

The aspheric sphere is applied to the surface R15 and the condition (1-4) has its factor getting hm/ht=1.24. The aspheric surface is so oriented that the positive refractive power gets progressively stronger as the height of incidence of the axial beam increases. To correct spherical aberration with good efficiency even in up to higher terms, the aspheric coefficients D and E only are in use, so that chief aberration correction is made on spherical aberration. Such an aspheric surface deviates 1.08 μm at the highest height of incidence of the axial light beam.

The spherical aberration, astigmatism and distortion of the numerical example 4 in five zooming positions are shown in FIGS. 12(A) to 12(E), respectively.

The numerical example 5 shown in FIG. 5 has a zoom ratio of 11. A front lens unit F for focusing has a positive refractive power with R1 to R8. A variator V of R9 to R15 moves toward the image side monotonously to vary the focal length from the wide-angle end to the telephoto end. A compensator C of R16 to R18 has a negative refractive power. To compensate for the image shift with zooming, the compensator C moves axially while depicting a locus convex toward the object side as zooming goes from the wide-angle end to the telephoto end. SP (R19) stands for a stop. A relay lens unit R of R20 to R37 has the image forming function. R38 and R39 define a glass block equivalent to a color separation prism.

In the numerical example 5, as an indicator of increase of the aperture ratio, the F-number $F_{NO.1}$ of the front lens unit F is defined by $F_{NO.1}=f1/(ft/F_{NO.t})$. Then, $F_{NO.1}=1.06$. With this value of the F-number of the front lens unit F when sustained over the entire zooming range, as the F-number $F_{NO.2}$ of the variator V is defined by $F_{NO.2}=f2/(2\times h2m)$, it gives as large an aperture ratio as $F_{NO.2}=0.882$.

For these large values of the aperture ratio, the front lens unit F is constructed with four lenses of minus-plus-plus-plus power arrangement in this order from the object side. By the negative lens, spherical aberration is diverged, permitting the front lens unit F to suppress the spherical aberration from increasing in itself. The variator is constructed with four lenses of minus-minus-minus-plus power arrangement in this order from the object side. By the positive lens, the spherical aberration is converged, causing the variator V to suppress the spherical aberration from increasing in itself.

The lateral magnification β2w for the wide-angle end of the variator V is, because of the zoom ratio being 11, taken somewhat large in the absolute sense at β2w=−0.381.

The aspheric sphere is applied to the surface R15 and the condition (2-4) has its factor getting ht/hz=1.24. The aspheric surface is so oriented that the positive refractive power gets progressively weaker as the height of incidence of the axial beam increases. To correct spherical aberration with good efficiency even in up to higher terms, the aspheric coefficients D and E only are in use, so that chief aberration correction is made on spherical aberration. Such an aspheric surface deviates 1.07 μm at the highest height of incidence of the axial light beam.

The spherical aberration, astigmatism and distortion of the numerical example 5 in five zooming positions are shown in FIGS. 13(A) to 13(E), respectively.

Figure 6:
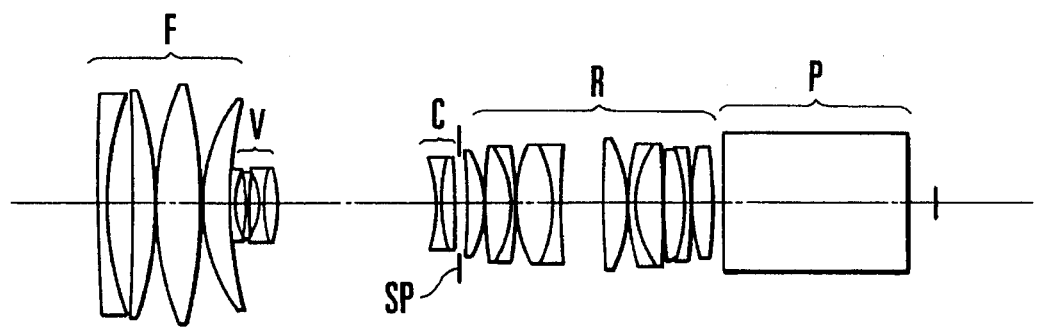
FIG. 6 is a lens block diagram of a numerical example 6 of the invention.

The numerical example 6 shown in FIG. 6 has a zoom ratio of 11. A front lens unit F for focusing has a positive refractive power with R1 to R8. A variator V of R9 to R15 moves toward the image side monotonously to vary the focal length from the wide-angle end to the telephoto end. A compensator C of R16 to R18 has a negative refractive power. To compensate for the image shift with zooming, the compensator C moves axially while depicting a locus convex toward the object side as zooming goes from the wide-angle end to the telephoto end. SP(R19) stands for a stop. A relay lens unit R of R20 to R37 has the image forming function. R38 and R39 define a glass block equivalent to a color separation prism.

In this numerical example 6, as an indicator of increase of the aperture ratio, the F-number $F_{NO.1}$ of the front lens unit F is defined by $F_{NO.1}=f1/(ft/F_{NO.t})$. Then, $F_{NO.1}=1.05$. With this value of F-number of the front lens unit F when sustained over the entire zooming range, as the F-number $F_{NO.2}$ of the variator V is defined by $F_{NO.2}=f2/(2\times h2m)$, it gives as large an aperture ratio as $F_{NO.2}=0.68$.

For these large values of the aperture ratio, the front lens unit F is constructed with four lenses of minus-plus-plus-plus power arrangement in this order from the object side. By the negative lens, spherical aberration is diverged, permitting the front lens unit F to suppress the spherical aberration from increasing in itself. The variator V is constructed with four lenses of minus-minus-minus-plus power arrangement in this order from the object side. By the positive lens, the spherical aberration is converged, causing the variator V to suppress the spherical aberration from increasing in itself.

The lateral magnification β2w for the wide-angle end of the variator V is, because of the zoom ratio being 11, taken somewhat large in the absolute sense at β2w=−0.279.

The aspheric sphere is applied to the surface R13 and the condition (2-4) has its factor getting ht/hz=1.24. The aspheric surface is so oriented that the negative refractive power gets progressively stronger as the height of incidence of the axial light beam increases. To correct spherical aberration with good efficiency even in up to higher terms, the aspheric coefficients D and E only are in use, so that chief aberration correction is made on spherical aberration. Such an aspheric surface deviates 9.17 μm at the highest height of incidence of the axial light beam.

The spherical aberration, astigmatism and distortion of the numerical example 6 in five zooming positions are shown in FIGS. 14(A) to 14(E), respectively.

Figure 7:
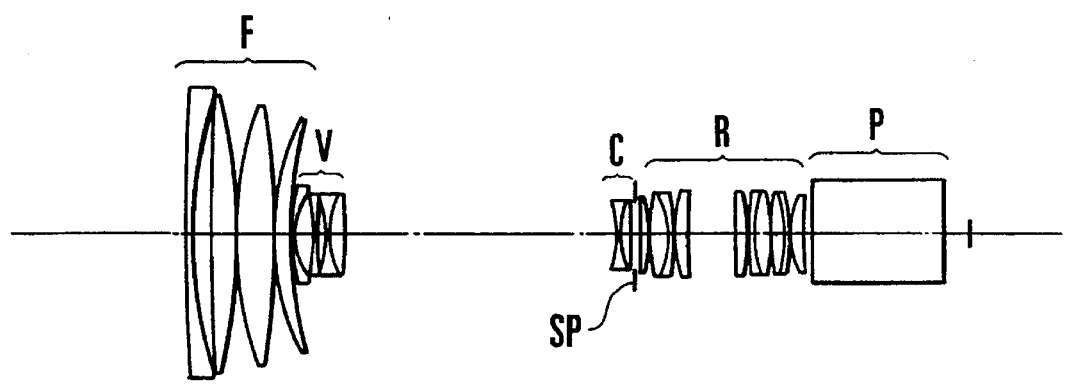
FIG. 7 is a lens block diagram of a numerical example 7 of the invention.

The numerical example 7 shown in FIG. 7 has a zoom ratio of 17. A front lens unit F for focusing has a positive refractive power with R1 to R8. A variator V of R9 to R15 moves toward the image side monotonously to vary the focal length from the wide-angle end to the telephoto end. A compensator C of R16 to R18 has a negative refractive power. To compensate for the image shift with zooming, the compensator C moves axially while depicting a locus convex toward the object side as zooming goes from the wide-angle end to the telephoto end. SP (R19) stands for a stop. A relay lens unit R of R20 to R36 has the image forming function. R37 and R38 define a glass block equivalent to a color separation prism.

In the numerical example 7, as an indicator of increase of the aperture ratio, the F-number $F_{NO.1}$ of the front lens unit F is defined by $F_{NO.1}=f1/(ft/F_{NO.t})$. Then, $F_{NO.1}=1.59$. With this value of F-number of the front lens unit F when sustained over the entire zooming range, as the F-number $F_{NO.2}$ of the variator V is defined by $F_{NO.2}=f2/(2 \times h2m)$, it gives as large an aperture ratio as $F_{NO.2}=0.906$.

For these large values of the aperture ratio, the front lens unit F is constructed with four lens units of minus-plus-plus-plus power arrangement in this order from the object side. By the negative lens, spherical aberration is diverged, permitting the front lens unit F to suppress the spherical aberration from increasing in itself. The variator V is constructed with four lenses of minus-minus-minus-plus power arrangement in this order from the object side. By the positive lens, the spherical aberration is converged, causing the variator V to suppress the spherical aberration from increasing in itself.

The lateral magnification β2w for the wide-angle end of the variator V is, because of the zoom ratio being rather as large as 17, taken somewhat small in the absolute sense at β2w=−0.169.

The aspheric sphere is applied to the surface R12 and the condition (2-4) has its factor getting ht/hz=1.26. The aspheric surface is so oriented that the negative refractive power gets progressively stronger as the height of incidence of the axial light beam increases. To correct spherical aberration with good efficiency even in up to higher terms, the aspheric coefficients D and E only are in use, so that chief aberration correction is made on spherical aberration. Such an aspheric surface deviates 9.35 μm at the highest height of incidence of the axial light beam.

The spherical aberration, astigmatism and distortion of the numerical example 7 in five zooming positions are shown in FIGS. 15(A) to 15(E), respectively.

Figure 8:
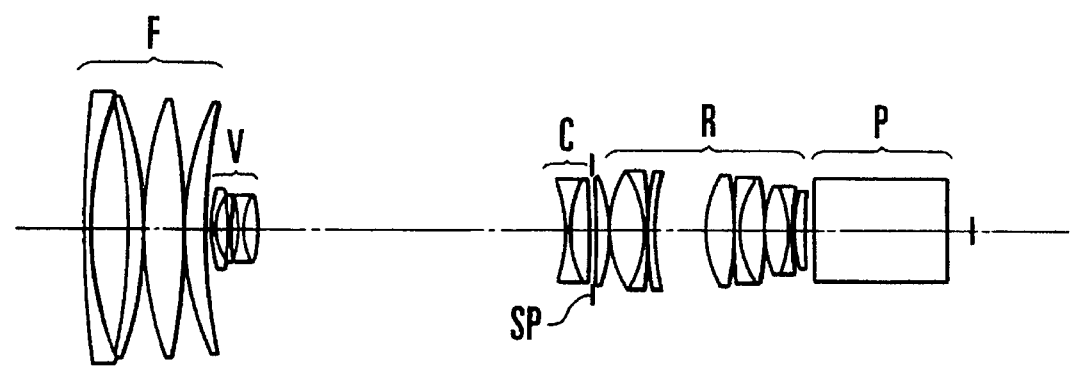
FIG. 8 is a lens block diagram of a numerical example 8 of the invention.
Figures 1, 9A:
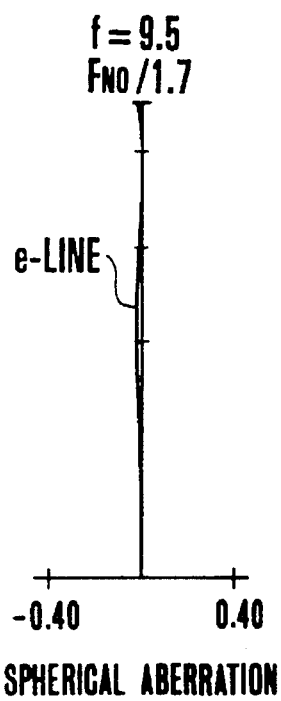
FIGS. 9(A) to 9(E) are aberration curves of the numerical example 1.
Figures 2, 9A:
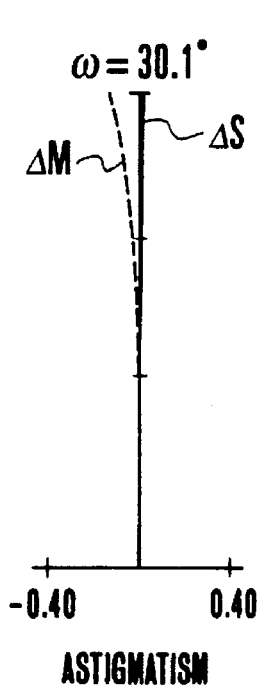
Figures 3, 9A:
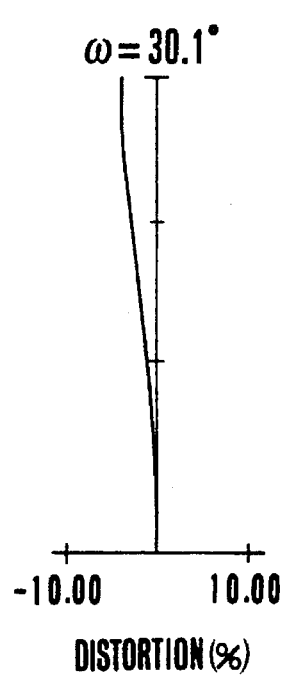
Figures 1, 9B:
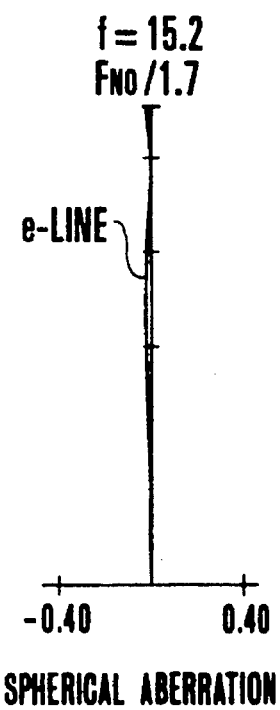
Figures 2, 9B:
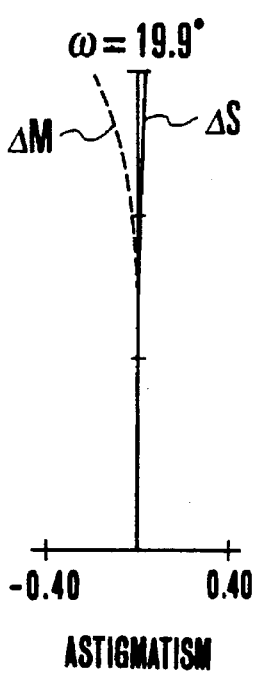
Figures 3, 9B:
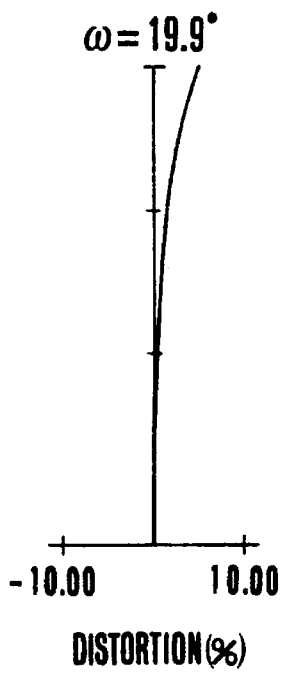
Figures 1, 9C:
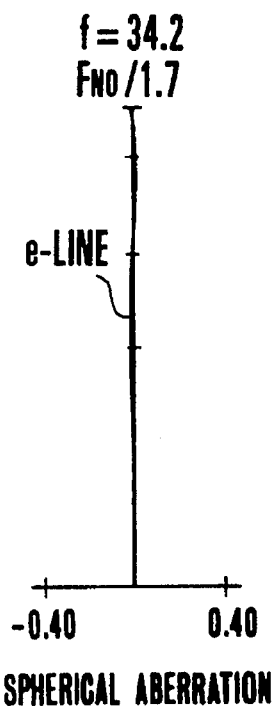
Figures 2, 9C:
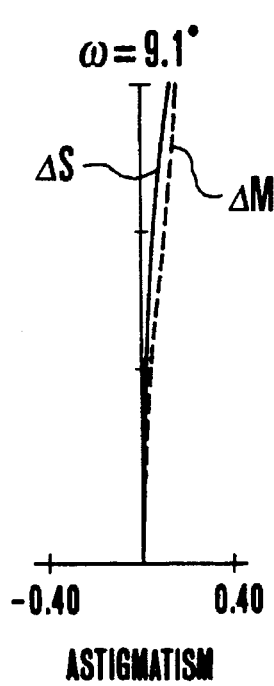
Figures 3, 9C:
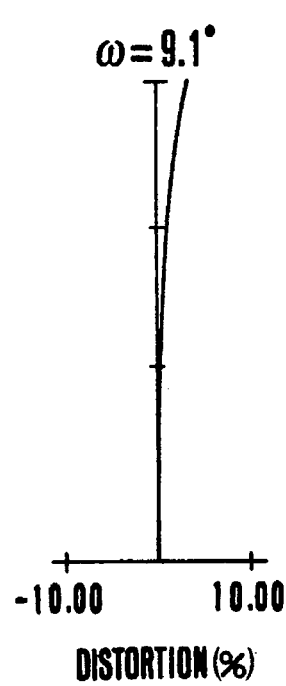
Figures 1, 9D:
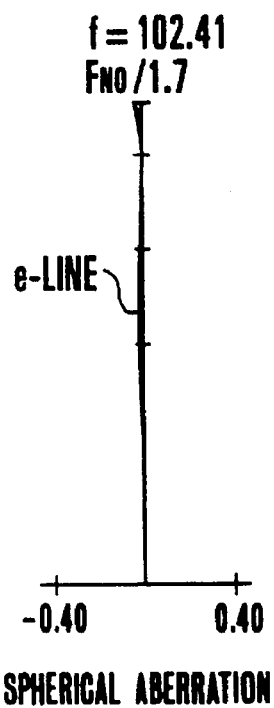
Figures 2, 9D:
Figures 3, 9D:
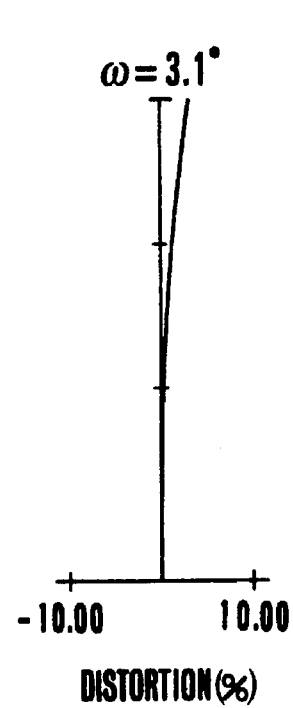
Figures 1, 9E:
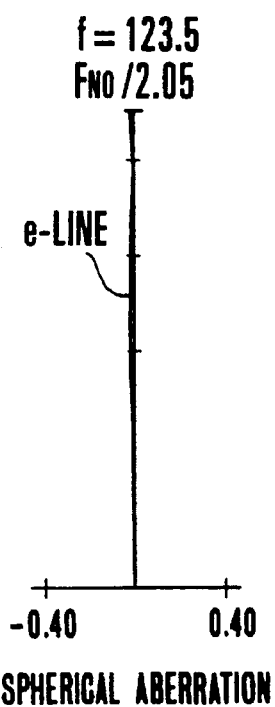
Figures 2, 9E:
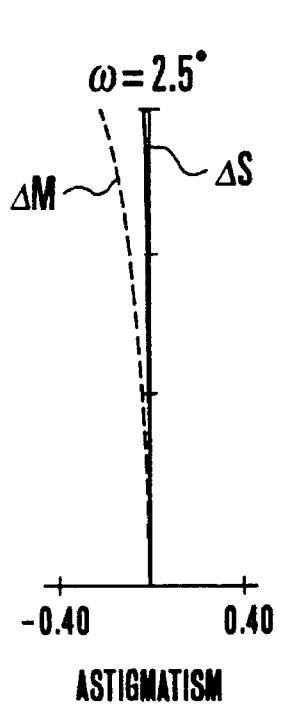
Figures 3, 9E:
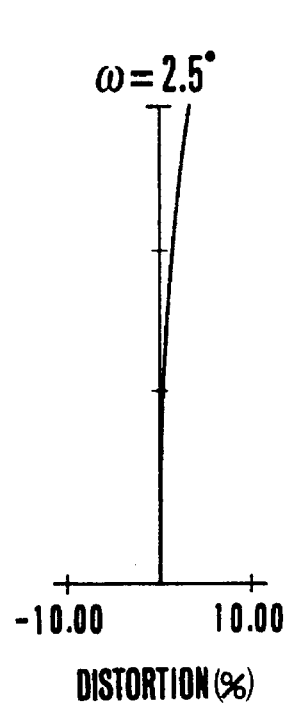
Figures 1, 10A:
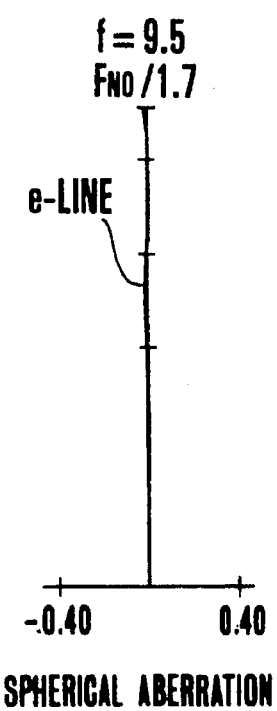
FIGS. 10(A) to 10(E) are aberration curves of the numerical example 2.
Figures 2, 10A:
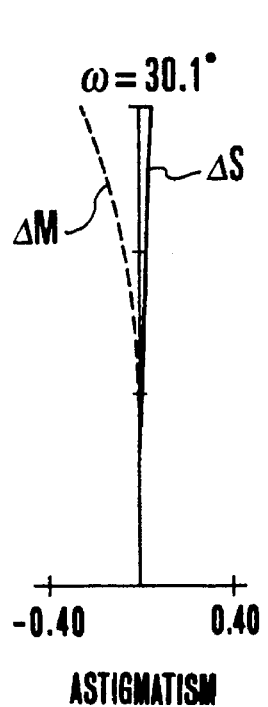
Figures 3, 10A:
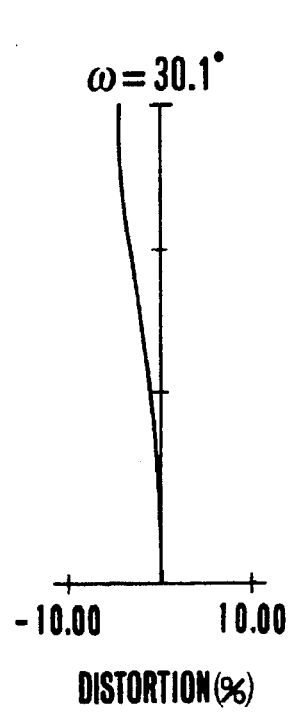
Figures 1, 10B:
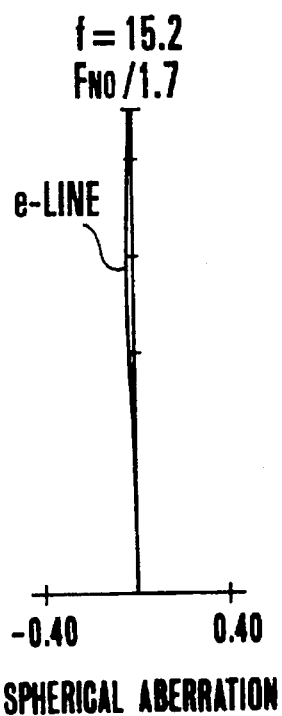
Figures 2, 10B:
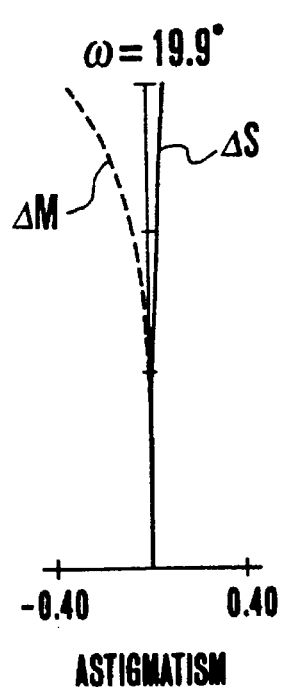
Figures 3, 10B:
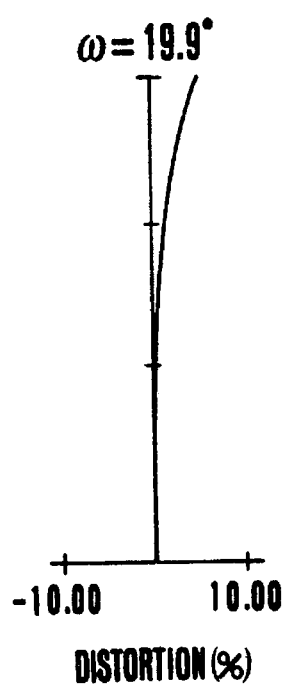
Figures 1, 10C:
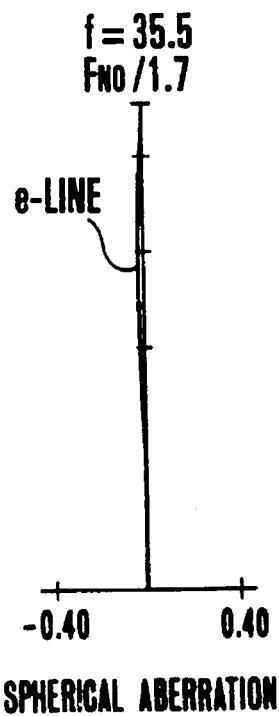
Figures 2, 10C:
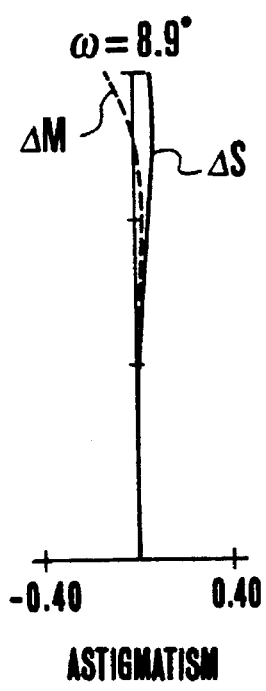
Figures 3, 10C:
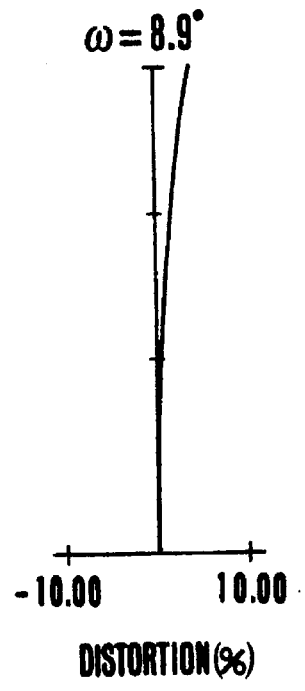
Figures 1, 10D:
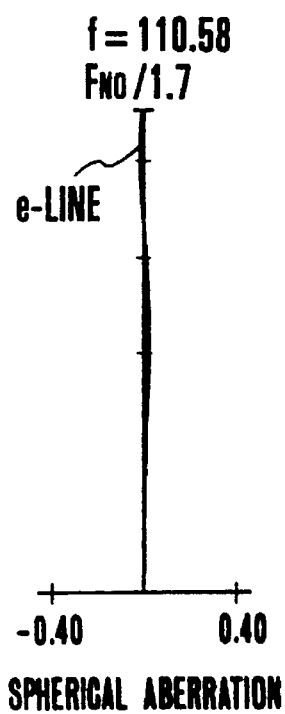
Figures 2, 10D:
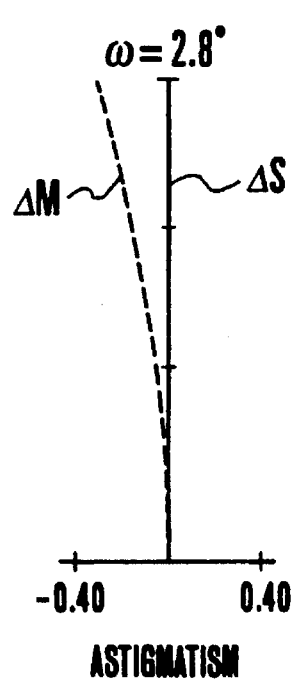
Figures 3, 10D:
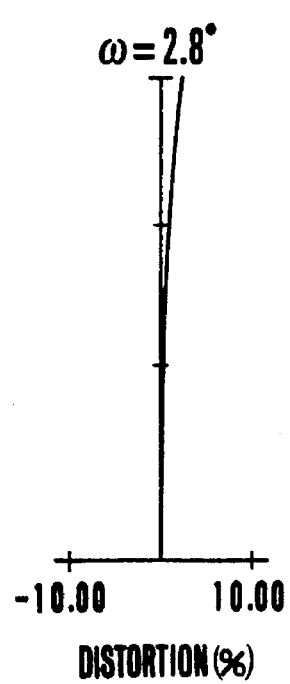
Figures 1, 10E:
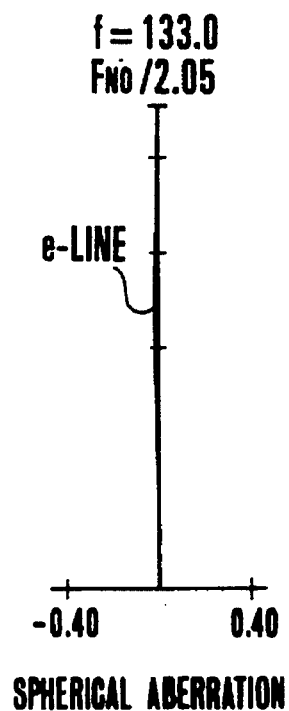
Figures 2, 10E:
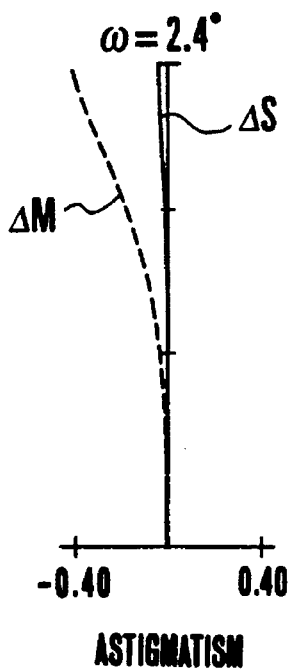
Figures 3, 10E:
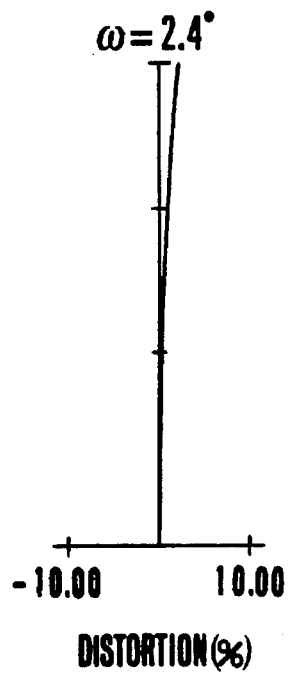
Figures 1, 11A:
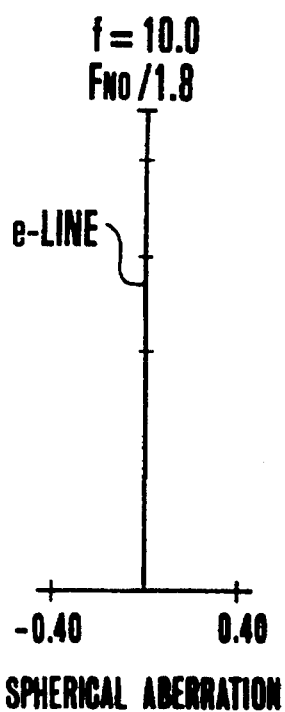
FIGS. 11(A) to 11(E) are aberration curves of the numerical example 3.
Figures 2, 11A:
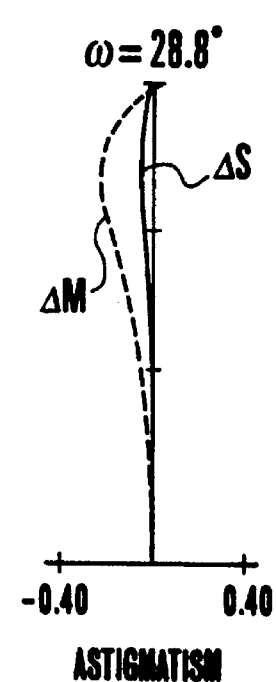
Figures 3, 11A:
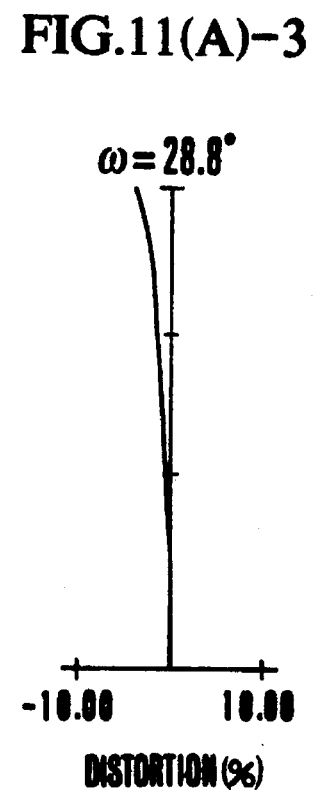
Figures 1, 11B:
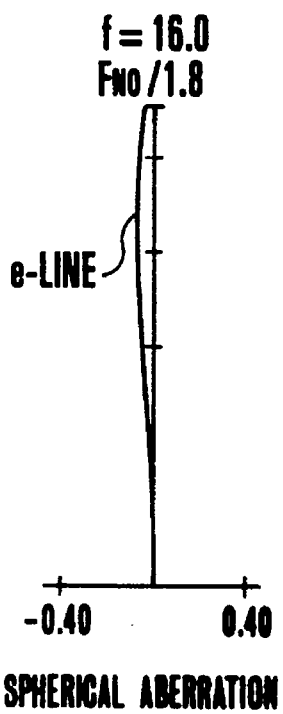
Figures 2, 11B:
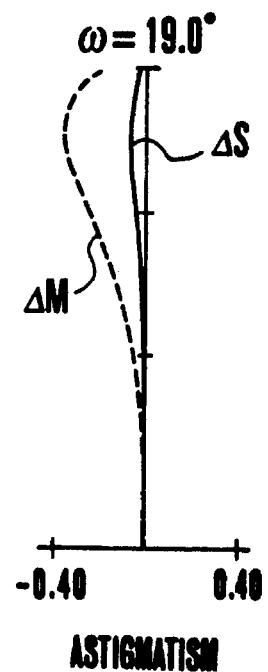
Figures 3, 11B:
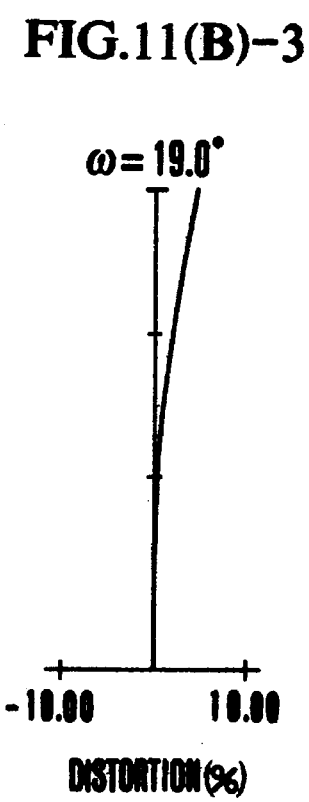
Figures 1, 11C:
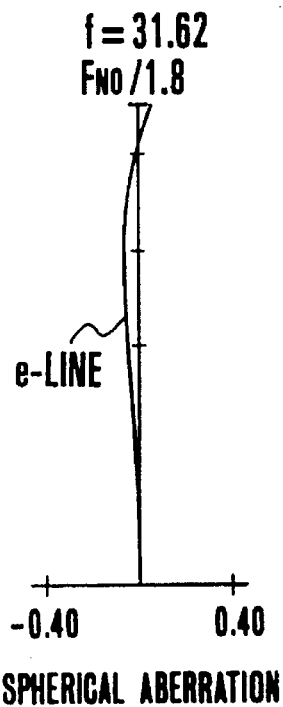
Figures 2, 11C:
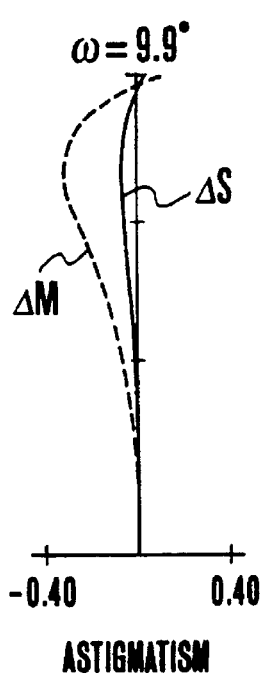
Figures 3, 11C:
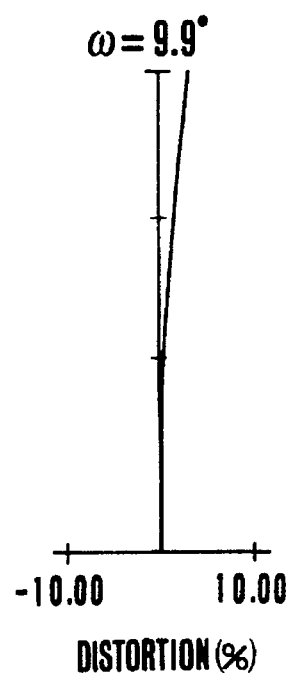
Figures 1, 11D:
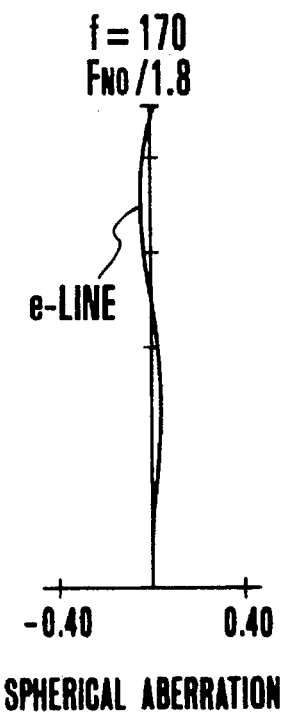
Figures 2, 11D:
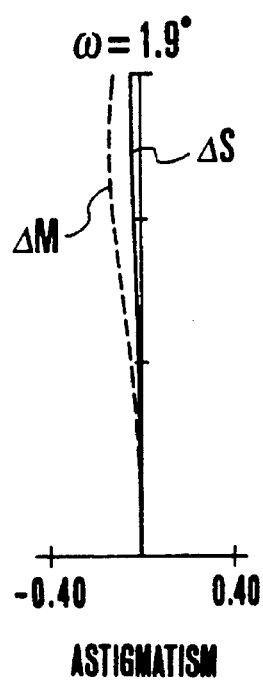
Figures 3, 11D:
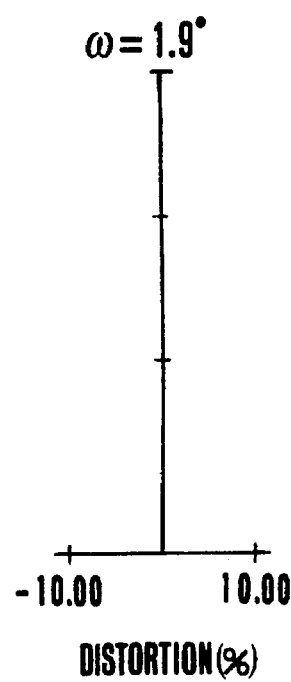
Figures 1, 11E:
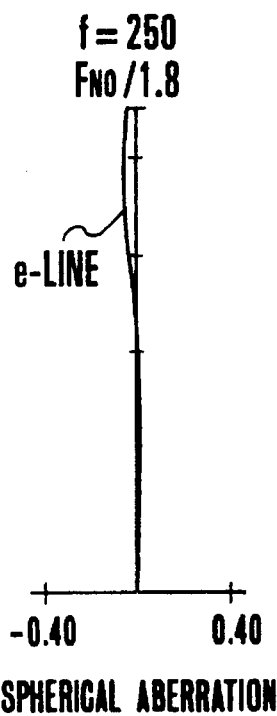
Figures 2, 11E:
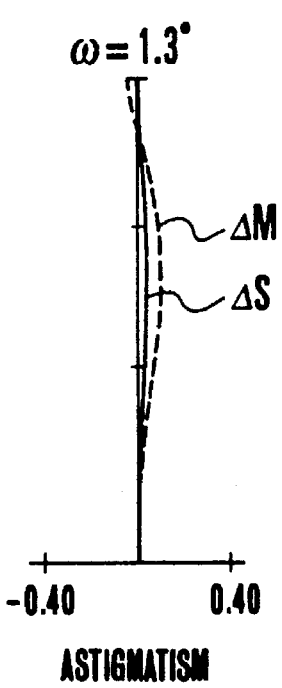
Figures 3, 11E:
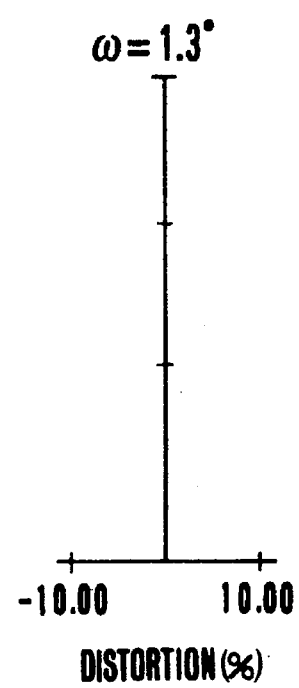
Figures 1, 12A:
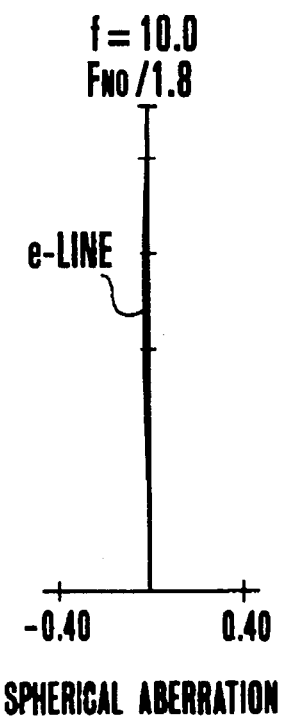
FIGS. 12(A) to 12(E) are aberration curves of the numerical example 4.
Figures 2, 12A:
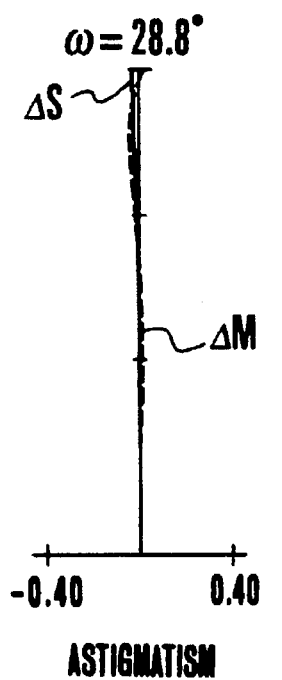
Figures 3, 12A:
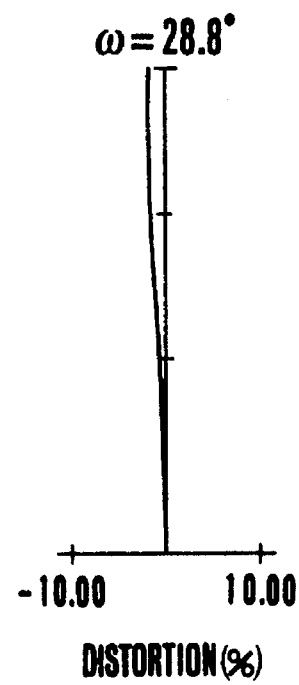
Figures 1, 12B:
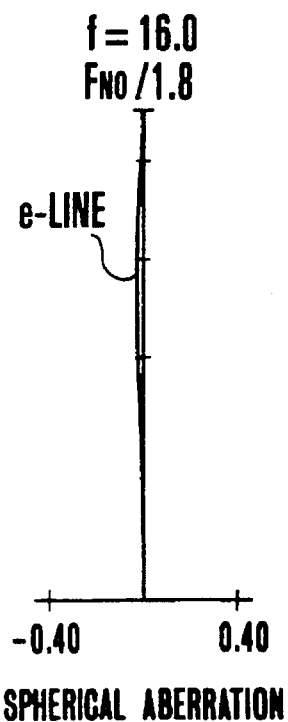
Figures 2, 12B:
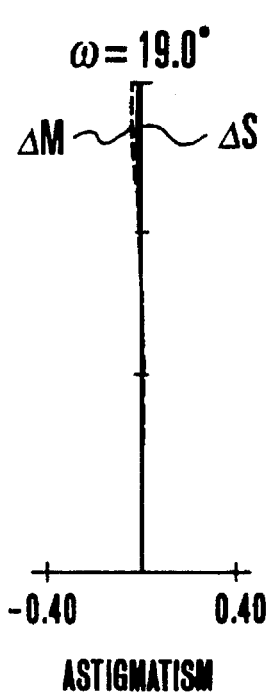
Figures 3, 12B:
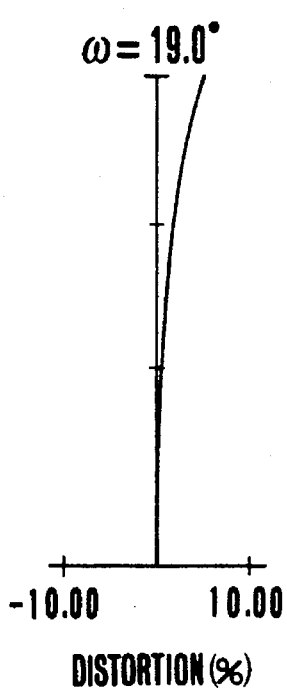
Figures 1, 12C:
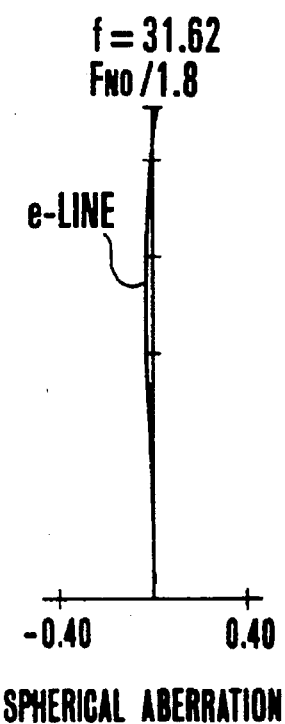
Figures 2, 12C:
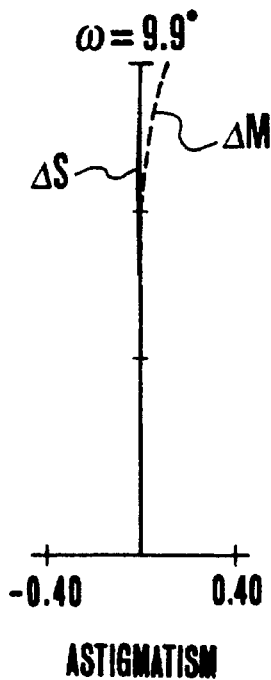
Figures 3, 12C:
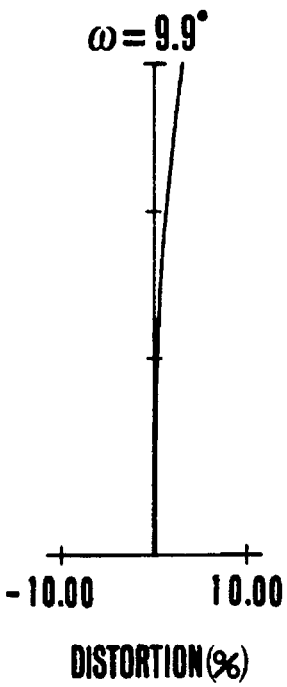
Figures 1, 12D:
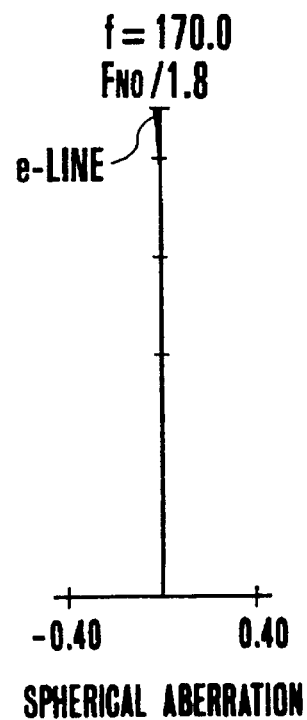
Figures 2, 12D:
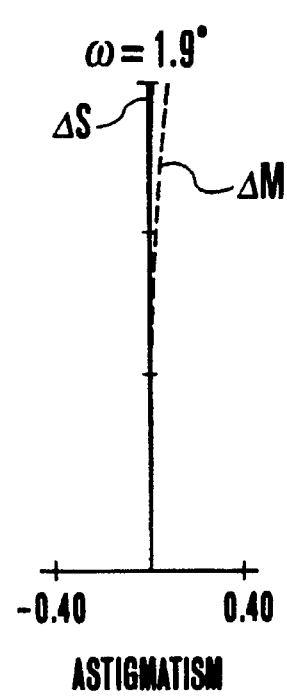
Figures 3, 12D:
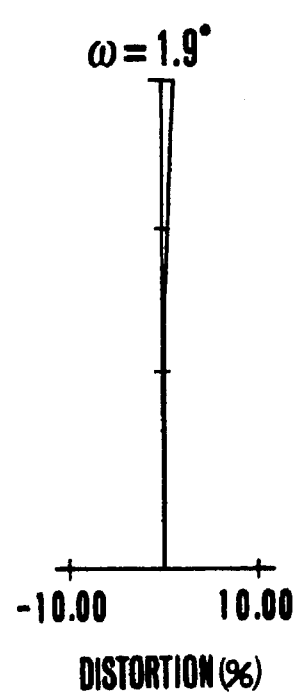
Figures 1, 12E:
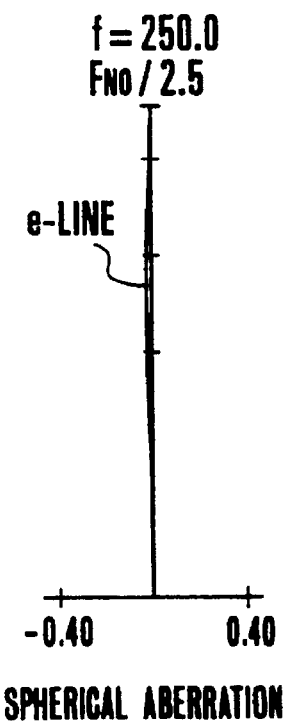
Figures 2, 12E:
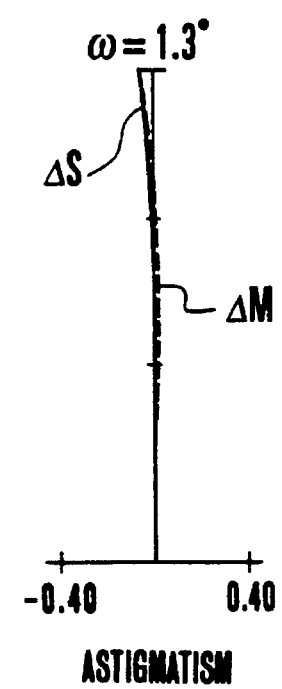
Figures 3, 12E:
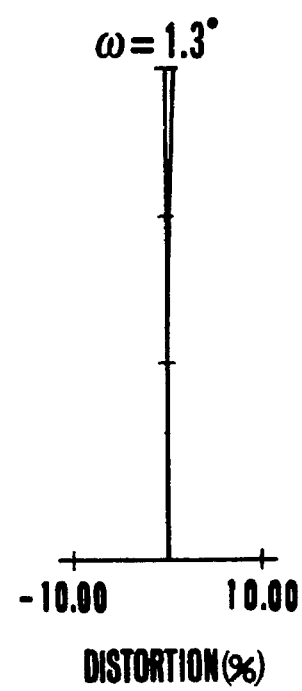
Figures 1, 13A:
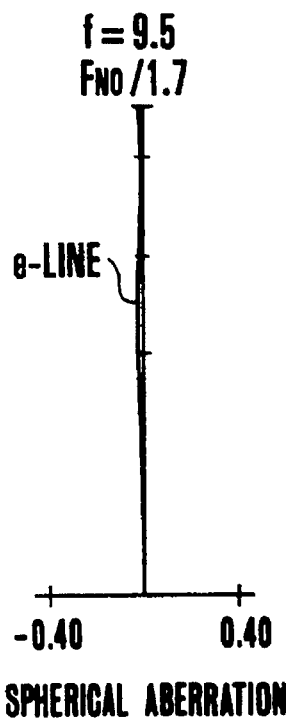
FIGS. 13(A) to 13(E) are aberration curves of the numerical example 5.
Figures 2, 13A:
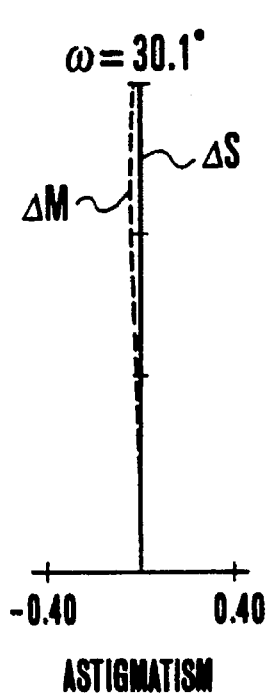
Figures 3, 13A:
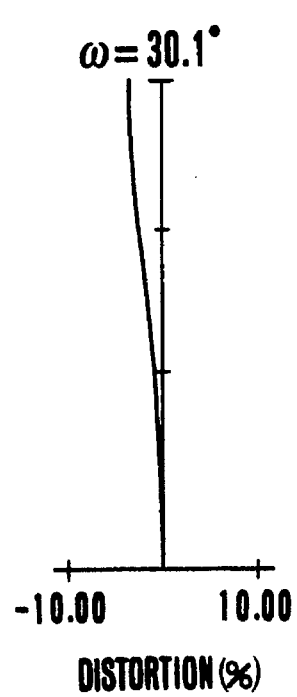
Figures 1, 13B:
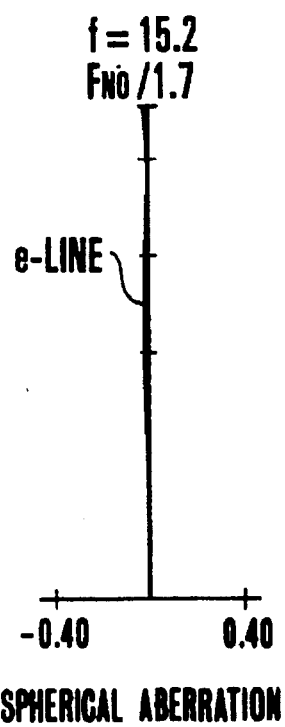
Figures 2, 13B:
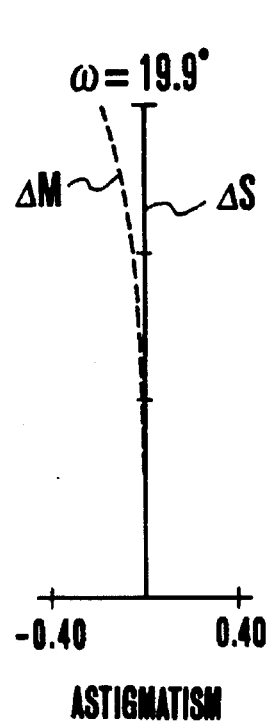
Figures 3, 13B:
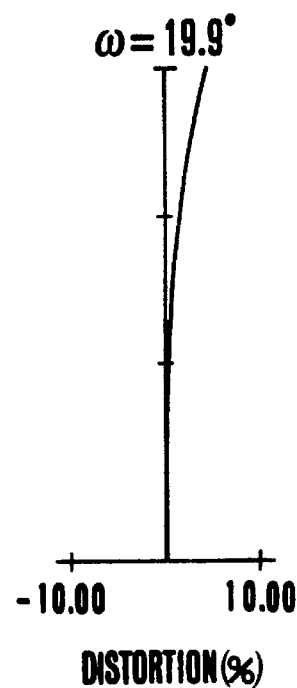
Figures 1, 13C:
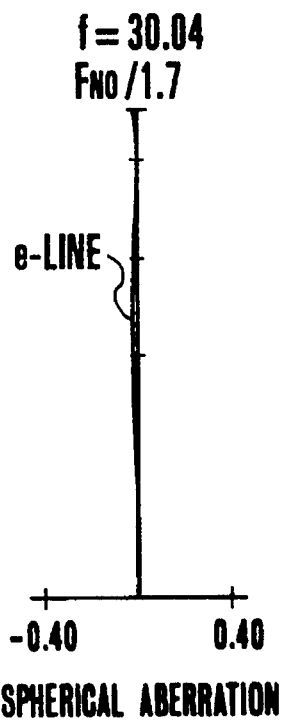
Figures 2, 13C:
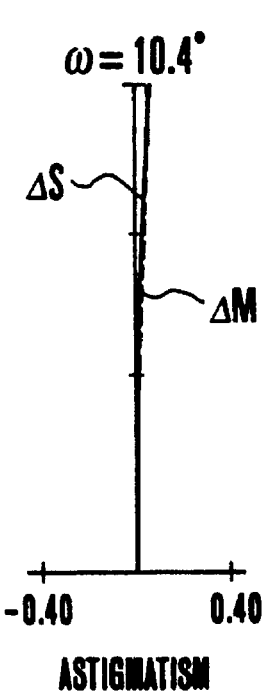
Figures 3, 13C:
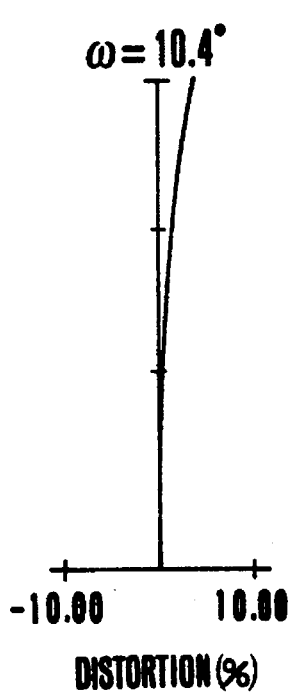
Figures 1, 13D:
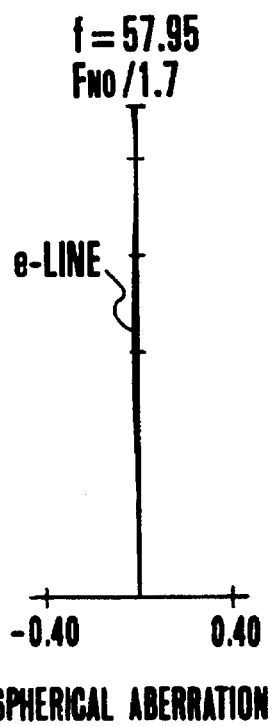
Figures 2, 13D:
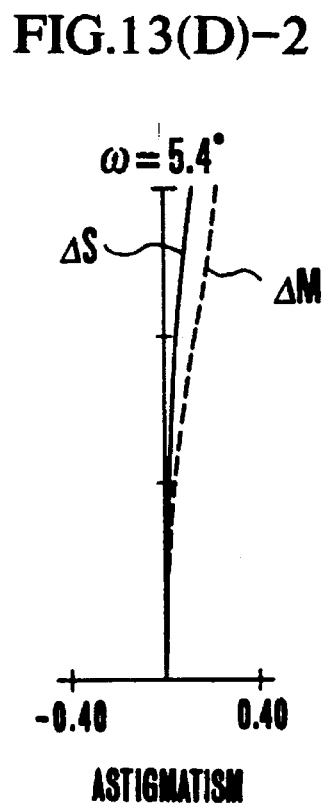
Figures 3, 13D:
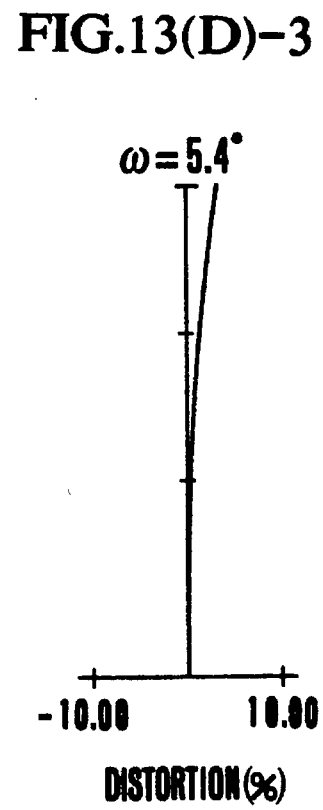
Figures 1, 13E:
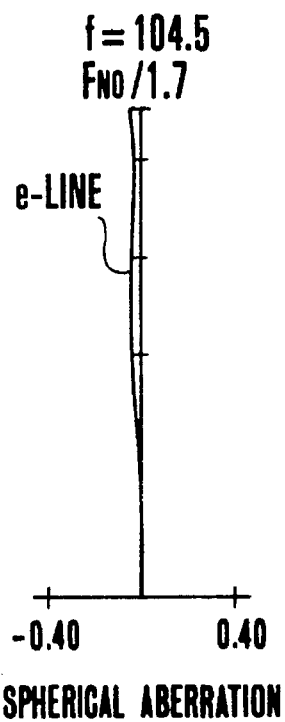
Figures 2, 13E:
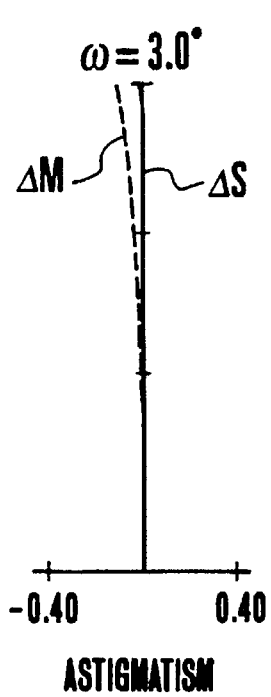
Figures 3, 13E:
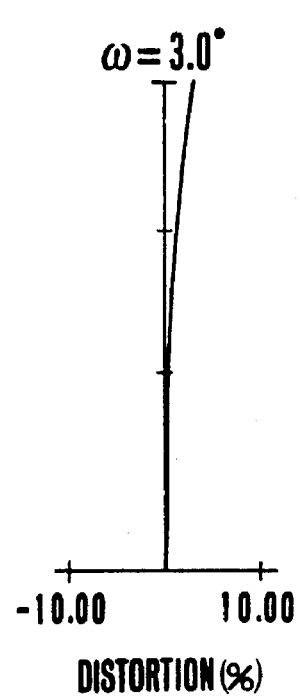
Figures 1, 14A:
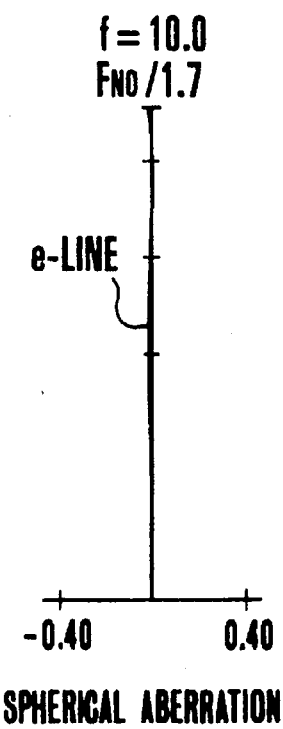
FIGS. 14(A) to 14(E) are aberration curves of the numerical example 6.
Figures 2, 14A:
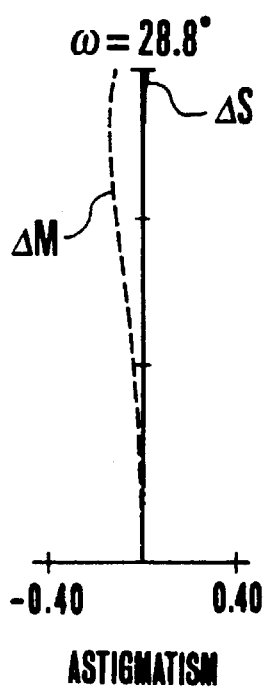
Figures 3, 14A:
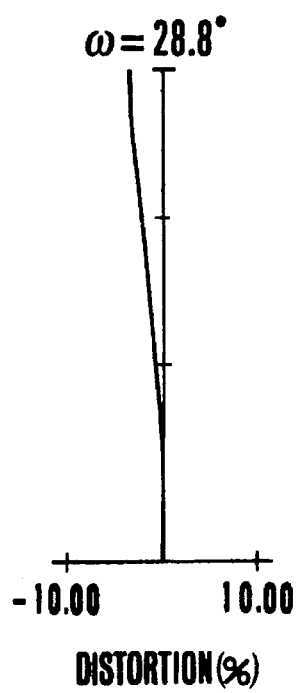
Figures 1, 14B:
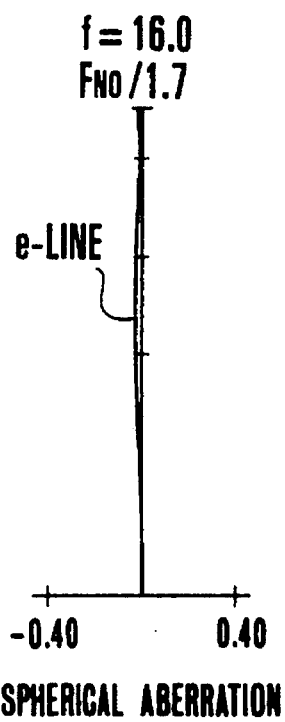
Figures 2, 14B:
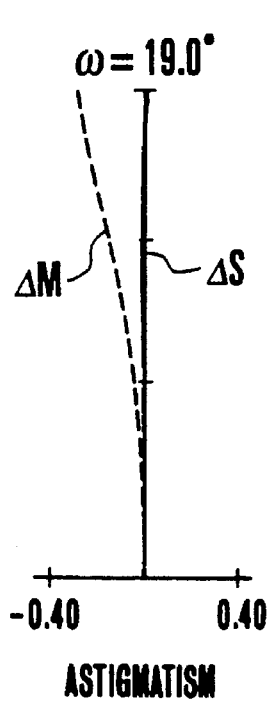
Figures 3, 14B:
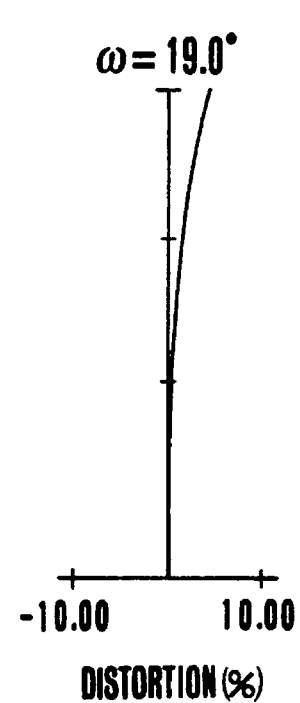
Figures 1, 14C:
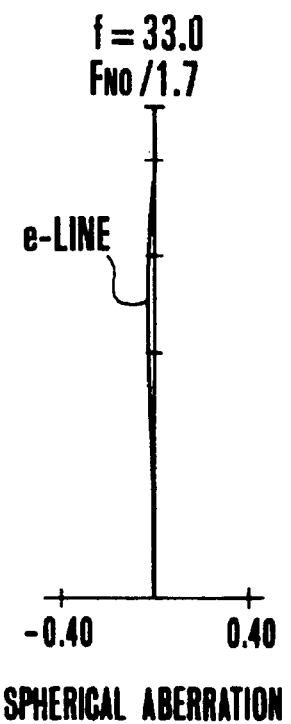
Figures 2, 14C:
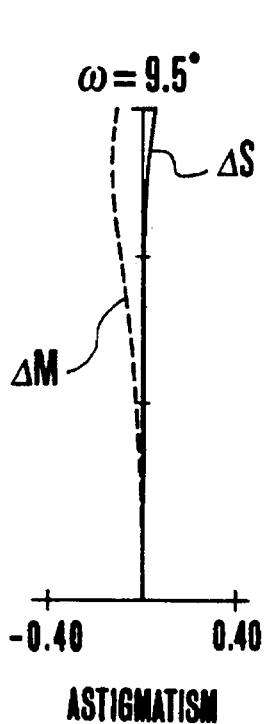
Figures 3, 14C:
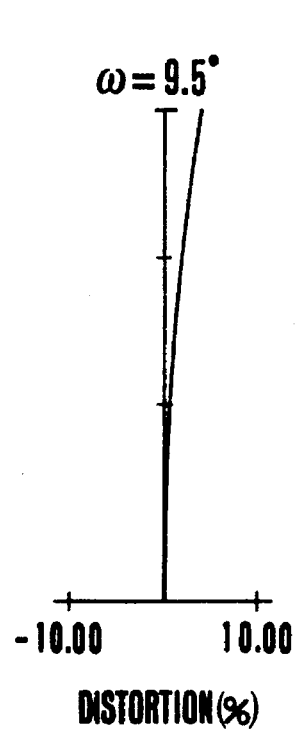
Figures 1, 14D:
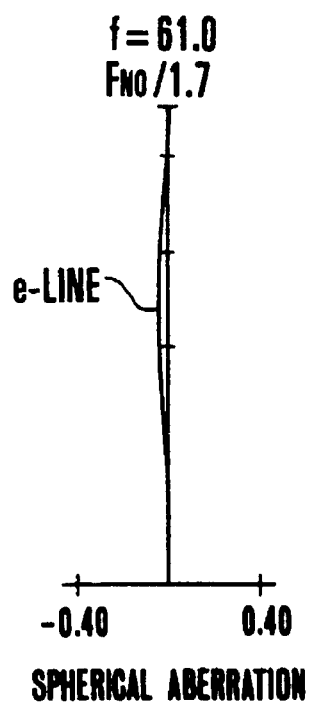
Figures 2, 14D:
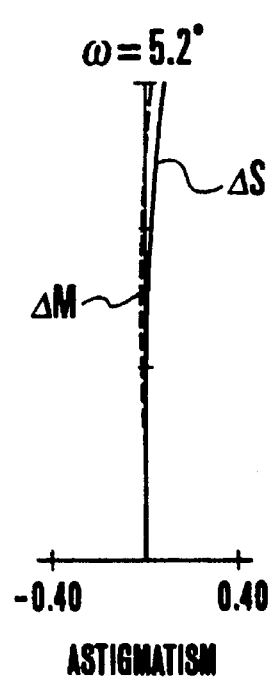
Figures 3, 14D:
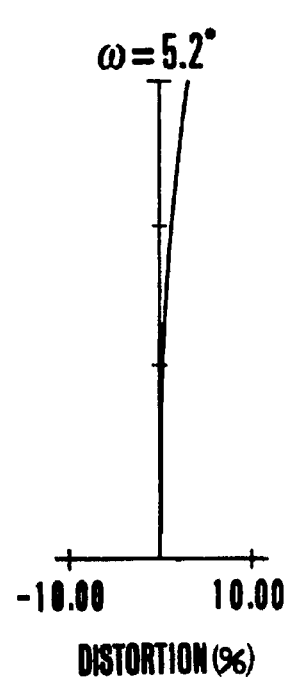
Figures 1, 14E:
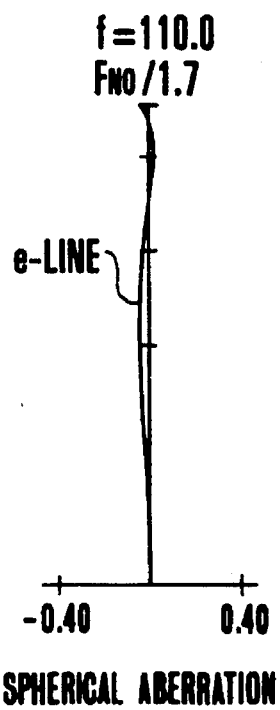
Figures 2, 14E:
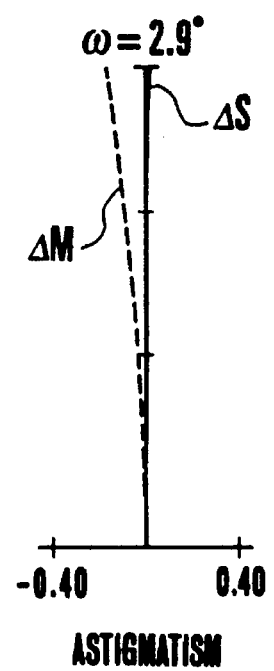
Figures 3, 14E:
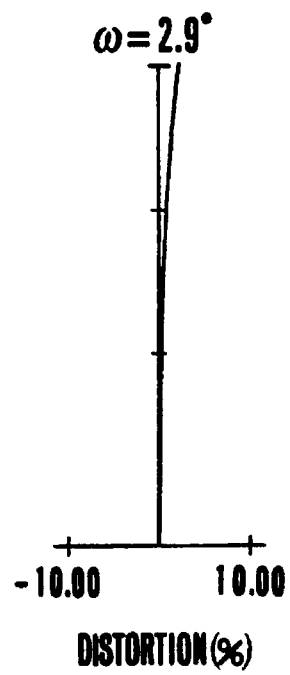
Figures 1, 15A:
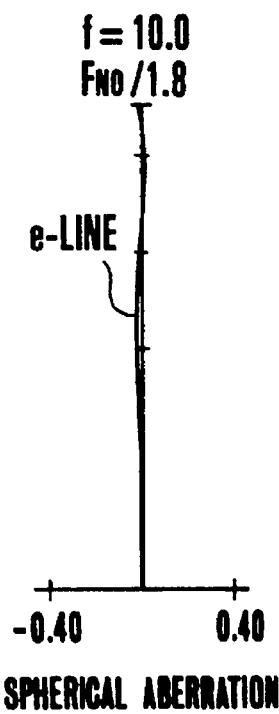
FIGS. 15(A) to 15(E) are aberration curves of the numerical example 7.
Figures 2, 15A:
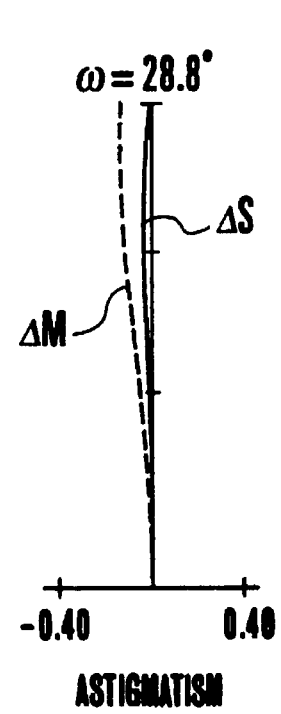
Figures 3, 15A:
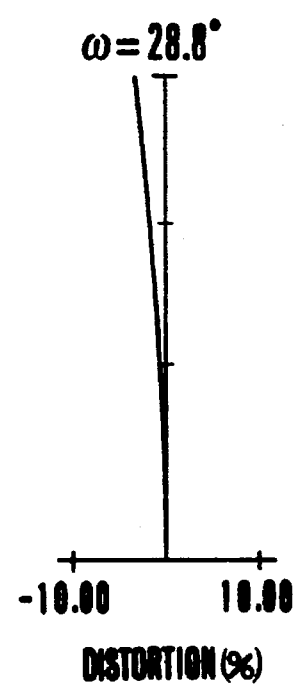
Figures 1, 15B:
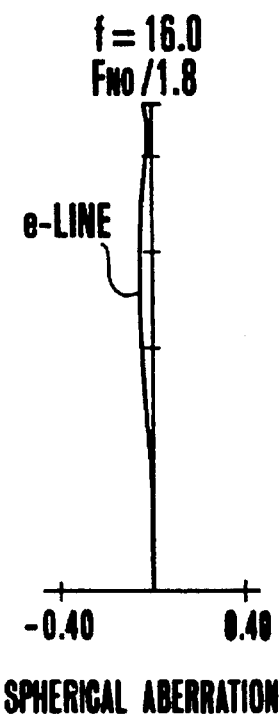
Figures 2, 15B:
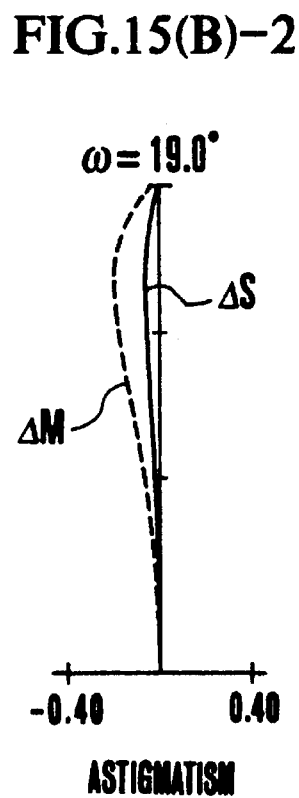
Figures 3, 15B:
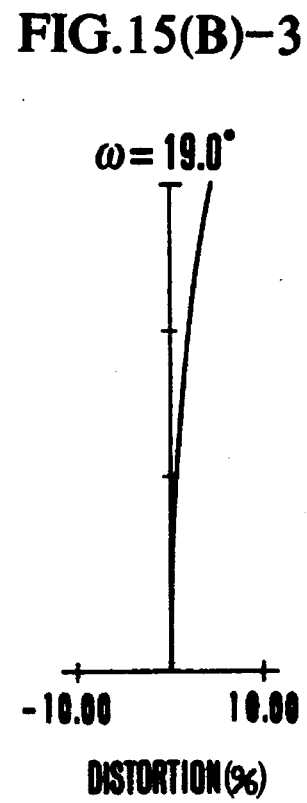
Figures 1, 15C:
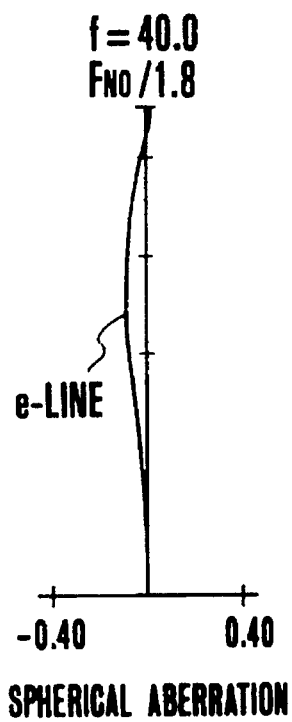
Figures 2, 15C:
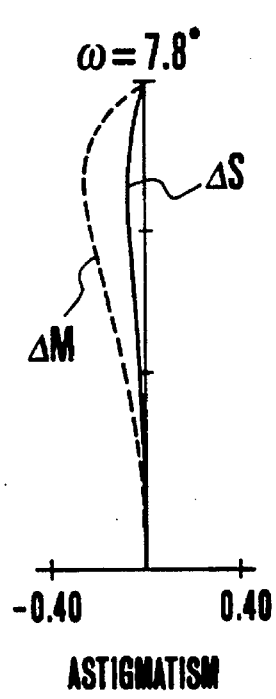
Figures 3, 15C:
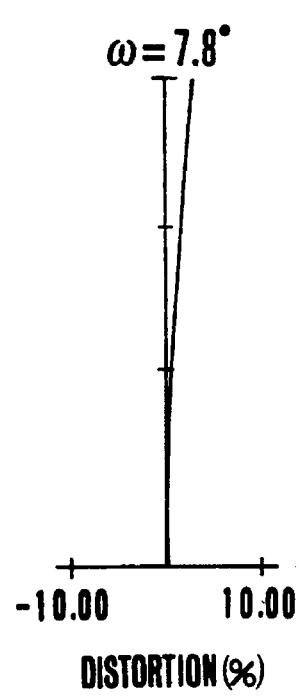
Figures 1, 15D:
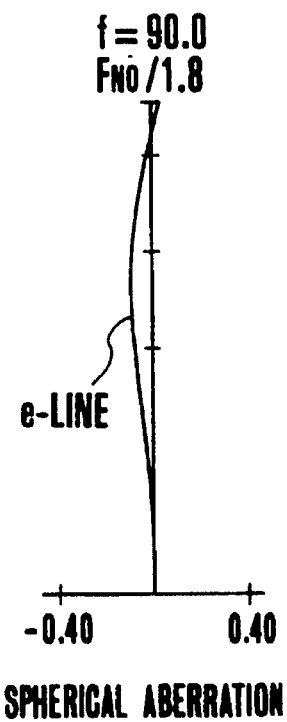
Figures 2, 15D:
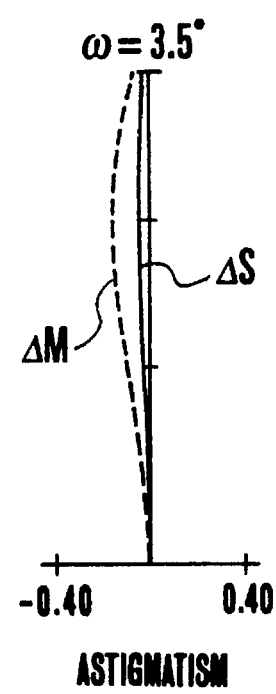
Figures 3, 15D:
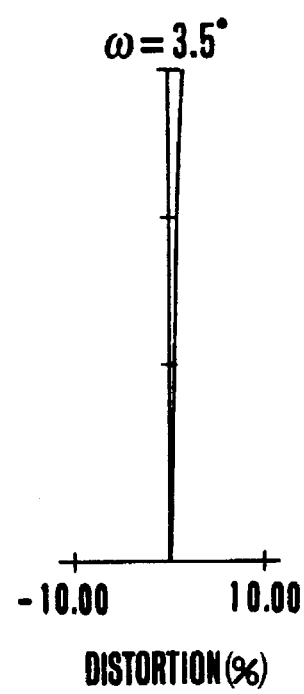
Figures 1, 15E:
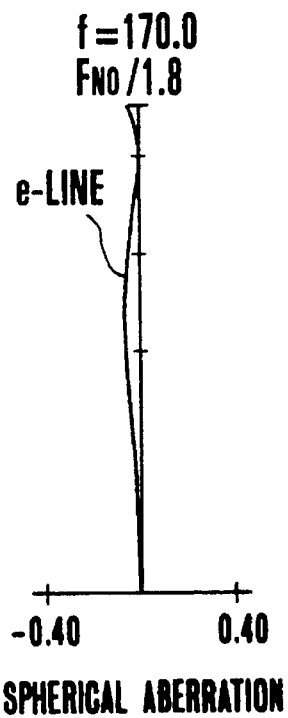
Figures 2, 15E:
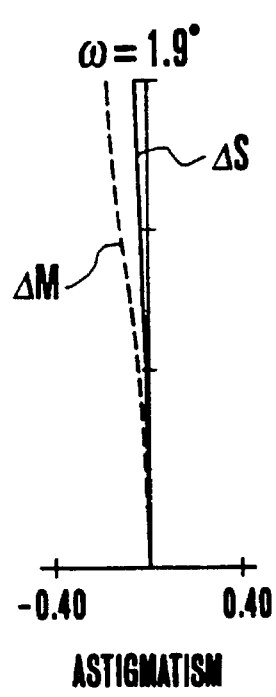
Figures 3, 15E:
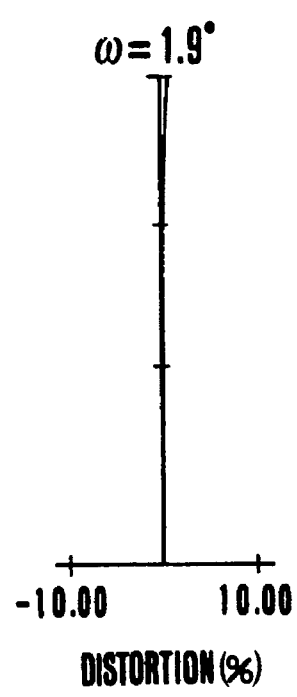
Figures 1, 16A:
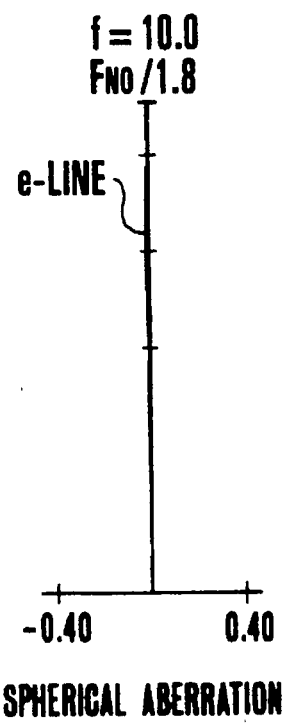
FIGS. 16(A) to 16(E) are aberration curves of the numerical example 8.
Figures 2, 16A:
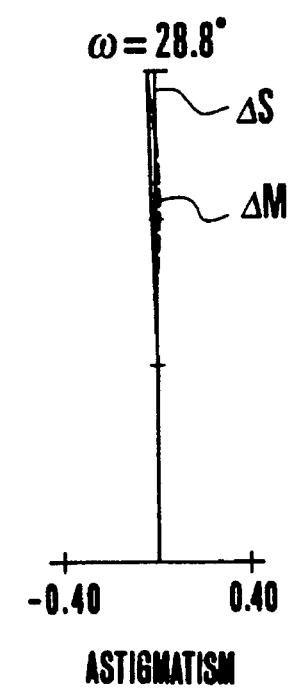
Figures 3, 16A:
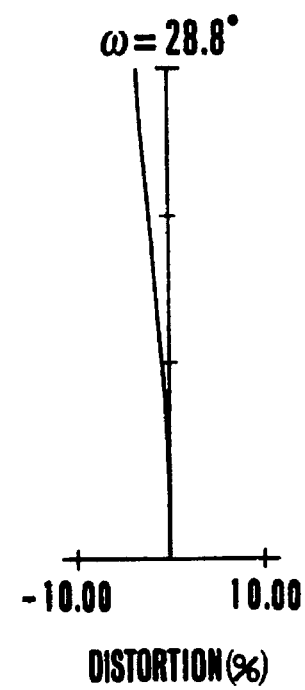
Figures 1, 16B:
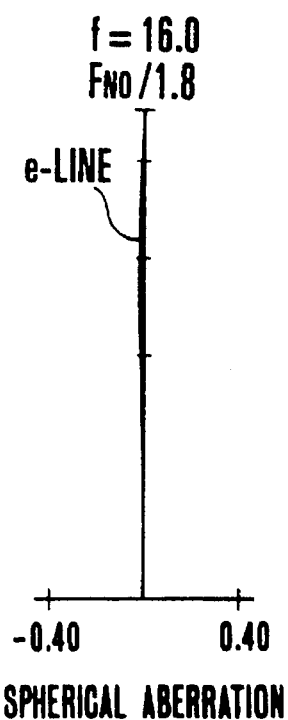
Figures 2, 16B:
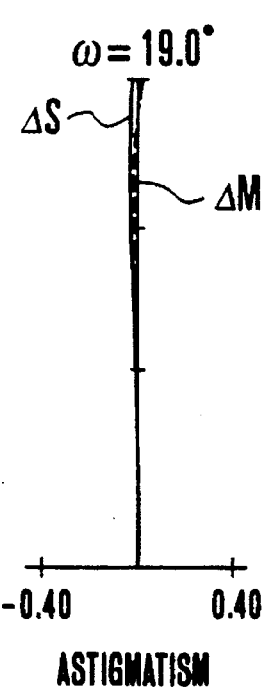
Figures 3, 16B:
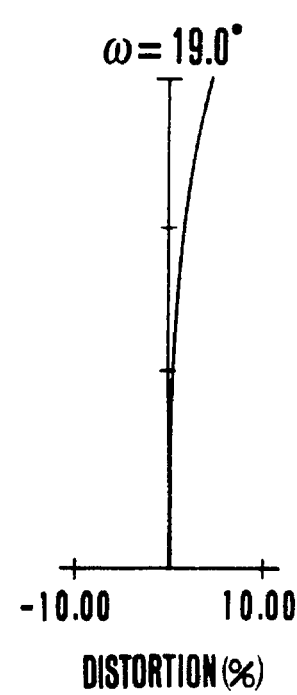
Figures 1, 16C:
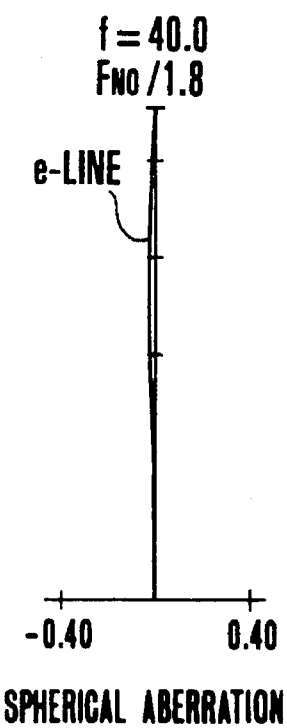
Figures 2, 16C:
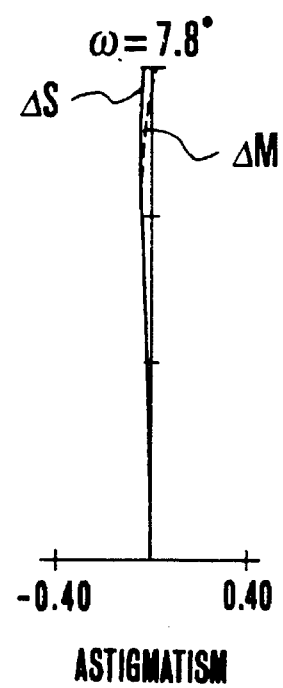
Figures 3, 16C:
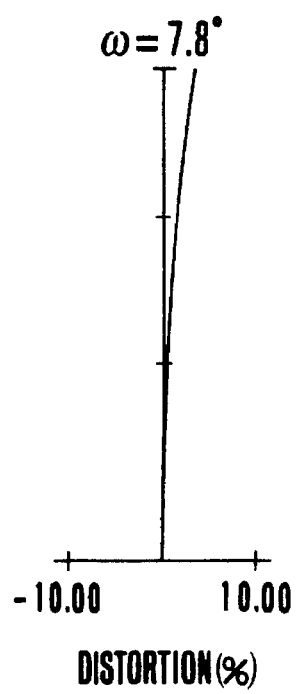
Figures 1, 16D:
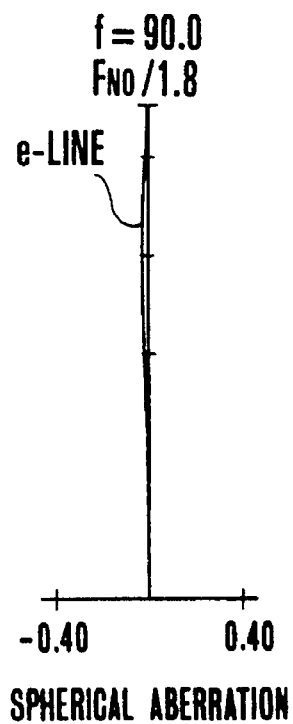
Figures 2, 16D:
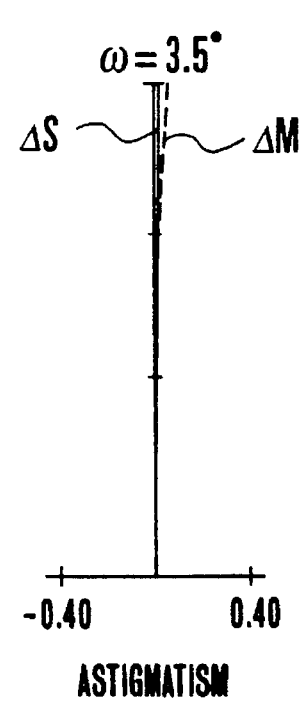
Figures 3, 16D:
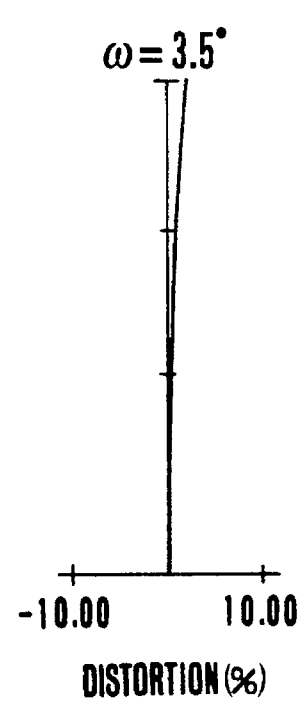
Figures 1, 16E:
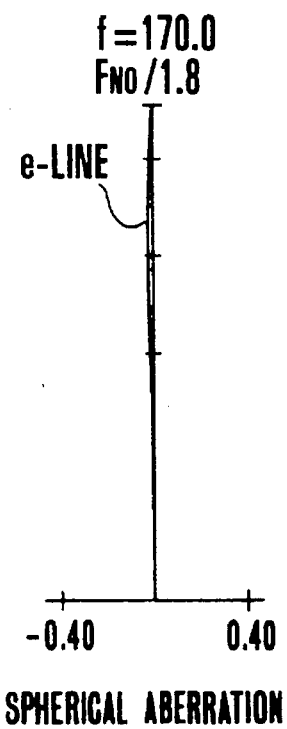
Figures 2, 16E:
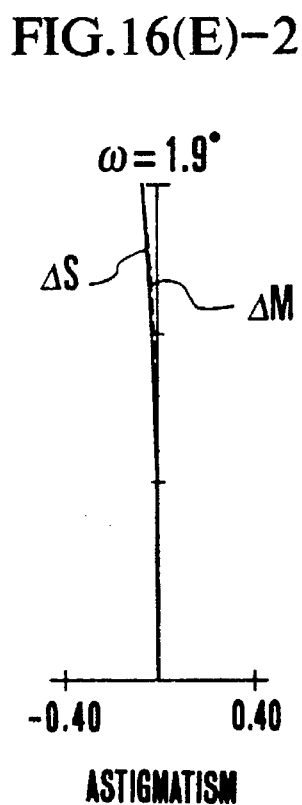
Figures 3, 16E:
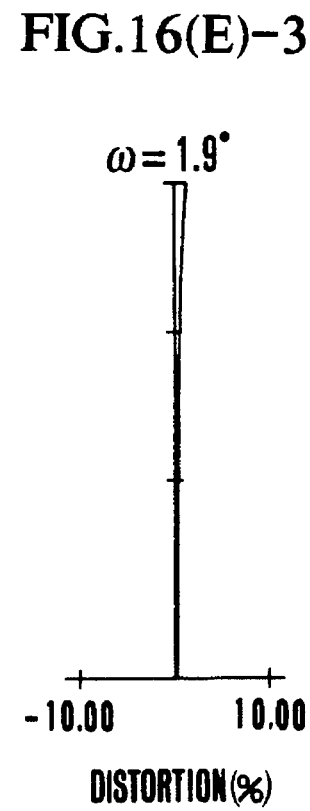
Figure 17:
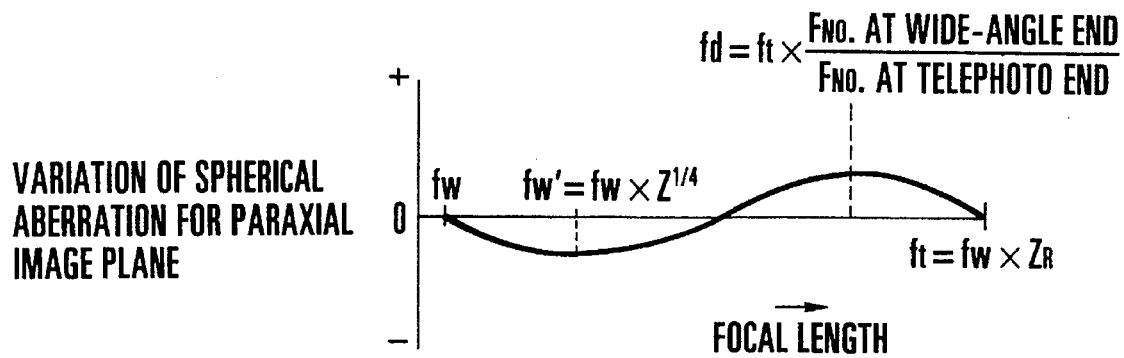
FIG. 17 is a diagram used to explain the variation of aberration of the zoom lens with zooming.
Figure 18:
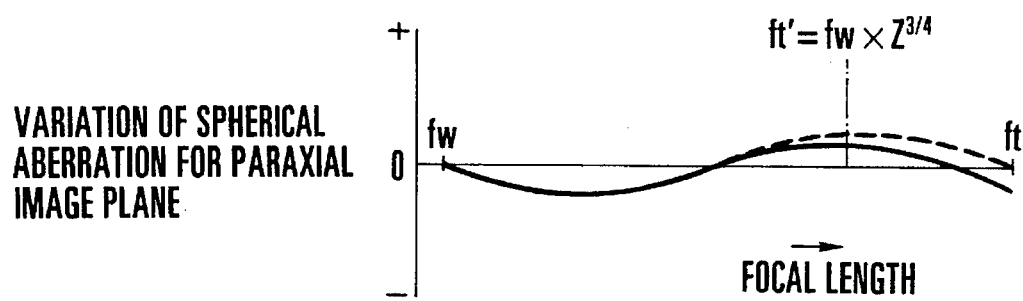
FIG. 18 is a diagram used to explain the variation of aberration of the zoom lens with zooming.

The numerical example 8 shown in FIG. 8 has a zoom ratio of 17. A front lens unit F for focusing has a positive refractive power with R1 to R8. A variator V of R9 to R15 moves toward the image side monotonously to vary the focal length from the wide-angle end to the telephoto end. A compensator C of R16 to R18 has a negative refractive power. To compensate for the image shift with zooming, the compensator C moves axially while depicting a locus convex toward the object side as zooming goes from the wide-angle end to the telephoto end. SP (R19) stands for a stop. A relay lens unit R of R20 to R36 has the image forming function. R37 and R38 define a glass block equivalent to a color separation prism.

In the numerical example 8, as an indicator of increase of the aperture ratio, the F-number $F_{NO.1}$ of the front lens-unit F is defined by $F_{NO.1}=f1/(ft/F_{NO.t})$. Then, $F_{NO.1}=1.59$. With this value of F-number of the front lens unit F When sustained over the entire zooming range, as the F-number $F_{NO.2}$ of the variator V is defined by $F_{NO.2}=f2/(2 \times h2m)$, it gives as large an aperture ratio as $F_{NO.2}=1.22$.

For these large values of the aperture ratio, the front lens unit F is constructed with four lenses of minus-plus-plus-plus power arrangement in this order from the front. By the negative lens, spherical aberration is diverged, permitting the front lens unit F to suppress the spherical aberration from increasing in itself. The variator V is constructed with four lenses of minus-minus-minus-plus power arrangement in this order from the object side. By the positive lens, the spherical aberration is converged, causing the variator V to suppress the spherical aberration from increasing in itself.

The lateral magnification β2w for the wide-angle end of the variator V is, because of the zoom ratio being rather as large as 17, taken somewhat small in the absolute sense at β2w=−0.215.

The aspheric sphere is applied to the surface R15 and the condition (2-4) has its factor getting ht/hz=1.226. The aspheric surface is so oriented that the positive refractive power gets progressively weaker as the height of incidence of the axial light beam increases. To correct spherical aberration with good efficiency even in up to higher terms, the aspheric coefficients D and E only are in use, so that chief aberration correction is made on spherical aberration. Such an aspheric surface deviates 1.08 μm at the highest height of incidence of the axial light beam.

The spherical aberration, astigmatism and distortion of the numerical example 8 in five zooming positions are shown in FIGS. 16(A) to 16(E), respectively.

Next, the numerical data for the above-mentioned examples 1 to 8 of the invention are shown, where Ri is the radius of curvature of the i-th lens surface when counted from the object side, Di is the i-th axial lens thickness or air separation when counted from the object side, and Ni and vi are respectively the refractive index and Abbe number of the glass of the i-th lens element when counted from the object side.

The shape of the aspheric surface is expressed in the coordinates with an X axis in the axial direction and an H axis in the direction perpendicular to the optical axis, the direction in which light advances being taken as positive, by the following equation:

$$X = (1/R)H^2 / (1 + \sqrt{1 - (H/R)^2}) + AH^2 + BH^4 + CH^6 + DH^8 + EH^{10}$$

where R is the radius of the osculating sphere, and A, B, C, D and E are the aspheric coefficients.

Numerical Example 1
f = 9.5–123.5  Fno = 1:1.7–2.05  2ω = 60.1°–5.10°

| | | | |
|---|---|---|---|
| R1 = 1325.19 | D1 = 2.50 | N1 = 1.81265 | v1 = 25.4 |
| R2 = 106.20 | D2 = 3.74 | | |
| R3 = 202.27 | D3 = 9.23 | N2 = 1.43496 | v2 = 95.1 |
| R4 = −140.90 | D4 = 0.15 | | |
| R5 = 79.68 | D5 = 10.83 | N3 = 1.49845 | v3 = 81.6 |
| R6 = −208.30 | D6 = 0.15 | | |
| R7 = 49.78 | D7 = 6.74 | N4 = 1.69979 | v4 = 55.5 |
| R8 = 101.55 | D8 = Variable | | |
| R9 = 117.03 | D9 = 1.00 | N5 = 1.88814 | v5 = 40.8 |
| R10 = 21.59 | D10 = 4.03 | | |
| R11 = −90.56 | D11 = 0.80 | N6 = 1.80811 | v6 = 46.6 |
| R12 = 86.01 | D12 = 4.16 | | |
| R13 = −19.32 | D13 = 0.80 | N7 = 1.77621 | v7 = 49.6 |
| R14 = 54.23 | D14 = 4.42 | N8 = 1.85501 | v8 = 23.9 |
| *R15 = −31.98 | D15 = Variable | | |
| R16 = −28.47 | D16 = 0.90 | N9 = 1.77621 | v9 = 49.6 |

| | | | |
|---|---|---|---|
| R17 = 47.68 | D17 = 3.35 | N10 = 1.81265 | ν10 = 25.4 |
| R18 = −323.10 | D18 = Variable | | |
| R19 = (Stop) | D19 = 1.97 | | |
| R20 = 143.46 | D20 = 5.63 | N11 = 1.72794 | ν11 = 38.0 |
| R21 = −31.98 | D21 = 0.10 | | |
| R22 = 84.13 | D22 = 6.57 | N12 = 1.50014 | ν12 = 65.0 |
| R23 = −25.30 | D23 = 1.40 | N13 = 1.88814 | ν13 = 40.8 |
| R24 = −262.85 | D24 = 0.10 | | |
| R25 = 50.79 | D25 = 7.89 | N14 = 1.51356 | ν14 = 51.0 |
| R26 = −23.63 | D26 = 1.50 | N15 = 1.80811 | ν15 = 46.6 |
| R27 = 89.14 | D27 = 20.14 | | |
| R28 = 179.23 | D28 = 8.06 | N16 = 1.48915 | ν16 = 70.2 |
| R29 = −34.74 | D29 = 0.15 | | |
| R30 = −489.23 | D30 = 1.50 | N17 = 1.83932 | ν17 = 37.2 |
| R31 = 35.12 | D31 = 7.02 | N18 = 1.48915 | ν18 = 70.2 |
| R32 = −156.54 | D32 = 0.15 | | |
| R33 = 201.01 | D33 = 6.82 | N19 = 1.51314 | ν19 = 60.5 |
| R34 = −39.76 | D34 = 1.40 | N20 = 1.83932 | ν20 = 37.2 |
| R35 = −57.60 | D35 = 0.15 | | |
| R36 = 51.20 | D36 = 5.29 | N21 = 1.48915 | ν21 = 70.2 |
| R37 = −242.74 | D37 = 3.40 | | |
| R38 = ∞ | D38 = 55.50 | N22 = 1.51825 | ν22 = 64.2 |
| R39 = ∞ | | | |

*Aspheric Surface

| Variable | Focal Length | | | | |
|---|---|---|---|---|---|
| Separation | 9.50 | 15.20 | 34.20 | 102.41 | 123.50 |
| D8 | 0.80 | 13.33 | 28.62 | 40.37 | 41.46 |
| D15 | 34.37 | 19.86 | 3.07 | 0.88 | 3.16 |
| D18 | 10.50 | 12.48 | 13.99 | 4.42 | 1.06 |

Shape of Asheric Surface

| Osculating Sphere: R = −31.983 | Parameter |
|---|---|
| Aspheric Coefficients | Z = 13 |
| A = B = C = 0 | $F_{NO.1} = 1.08$ |
| D = −5.030 × 10⁻¹¹ | $F_{NO.2} = 0.890$ |
| E = 3.197 × 10⁻¹³ | β2w = −0.381 |
| | hm/ht = 1.10 |

| Aspheric Amount | h | Δ |
|---|---|---|
| 0.7 | (6.3 mm) | −0.09 μm |
| 0.9 | (8.1 mm) | −0.54 μm |
| 1.0 | (9.0 mm) | −1.05 μm |

Numerical Example 2
f = 9.5–133.0  Fno = 1:1.7–2.05  2ω = 60.1°–4.74°

| | | | |
|---|---|---|---|
| R1 = 1703.75 | D1 = 2.50 | N1 = 1.81265 | ν1 = 25.4 |
| R2 = 106.53 | D2 = 6.44 | | |
| R3 = 763.82 | D3 = 8.23 | N2 = 1.43496 | ν2 = 95.1 |
| R4 = −122.79 | D4 = 0.15 | | |
| R5 = 92.73 | D5 = 13.31 | N3 = 1.49845 | ν3 = 81.6 |
| R6 = −146.48 | D6 = 0.15 | | |
| R7 = 48.60 | D7 = 7.20 | N4 = 1.69979 | ν4 = 55.5 |
| R8 = 91.04 | D8 = Variable | | |
| R9 = 115.10 | D9 = 1.00 | N5 = 1.88814 | ν5 = 40.8 |
| R10 = 18.70 | D10 = 3.64 | | |
| R11 = −56.81 | D11 = 0.80 | N6 = 1.80811 | ν6 = 46.6 |
| R12 = 98.00 | D12 = 4.04 | | |
| *R13 = −14.32 | D13 = 0.80 | N7 = 1.77621 | ν7 = 49.6 |
| R14 = 138.11 | D14 = 4.74 | N8 = 1.85501 | ν8 = 23.9 |
| R15 = −23.37 | D15 = Variable | | |
| R16 = −31.46 | D16 = 0.90 | N9 = 1.77621 | ν9 = 49.6 |
| R17 = 40.12 | D17 = 4.27 | N10 = 1.85501 | ν10 = 23.9 |
| R18 = 1585.12 | D18 = Variable | | |
| R19 = (Stop) | D19 = 1.81 | | |
| R20 = −518.14 | D20 = 5.19 | N11 = 1.72794 | ν11 = 38.0 |
| R21 = −36.89 | D21 = 0.10 | | |
| R22 = 94.66 | D22 = 7.82 | N12 = 1.50014 | ν12 = 65.0 |
| R23 = −30.42 | D23 = 1.40 | N13 = 1.88814 | ν13 = 40.8 |
| R24 = −101.62 | D24 = 0.10 | | |
| R25 = 39.37 | D25 = 10.42 | N14 = 1.51356 | ν14 = 51.0 |
| R26 = −33.16 | D26 = 1.50 | N15 = 1.80811 | ν15 = 46.6 |
| R27 = 277.25 | D27 = 13.95 | | |
| R28 = 1015.97 | D28 = 7.37 | N16 = 1.48915 | ν16 = 70.2 |
| R29 = −41.90 | D29 = 0.15 | | |
| R30 = 68.12 | D30 = 1.50 | N17 = 1.83932 | ν17 = 37.2 |
| R31 = 24.32 | D31 = 8.68 | N18 = 1.48915 | ν18 = 70.2 |
| R32 = −1018.30 | D32 = 0.15 | | |
| R33 = 101.48 | D33 = 6.81 | N19 = 1.51314 | ν19 = 60.5 |
| R34 = −39.46 | D34 = 1.40 | N20 = 1.83932 | ν20 = 37.2 |
| R35 = −1105.61 | D35 = 0.15 | | |
| R36 = 56.41 | D36 = 6.45 | N21 = 1.48915 | ν21 = 70.2 |
| R37 = −66.16 | D37 = 3.40 | | |
| R38 = ∞ | D38 = 55.50 | N22 = 1.51825 | ν22 = 64.2 |
| R39 = ∞ | | | |

*Aspheric Surface

| Variable | Focal Length | | | | |
|---|---|---|---|---|---|
| Separation | 9.50 | 15.20 | 35.15 | 110.58 | 133.00 |
| D8 | 1.97 | 16.12 | 33.51 | 46.77 | 48.05 |
| D15 | 47.43 | 31.07 | 10.57 | 1.00 | 1.85 |
| D18 | 1.50 | 3.71 | 6.81 | 3.13 | 0.99 |

Shape of Asheric Surface

| Osculating Sphere: R = −14.328 | Parameter |
|---|---|
| Aspheric Coefficients | Z = 14 |
| A = B = C = 0 | $F_{NO.1} = 1.06$ |
| D = 9.659 × 10⁻¹⁰ | $F_{NO.2} = 0.679$ |
| E = −6.497 × 10⁻¹² | β2w = −0.273 |
| | hm/ht = 1.09 |

| Aspheric Amount | h | Δ |
|---|---|---|
| 0.7 | (5.67 mm) | 0.81 μm |
| 0.9 | (7.29 mm) | 4.95 μm |
| 1.0 | (8.10 mm) | 10.00 μm |

Numerical Example 3
f = 10.0–250  Fno = 1:1.8–2.5  2ω = 57.6°–2.52°

| | | | |
|---|---|---|---|
| R1 = 242.57 | D1 = 2.50 | N1 = 1.81265 | ν1 = 25.4 |
| R2 = 126.54 | D2 = 10.14 | | |
| R3 = 852.19 | D3 = 7.62 | N2 = 1.43496 | ν2 = 95.1 |
| R4 = −341.40 | D4 = 0.15 | | |
| R5 = 119.29 | D5 = 17.31 | N3 = 1.49845 | ν3 = 81.6 |
| R6 = −346.13 | D6 = 0.15 | | |
| R7 = 82.75 | D7 = 4.95 | N4 = 1.69979 | ν4 = 55.5 |
| R8 = 98.90 | D8 = Variable | | |
| R9 = 51.58 | D9 = 1.00 | N5 = 1.88814 | ν5 = 40.8 |
| R10 = 20.17 | D10 = 5.39 | | |
| R11 = −904.89 | D11 = 0.80 | N6 = 1.80811 | ν6 = 46.6 |
| *R12 = −1554.33 | D12 = 3.86 | | |
| R13 = −24.45 | D13 = 0.80 | N7 = 1.77621 | ν7 = 49.6 |
| R14 = 22.22 | D14 = 7.26 | N8 = 1.85501 | ν8 = 23.9 |
| R15 = −90.83 | D15 = Variable | | |
| R16 = −43.28 | D16 = 0.90 | N9 = 1.77621 | ν9 = 49.6 |
| R17 = 48.32 | D17 = 6.97 | N10 = 1.81265 | ν10 = 25.4 |
| R18 = −468.63 | D18 = Variable | | |
| R19 = (Stop) | D19 = 1.79 | | |
| R20 = −348.81 | D20 = 5.71 | N11 = 1.72794 | ν11 = 38.0 |
| R21 = −63.07 | D21 = 0.10 | | |
| R22 = 48.36 | D22 = 15.58 | N12 = 1.50014 | ν12 = 65.0 |
| R23 = −45.84 | D23 = 1.40 | N13 = 1.88814 | ν13 = 40.8 |
| R24 = −112.26 | D24 = 0.10 | | |
| R25 = 105.29 | D25 = 3.16 | N14 = 1.48915 | ν14 = 70.2 |
| R26 = 107.59 | D26 = 12.47 | | |
| R27 = 48.21 | D27 = 11.35 | N15 = 1.48915 | ν15 = 70.2 |
| R28 = −85.93 | D28 = 0.15 | | |
| R29 = −157.51 | D29 = 1.50 | N16 = 1.83932 | ν16 = 37.2 |
| R30 = 30.02 | D30 = 11.53 | N17 = 1.48915 | ν17 = 70.2 |
| R31 = −70.68 | D31 = 0.15 | | |
| R32 = 41.98 | D32 = 9.93 | N18 = 1.51314 | ν18 = 60.5 |
| R33 = −41.00 | D33 = 1.40 | N19 = 1.83932 | ν19 = 37.2 |
| R34 = 121.61 | D34 = 0.15 | | |
| R35 = 43.59 | D35 = 4.91 | N20 = 1.48915 | ν20 = 70.2 |

-continued

| | | | |
|---|---|---|---|
| R36 = 92.49 | D36 = 3.40 | | |
| R37 = ∞ | D37 = 55.50 | N21 = 1.51825 | v21 = 64.2 |
| R38 = ∞ | | | |

*Aspheric Surface

| Variable Separation | Focal Length | | | | |
|---|---|---|---|---|---|
| | 10.00 | 16.00 | 31.62 | 170.00 | 250.00 |
| D8 | 0.86 | 34.56 | 70.11 | 116.59 | 122.19 |
| D15 | 132.55 | 95.54 | 54.85 | 3.20 | 2.36 |
| D18 | 2.00 | 5.31 | 10.45 | 15.62 | 10.85 |

Shape of Asheric Surface

| | |
|---|---|
| Osculating Sphere: R = −1554.334 | Parameter |
| Aspheric Coefficients | Z = 25 |
| A = B = E = 0 | $F_{NO.1} = 1.60$ |
| C = −2.723 × 10$^{-8}$ | $F_{NO.2} = 0.868$ |
| D = 1.812 × 10$^{-10}$ | β2w = −0.163 |
| | hm/ht = 1.19 |

| Aspheric Amount | h | Δ |
|---|---|---|
| 0.7 | (7.21 mm) | −2.50 μm |
| 0.9 | (9.27 mm) | −7.39 μm |
| 1.0 | (10.30 mm) | −9.55 μm |

Numerical Example 4
f = 10.0–250  Fno = 1:1.8–2.5  2ω = 57.6°–2.52°

| | | | |
|---|---|---|---|
| R1 = 2410.58 | D1 = 2.50 | N1 = 1.81265 | v1 = 25.4 |
| R2 = 237.10 | D2 = 8.99 | | |
| R3 = −4779.95 | D3 = 10.96 | N2 = 1.43496 | v2 = 95.1 |
| R4 = −197.31 | D4 = 0.15 | | |
| R5 = 160.90 | D5 = 14.57 | N3 = 1.49845 | v3 = 81.6 |
| R6 = −564.41 | D6 = 0.15 | | |
| R7 = 108.51 | D7 = 7.14 | N4 = 1.69979 | v4 = 55.5 |
| R8 = 187.46 | D8 = Variable | | |
| R9 = 64.67 | D9 = 1.00 | N5 = 1.88814 | v5 = 40.8 |
| R10 = 28.76 | D10 = 7.40 | | |
| R11 = −150.75 | D11 = 0.80 | N6 = 1.80811 | v6 = 46.6 |
| R12 = −293.88 | D12 = 4.55 | | |
| R13 = −36.26 | D13 = 0.80 | N7 = 1.77621 | v7 = 49.6 |
| R14 = 34.15 | D14 = 6.98 | N8 = 1.85501 | v8 = 23.9 |
| *R15 = −163.75 | D15 = Variable | | |
| R16 = −45.10 | D16 = 0.90 | N9 = 1.77621 | v9 = 49.6 |
| R17 = 34.51 | D17 = 4.75 | N10 = 1.81265 | v10 = 25.4 |
| R18 = 1631.97 | D18 = Variable | | |
| R19 = (Stop) | D19 = 1.94 | | |
| R20 = −255.80 | D20 = 4.17 | N11 = 1.72794 | v11 = 38.0 |
| R21 = −60.57 | D21 = 0.10 | | |
| R22 = 82.07 | D22 = 8.89 | N12 = 1.48915 | v12 = 70.2 |
| R23 = −33.60 | D23 = 1.40 | N13 = 1.83932 | v13 = 37.2 |
| R24 = −153.09 | D24 = 0.10 | | |
| R25 = 59.05 | D25 = 5.89 | N14 = 1.48915 | v14 = 70.2 |
| R26 = 5032.81 | D26 = 19.17 | | |
| R27 = 709.25 | D27 = 5.24 | N15 = 1.48915 | v15 = 70.2 |
| R28 = −76.03 | D28 = 0.15 | | |
| R29 = −1979.45 | D29 = 1.50 | N16 = 1.83932 | v16 = 37.2 |
| R30 = 39.25 | D30 = 8.26 | N17 = 1.48915 | v17 = 70.2 |
| R31 = −71.46 | D31 = 0.15 | | |
| R32 = 72.55 | D32 = 7.78 | N18 = 1.51314 | v18 = 60.5 |
| R33 = −44.13 | D33 = 1.40 | N19 = 1.83932 | v19 = 37.2 |
| R34 = −108.98 | D34 = 0.15 | | |
| R35 = 56.56 | D35 = 4.00 | N20 = 1.48915 | v20 = 70.2 |
| R36 = 89.10 | D36 = 3.40 | | |
| R37 = ∞ | D37 = 55.50 | N21 = 1.51825 | v21 = 64.2 |
| R38 = ∞ | | | |

*Aspheric Surface

| Variable Separation | Focal Length | | | | |
|---|---|---|---|---|---|
| | 10.00 | 16.00 | 31.62 | 170.00 | 250.00 |
| D8 | 2.48 | 35.02 | 69.69 | 116.37 | 121.55 |
| D15 | 117.72 | 82.39 | 43.74 | 1.73 | 5.07 |
| D18 | 8.00 | 10.79 | 14.77 | 10.10 | 1.58 |

Shape of Asheric Surface

| | |
|---|---|
| Osculating Sphere: R = −163.750 | Parameter |
| Aspheric Coefficients | Z = 25 |
| A = B = C = 0 | $F_{NO.1} = 1.60$ |
| D = −5.784 × 10$^{-12}$ | $F_{NO.2} = 1.21$ |
| E = 1.859 × 10$^{-14}$ | β2w = −0.230 |
| | hm/ht = 1.24 |

| Aspheric Amount | h | Δ |
|---|---|---|
| 0.7 | (8.12 mm) | −0.08 μm |
| 0.9 | (10.44 mm) | −0.53 μm |
| 1.0 | (11.60 mm) | −1.08 μm |

Numerical Example 5
f = 9.5–104.5  Fno = 1:1.7  2ω = 60.1°–6.03°

| | | | |
|---|---|---|---|
| R1 = 909.50 | D1 = 2.50 | N1 = 1.81265 | v1 = 25.4 |
| R2 = 100.71 | D2 = 4.08 | | |
| R3 = 195.83 | D3 = 9.04 | N2 = 1.43496 | v2 = 95.1 |
| R4 = −155.81 | D4 = 0.15 | | |
| R5 = 79.12 | D5 = 11.26 | N3 = 1.49845 | v3 = 81.6 |
| R6 = −212.24 | D6 = 0.15 | | |
| R7 = 51.91 | D7 = 7.11 | N4 = 1.69979 | v4 = 55.5 |
| R8 = 118.00 | D8 = Variable | | |
| R9 = 96.71 | D9 = 1.00 | N5 = 1.88814 | v5 = 40.8 |
| R10 = 22.19 | D10 = 3.86 | | |
| R11 = −126.84 | D11 = 0.80 | N6 = 1.80811 | v6 = 46.6 |
| R12 = 59.53 | D12 = 4.48 | | |
| R13 = −19.14 | D13 = 0.80 | N7 = 1.77621 | v7 = 49.6 |
| R14 = 69.53 | D14 = 4.23 | N8 = 1.85501 | v8 = 23.9 |
| *R15 = −31.96 | D15 = Variable | | |
| R16 = −30.49 | D16 = 0.90 | N9 = 1.77621 | v9 = 49.6 |
| R17 = 40.95 | D17 = 3.54 | N10 = 1.81265 | v10 = 25.4 |
| R18 = −665.19 | D18 = Variable | | |
| R19 = (Stop) | D19 = 1.99 | | |
| R20 = 178.66 | D20 = 5.35 | N11 = 1.72794 | v11 = 38.0 |
| R21 = −31.00 | D21 = 0.10 | | |
| R22 = 69.61 | D22 = 6.43 | N12 = 1.50014 | v12 = 65.0 |
| R23 = −25.03 | D23 = 1.40 | N13 = 1.88814 | v13 = 40.8 |
| R24 = −358.92 | D24 = 0.10 | | |
| R25 = 50.13 | D25 = 7.40 | N14 = 1.51356 | v14 = 51.0 |
| R26 = −24.35 | D26 = 1.50 | N15 = 1.80811 | v15 = 46.6 |
| R27 = 80.52 | D27 = 20.29 | | |
| R28 = 195.02 | D28 = 7.98 | N16 = 1.48915 | v16 = 70.2 |
| R29 = −34.86 | D29 = 0.15 | | |
| R30 = −11249.89 | D30 = 1.50 | N17 = 1.83932 | v17 = 37.2 |
| R31 = 36.13 | D31 = 6.95 | N18 = 2.48915 | v18 = 70.2 |
| R32 = −140.23 | D32 = 0.15 | | |
| R33 = 307.31 | D33 = 6.18 | N19 = 1.51314 | v19 = 60.5 |
| R34 = −39.20 | D34 = 1.40 | N20 = 1.83932 | v20 = 37.2 |
| R35 = −61.91 | D35 = 0.15 | | |
| R36 = 50.12 | D36 = 5.76 | N21 = 1.48915 | v21 = 70.2 |
| R37 = −162.77 | D37 = 3.40 | | |
| R38 = ∞ | D38 = 55.50 | N22 = 1.51825 | v22 = 64.2 |
| R39 = ∞ | | | |

*Aspheric Surface

| Variable Separation | Focal Length | | | | |
|---|---|---|---|---|---|
| | 9.50 | 15.20 | 30.04 | 57.95 | 104.50 |
| D8 | 0.65 | 13.27 | 26.56 | 35.31 | 40.29 |
| D15 | 36.57 | 21.99 | 7.17 | 0.82 | 3.20 |
| D18 | 7.50 | 9.47 | 10.99 | 8.60 | 1.24 |

Shape of Asheric Surface

| | |
|---|---|
| Osculating Sphere: R = −31.968 | Parameter |
| Aspheric Coefficients | Z = 11 |
| A = B = C = 0 | $F_{NO.R} = 1.0$ |
| D = 3.246 × 10$^{-11}$ | $F_{NO.1} = 1.06$ |
| E = −1.102 × 10$^{-13}$ | $F_{NO.2} = 0.882$ |
| | β2w = −0.381 |

|  | ht/hz = 1.24 |  |
|---|---|---|
| Aspheric Amount | h | Δ |
| 0.7 | (6.35 mm) | −0.07 μm |
| 0.9 | (8.16 mm) | −0.49 μm |
| 1.0 | (9.07 mm) | −1.07 μm |

Numerical Example 6
f = 10.0–110.0  Fno = 1:1.7  2ω = 57.6°–5.72°

| R1 = 924.81 | D1 = 2.50 | N1 = 1.81265 | ν1 = 25.4 |
|---|---|---|---|
| R2 = 95.22 | D2 = 6.84 | | |
| R3 = 4394.05 | D3 = 7.12 | N2 = 1.43496 | ν2 = 95.1 |
| R4 = −120.99 | D4 = 0.15 | | |
| R5 = 84.76 | D5 = 14.01 | N3 = 1.49845 | ν3 = 81.6 |
| R6 = −139.82 | D6 = 0.15 | | |
| R7 = 51.07 | D7 = 7.78 | N4 = 1.69979 | ν4 = 55.5 |
| R8 = 105.33 | D8 = Variable | | |
| R9 = 91.51 | D9 = 1.00 | N5 = 1.88814 | ν5 = 40.8 |
| R10 = 18.15 | D10 = 3.48 | | |
| R11 = −84.71 | D11 = 0.80 | N6 = 1.80811 | ν6 = 46.6 |
| R12 = 163.60 | D12 = 3.21 | | |
| *R13 = −17.68 | D13 = 0.80 | N7 = 1.77621 | ν7 = 49.6 |
| R14 = 33.42 | D14 = 5.17 | N8 = 1.85501 | ν8 = 23.9 |
| R15 = −38.40 | D15 = Variable | | |
| R16 = −30.83 | D16 = 0.90 | N9 = 1.77621 | ν9 = 49.6 |
| R17 = 50.41 | D17 = 3.99 | N10 = 1.85501 | ν10 = 23.9 |
| R18 = −664.04 | D18 = Variable | | |
| R19 = (Stop) | D19 = 1.79 | | |
| R20 = −696.10 | D20 = 5.33 | N11 = 1.72794 | ν11 = 38.0 |
| R21 = −38.24 | D21 = 0.10 | | |
| R22 = 92.97 | D22 = 8.04 | N12 = 1.50014 | ν12 = 65.0 |
| R23 = −31.74 | D23 = 1.40 | N13 = 1.88814 | ν13 = 40.8 |
| R24 = −93.14 | D24 = 0.10 | | |
| R25 = 40.20 | D25 = 11.25 | N14 = 1.51356 | ν14 = 51.0 |
| R26 = −33.88 | D26 = 1.50 | N15 = 1.80811 | ν15 = 46.6 |
| R27 = 177.29 | D27 = 13.31 | | |
| R28 = 390.80 | D28 = 7.79 | N16 = 1.48915 | ν16 = 70.2 |
| R29 = −41.40 | D29 = 0.15 | | |
| R30 = 75.89 | D30 = 1.50 | N17 = 1.83932 | ν17 = 37.2 |
| R31 = 24.77 | D31 = 8.90 | N18 = 1.48915 | ν18 = 70.2 |
| R32 = −555.75 | D32 = 0.15 | | |
| R33 = 158.45 | D33 = 6.98 | N19 = 1.51314 | ν19 = 60.5 |
| R34 = −40.43 | D34 = 1.40 | N20 = 1.83932 | ν20 = 37.2 |
| R35 = −308.63 | D35 = 0.15 | | |
| R36 = 51.08 | D36 = 6.78 | N21 = 1.48915 | ν21 = 70.2 |
| R37 = −86.52 | D37 = 3.40 | | |
| R38 = ∞ | D38 = 55.50 | N22 = 1.51825 | ν22 = 64.2 |
| R39 = ∞ | | | |

*Aspheric Surface

| Variable | Focal Length | | | | |
|---|---|---|---|---|---|
| Separation | 10.00 | 16.00 | 33.00 | 61.00 | 110.00 |
| D8 | 0.88 | 14.97 | 30.40 | 39.26 | 45.08 |
| D15 | 48.74 | 32.27 | 13.86 | 4.67 | 2.66 |
| D18 | 1.50 | 3.88 | 6.86 | 7.19 | 3.38 |

Shape of Asheric Surface

| Osculating Sphere: R = −17.680 | Parameter |
|---|---|
| Aspheric Coefficients | Z = 11 |
| A = B = C = 0 | $F_{NO.R}$ = 1.0 |
| D = −4.468 × 10$^{-10}$ | $F_{NO.1}$ = 1.05 |
| E = 1.526 × 10$^{-12}$ | $F_{NO.2}$ = 0.680 |
| | β2w = −0.279 |
| | ht/hz = 1.24 |

| Aspheric Amount | h | Δ |
|---|---|---|
| 0.7 | (5.95 mm) | −0.62 μm |
| 0.9 | (7.65 mm) | −4.19 μm |
| 1.0 | (8.50 mm) | −9.17 μm |

Numerical Example 7
f = 10.0–170.0  Fno = 1:1.8  2ω = 57.6°–3.71°

| R1 = 484.44 | D1 = 2.50 | N1 = 1.81265 | ν1 = 25.4 |
|---|---|---|---|
| R2 = 147.75 | D2 = 14.45 | | |
| R3 = −284.94 | D3 = 5.49 | N2 = 1.43496 | ν2 = 95.1 |
| R4 = −174.10 | D4 = 0.15 | | |
| R5 = 143.58 | D5 = 15.68 | N3 = 1.49845 | ν3 = 81.6 |
| R6 = −272.35 | D6 = 0.15 | | |
| R7 = 107.99 | D7 = 7.87 | N4 = 1.69979 | ν4 = 55.5 |
| R8 = 225.28 | D8 = Variable | | |
| R9 = 46.50 | D9 = 1.00 | N5 = 1.88814 | ν5 = 40.8 |
| R10 = 21.80 | D10 = 5.52 | | |
| R11 = −206.83 | D11 = 0.80 | N6 = 1.80811 | ν6 = 46.6 |
| *R12 = 1041.43 | D12 = 4.27 | | |
| R13 = −26.41 | D13 = 0.80 | N7 = 1.77621 | ν7 = 49.6 |
| R14 = 23.95 | D14 = 6.33 | N8 = 1.85501 | ν8 = 23.9 |
| R15 = −115.31 | D15 = Variable | | |
| R16 = −46.57 | D16 = 0.90 | N9 = 1.77621 | ν9 = 49.6 |
| R17 = 47.89 | D17 = 6.60 | N10 = 1.81265 | ν10 = 25.4 |
| R18 = −889.82 | D18 = Variable | | |
| R19 = (Stop) | D19 = 1.80 | | |
| R20 = −456.22 | D20 = 5.84 | N11 = 1.72794 | ν11 = 38.0 |
| R21 = −59.95 | D21 = 0.10 | | |
| R22 = 49.94 | D22 = 13.82 | N12 = 1.50014 | ν12 = 65.0 |
| R23 = −47.13 | D23 = 1.40 | N13 = 1.88814 | ν13 = 40.8 |
| R24 = −165.82 | D24 = 0.10 | | |
| R25 = 104.16 | D25 = 3.19 | N14 = 1.48915 | ν14 = 70.2 |
| R26 = 107.98 | D26 = 20.10 | | |
| R27 = 46.24 | D27 = 11.11 | N15 = 1.48915 | ν15 = 70.2 |
| R28 = −99.66 | D28 = 0.15 | | |
| R29 = −492.26 | D29 = 0.15 | N16 = 1.83932 | ν16 = 37.2 |
| R30 = 30.11 | D30 = 11.26 | N17 = 1.48915 | ν17 = 70.2 |
| R31 = −75.31 | D31 = 0.15 | | |
| R32 = 45.44 | D32 = 9.53 | N18 = 1.51314 | ν18 = 60.5 |
| R33 = −41.24 | D33 = 1.40 | N19 = 1.83932 | ν19 = 37.2 |
| R34 = 108.59 | D34 = 0.15 | | |
| R35 = 47.95 | D35 = 5.03 | N20 = 1.48915 | ν20 = 70.2 |
| R36 = 163.61 | D36 = 3.40 | | |
| R37 = ∞ | D37 = 55.50 | N21 = 1.51825 | ν21 = 64.2 |
| R38 = ∞ | | | |

*Aspheric Surface

| Variable | Focal Length | | | | |
|---|---|---|---|---|---|
| Separation | 10.00 | 16.00 | 40.00 | 90.00 | 170.00 |
| D8 | 3.05 | 35.62 | 78.99 | 102.48 | 114.78 |
| D15 | 127.65 | 91.55 | 40.90 | 12.83 | 2.50 |
| D18 | 1.50 | 5.03 | 12.31 | 16.90 | 14.92 |

Shape of Asheric Surface

| Osculating Sphere: R = 1041.431 | Parameter |
|---|---|
| Aspheric Coefficients | Z = 17 |
| A = B = C = 0 | $F_{NO.R}$ = 1.0 |
| D = 1.358 × 10$^{-10}$ | $F_{NO.1}$ = 1.59 |
| E = −5.379 × 10$^{-13}$ | $F_{NO.2}$ = 0.906 |
| | β2w = −0.169 |
| | ht/hz = 1.26 |

| Aspheric Amount | h | Δ |
|---|---|---|
| 0.7 | (7.14 mm) | 0.73 μm |
| 0.9 | (9.18 mm) | 4.56 μm |
| 1.0 | (10.20 mm) | 9.35 μm |

Numerical Example 8
f = 10.0–170.0  Fno = 1:1.8  2ω = 57.6°–3.71°

| R1 = 878.09 | D1 = 2.50 | N1 = 1.81265 | ν1 = 25.4 |
|---|---|---|---|
| R2 = 197.50 | D2 = 7.33 | | |
| R3 = 1079.40 | D3 = 9.55 | N2 = 1.43496 | ν2 = 95.1 |
| R4 = −259.01 | D4 = 0.15 | | |
| R5 = 152.27 | D5 = 14.44 | N3 = 1.49845 | ν3 = 81.6 |
| R6 = −374.62 | D6 = 0.15 | | |
| R7 = 106.12 | D7 = 6.47 | N4 = 1.69979 | ν4 = 55.5 |

-continued

| | | | |
|---|---|---|---|
| R8 = 181.12 | D8 = Variable | | |
| R9 = 62.40 | D9 = 1.00 | N5 = 1.88814 | v5 = 40.8 |
| R10 = 28.87 | D10 = 6.99 | | |
| R11 = −133.04 | D11 = 0.80 | N6 = 1.80811 | v6 = 46.6 |
| R12 = −362.12 | D12 = 4.31 | | |
| R13 = −35.76 | D13 = 0.80 | N7 = 1.77621 | v7 = 49.6 |
| R14 = 32.31 | D14 = 6.57 | N8 = 1.85501 | v8 = 23.9 |
| *R15 = −198.20 | D15 = Variable | | |
| R16 = −45.72 | D16 = 0.90 | N9 = 1.77621 | v9 = 49.6 |
| R17 = 34.09 | D17 = 4.66 | N10 = 1.81265 | v10 = 25.4 |
| R18 = 1107.18 | D18 = Variable | | |
| R19 = (Stop) | D19 = 3.00 | | |
| R20 = −24.510 | D20 = 3.82 | N11 = 1.72794 | v11 = 38.0 |
| R21 = −58.56 | D21 = 0.10 | | |
| R22 = 72.48 | D22 = 8.08 | N12 = 1.48915 | v12 = 70.2 |
| R23 = −30.74 | D23 = 1.40 | N13 = 1.83932 | v13 = 37.2 |
| R24 = −169.98 | D24 = 0.10 | | |
| R25 = 57.84 | D25 = 5.33 | N14 = 1.48915 | v14 = 70.2 |
| R26 = 3334.59 | D26 = 19.36 | | |
| R27 = 3092.49 | D27 = 4.84 | N15 = 1.48915 | v15 = 70.2 |
| R28 = −75.38 | D28 = 0.15 | | |
| R29 = −1677.98 | D29 = 1.15 | N16 = 1.83932 | v16 = 37.2 |
| R30 = 38.96 | D30 = 7.85 | N17 = 1.48915 | v17 = 70.2 |
| R31 = −69.60 | D31 = 0.15 | | |
| R32 = 91.81 | D32 = 6.86 | N18 = 1.51314 | v18 = 60.5 |
| R33 = −49.43 | D33 = 1.40 | N19 = 1.83932 | v19 = 37.2 |
| R34 = −96.69 | D34 = 0.15 | | |
| R35 = 46.60 | D35 = 4.59 | N20 = 1.48915 | v20 = 70.2 |
| R36 = 119.00 | D36 = 3.40 | | |
| R37 = ∞ | D37 = 55.50 | N21 = 1.51825 | v21 = 64.2 |
| R38 = ∞ | | | |

*Aspheric Surface

| Variable Separation | Focal Length | | | | |
|---|---|---|---|---|---|
| | 10.00 | 16.00 | 40.00 | 90.00 | 170.00 |
| D8 | 1.06 | 31.49 | 72.53 | 95.40 | 107.29 |
| D15 | 109.81 | 76.48 | 30.19 | 6.68 | 2.08 |
| D18 | 1.50 | 4.39 | 9.64 | 10.28 | 3.00 |

Shape of Aspheric Surface

| | |
|---|---|
| Osculating Sphere: R = −198.207 | Parameter |
| Aspheric Coefficients | Z = 17 |
| A = B = C = 0 | $F_{NO.R}$ = 1.0 |
| D = 1.034 × 10$^{-11}$ | $F_{NO.1}$ = 1.59 |
| E = −3.980 × 10$^{-14}$ | $F_{NO.2}$ = 1.22 |
| | β2w = −0.215 |
| | ht/hz = 1.226 |

| Aspheric Amount | h | Δ |
|---|---|---|
| 0.7 | (7.59 mm) | 0.09 μm |
| 0.9 | (9.76 mm) | 0.54 μm |
| 1.0 | (10.84 mm) | 1.08 μm |

According to the invention, as has been described above, in application to the so-called 4-unit zoom lens, the lateral magnification for the wide-angle end of the lens unit for varying the focal length and the F-number of each of the certain lens units are properly determined and the aspheric sphere is applied to at least one of lens surfaces which satisfies the prescribed condition for the height of incidence of the axial light beam. When the zoom lens embodies these features, the range of variation of spherical aberration with zooming is greatly reduced. Further, astigmatism, curvature of field, distortion and other off-axial aberrations are corrected in good balance over the entire zooming range. Thus, it is made possible to achieve a large relative aperture, high range zoom lens whose F-number for the wide-angle end is 1.7 or thereabout and whose zoom ratio is 10 to 25, while still maintaining good stability of high optical performance throughout the entire zooming range.

The foregoing embodiment has been described in connection with the provision of the aspheric surface in the second lens unit, as emphasis is laid on correction of spherical aberration. In the following, another embodiment is described where an aspheric surface is introduced into the third lens unit with a chief aim at correcting on-axial aberrations.

Figure 22:
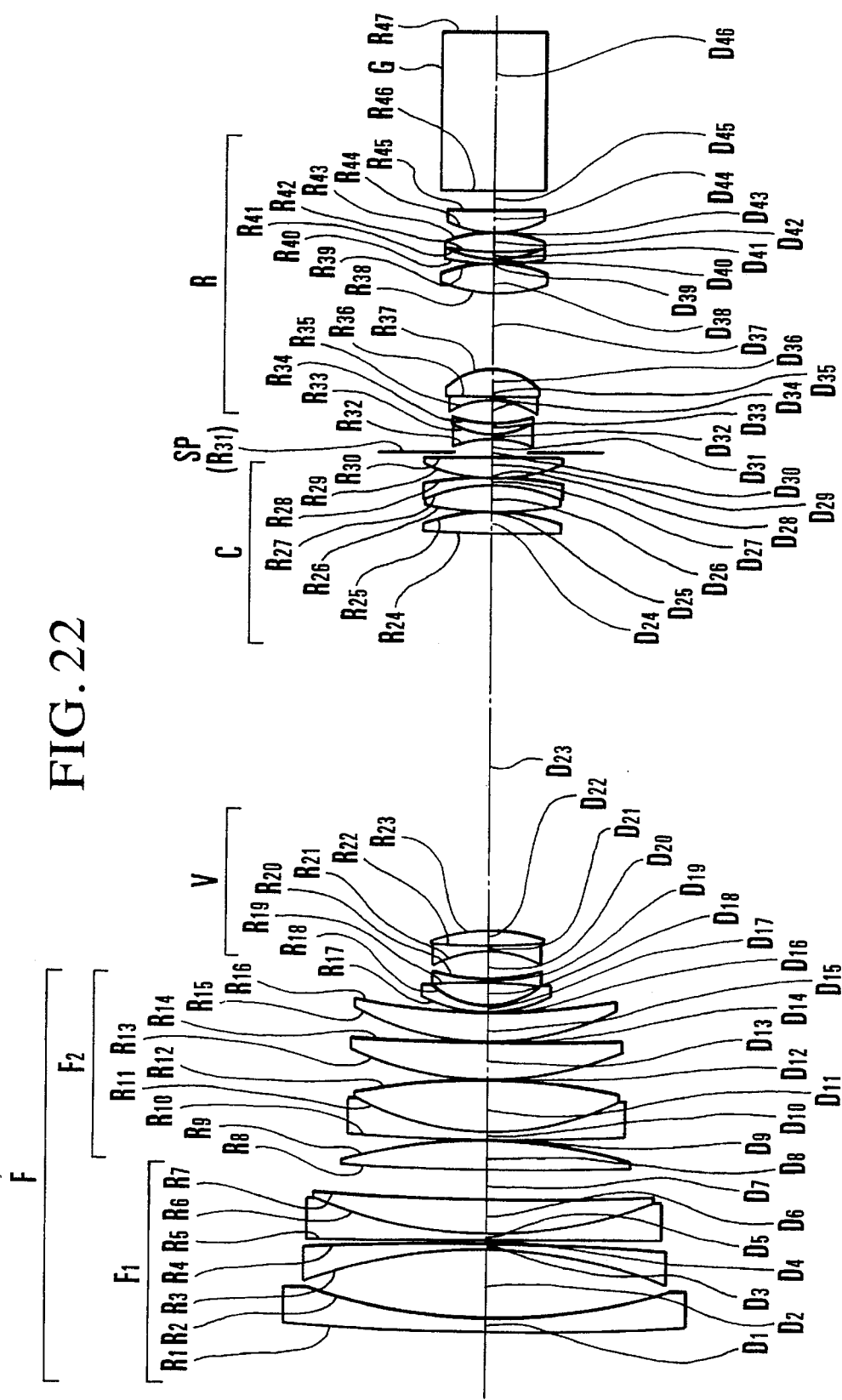
FIG. 22 is a lens block diagram of a numerical example 9 of the invention.
Figure 23:
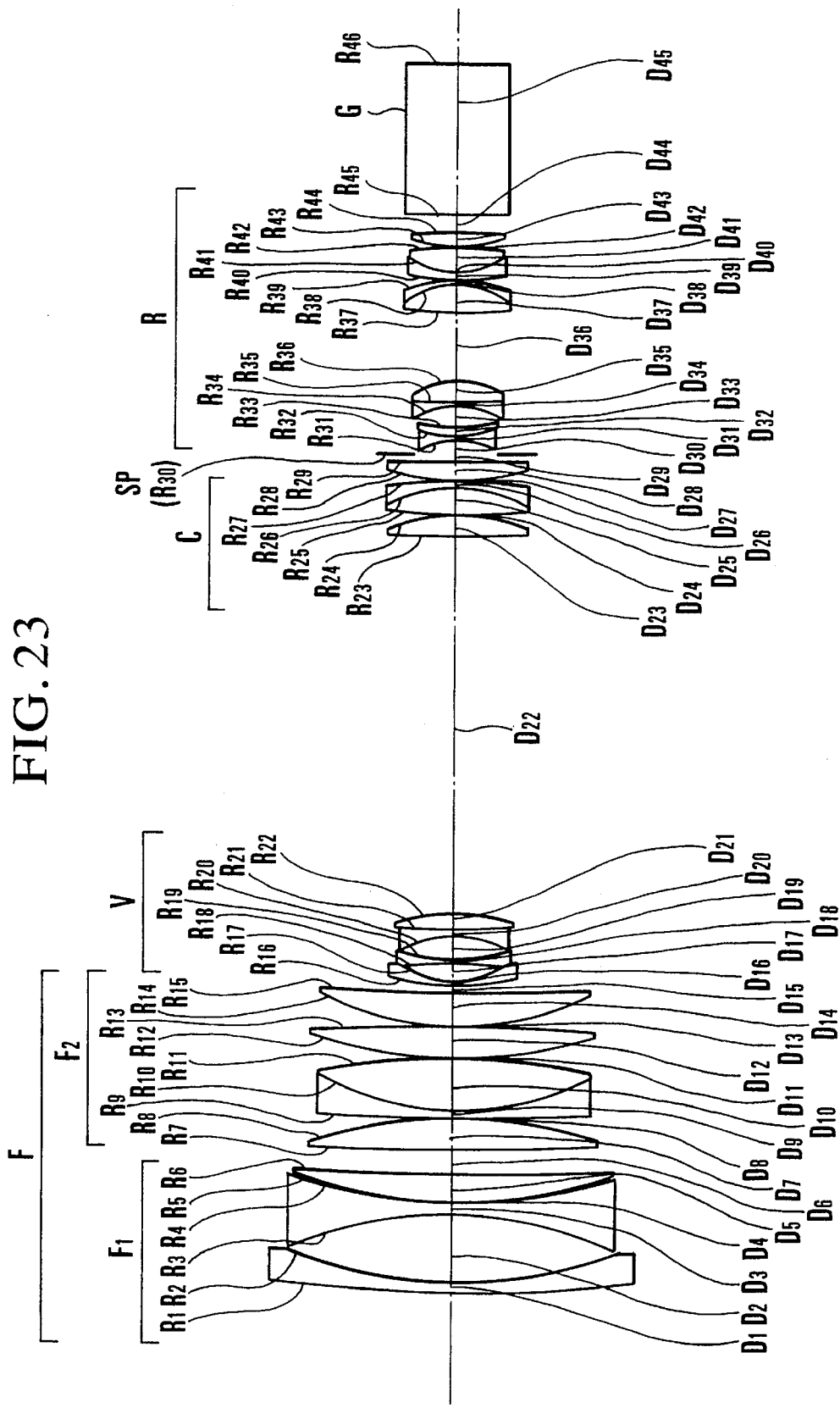
FIG. 23 is a lens block diagram of a numerical example 10 of the invention.
Figure 24:
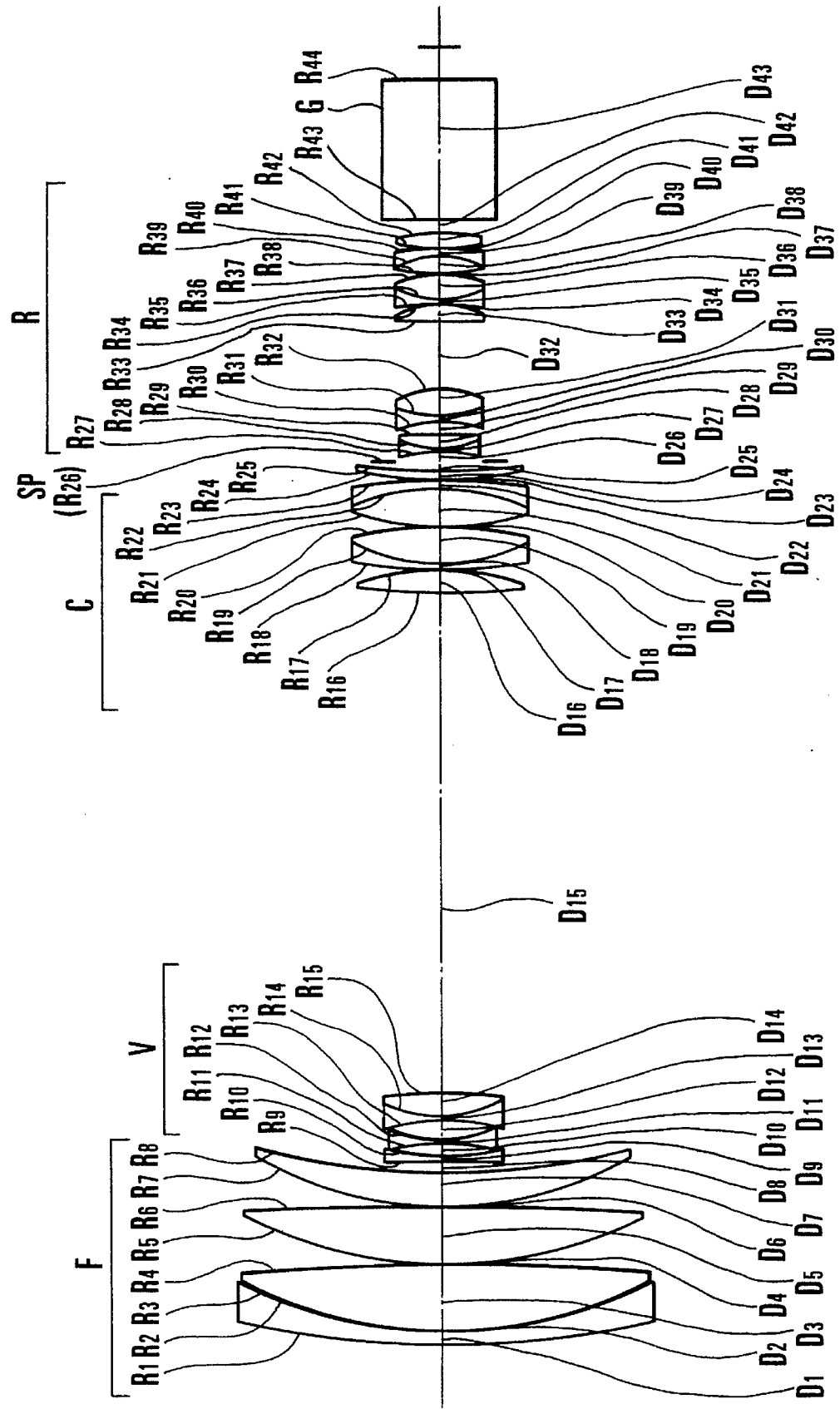
FIG. 24 is a lens block diagram of a numerical example 11 of the invention.
Figures 1, 25A:
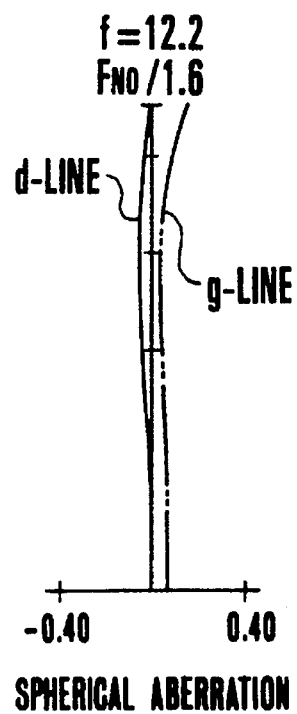
FIGS. 25(A) to 25(E) are aberration curves of the numerical example 9.
Figures 2, 25A:
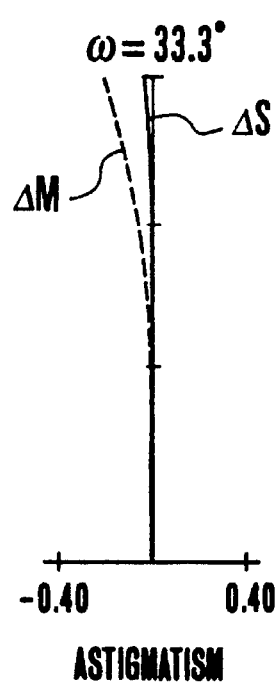
Figures 3, 25A:
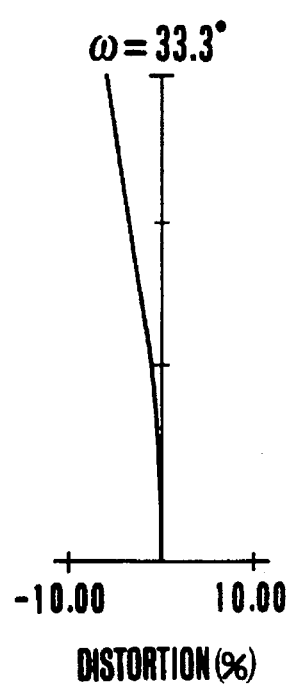
Figures 1, 25B:
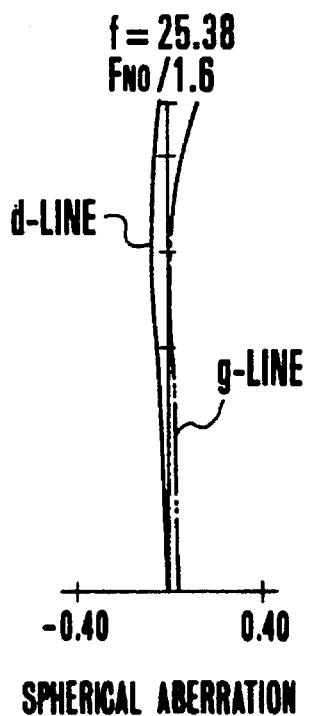
Figures 2, 25B:
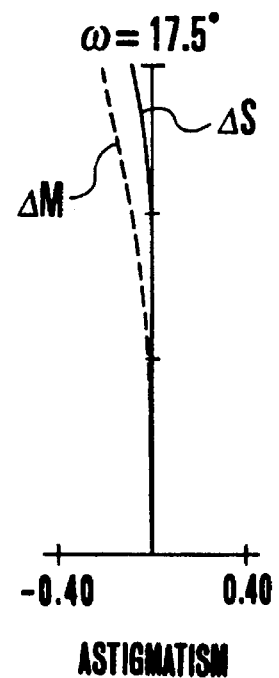
Figures 3, 25B:
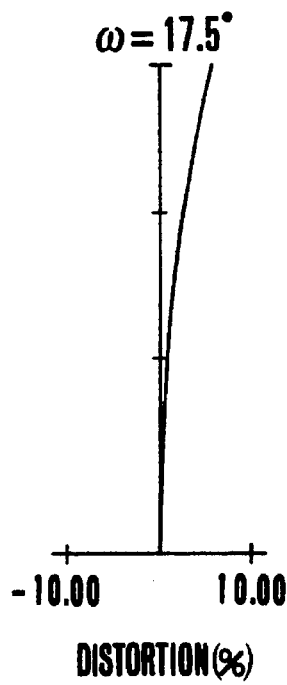
Figures 1, 25C:
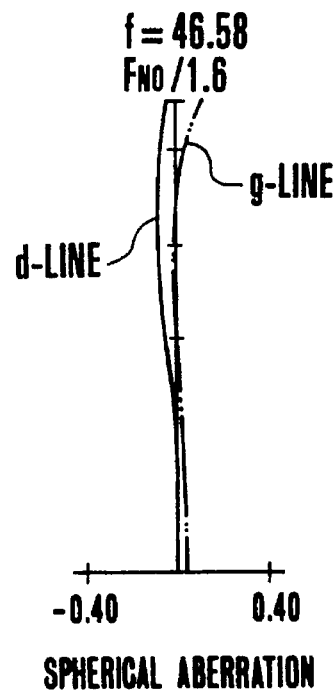
Figures 2, 25C:
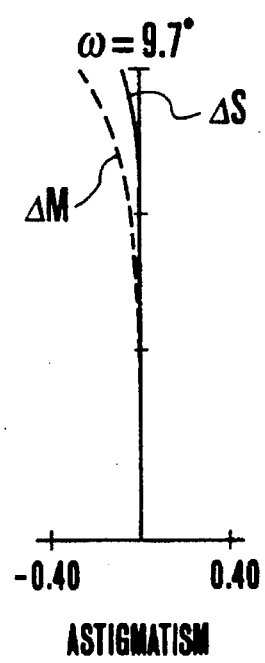
Figures 3, 25C:
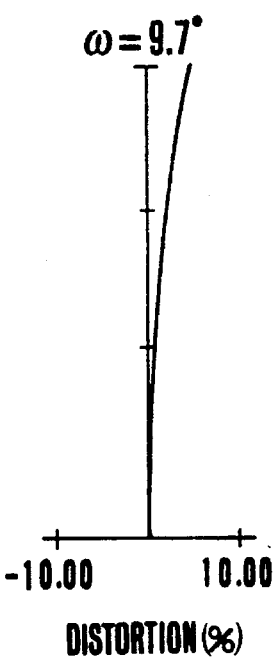
Figures 1, 25D:
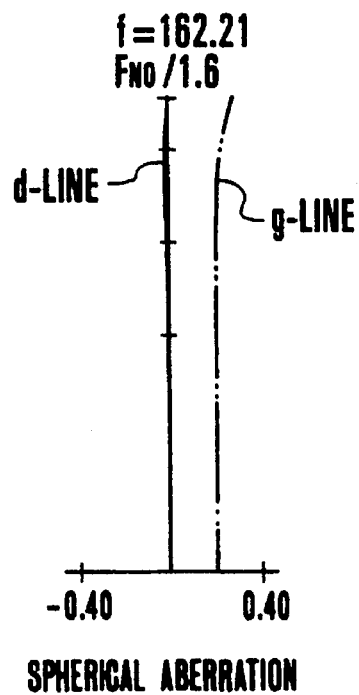
Figures 2, 25D:
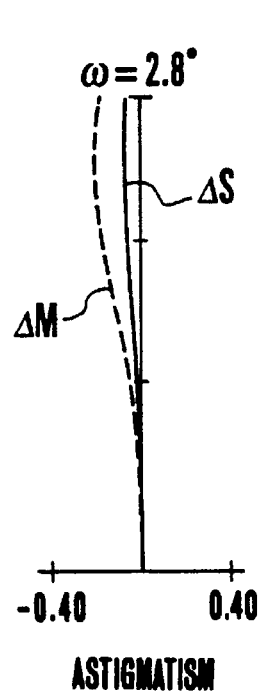
Figures 3, 25D:
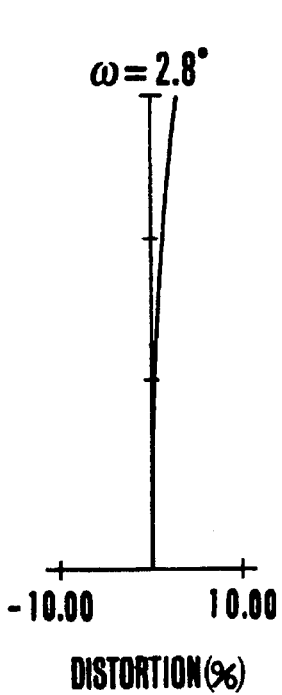
Figures 1, 25E:
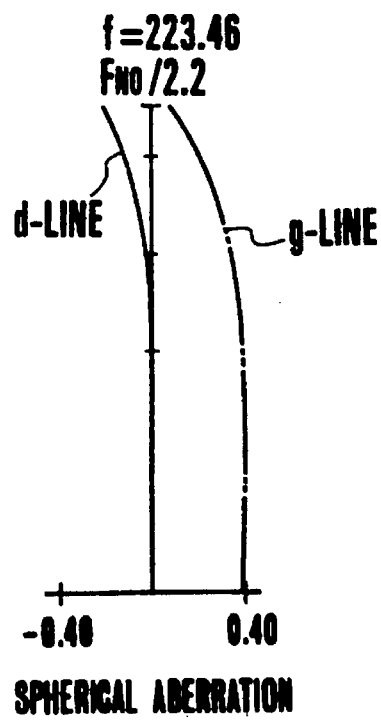
Figures 2, 25E:
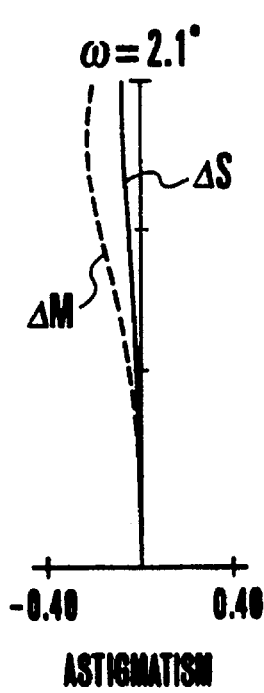
Figures 3, 25E:
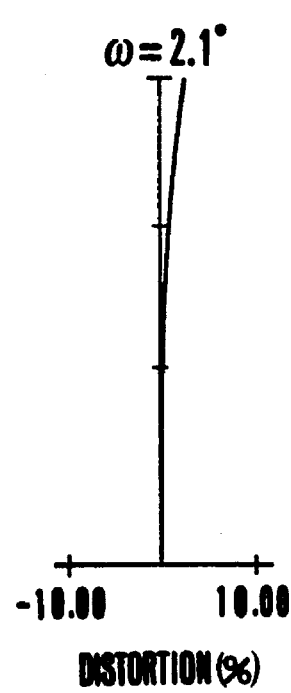
Figures 1, 26A:
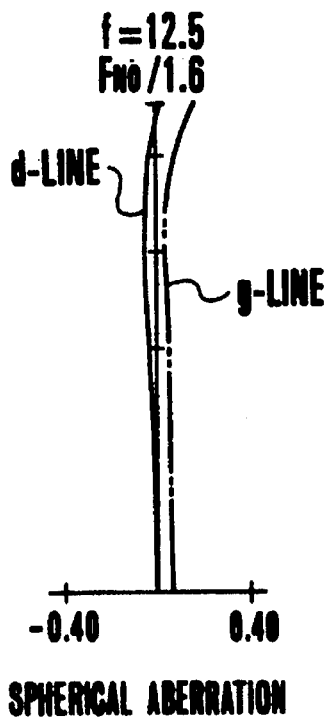
Figures 2, 26A:
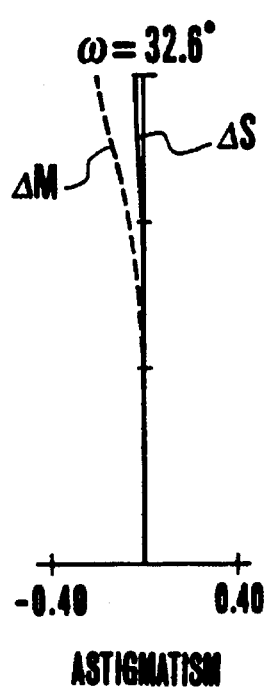
Figures 3, 26A:
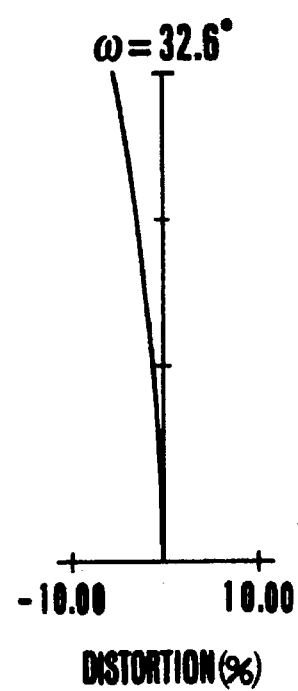
Figures 1, 26B:
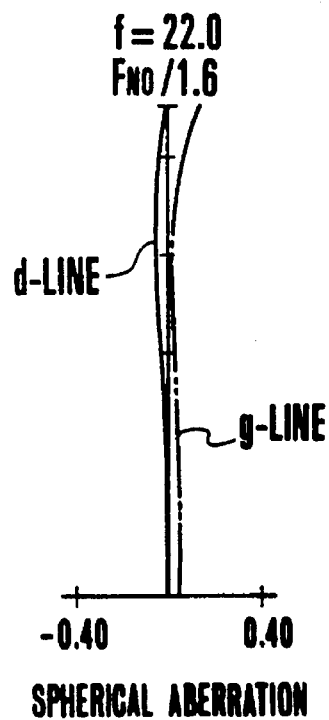
Figures 2, 26B:
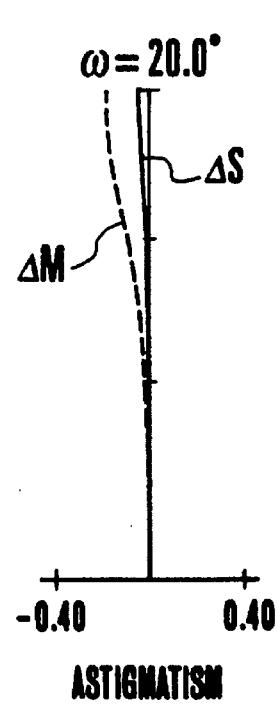
Figures 3, 26B:
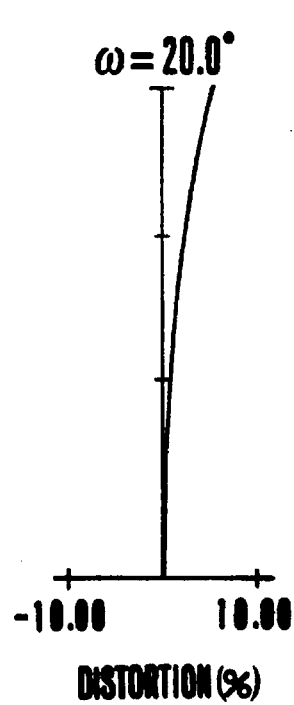
Figures 1, 26C:
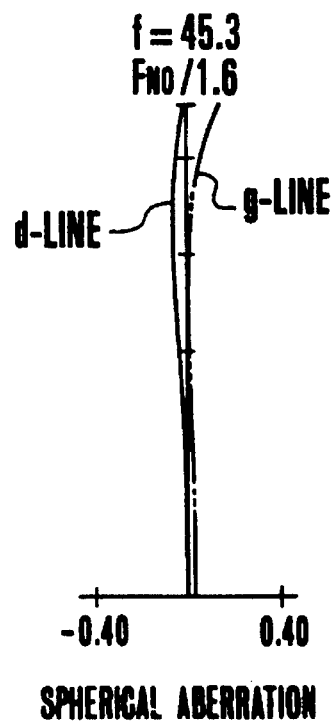
Figures 2, 26C:
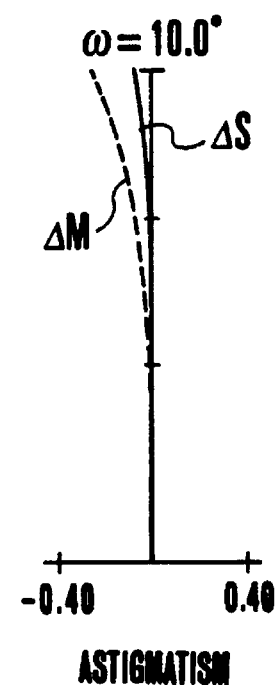
Figures 3, 26C:
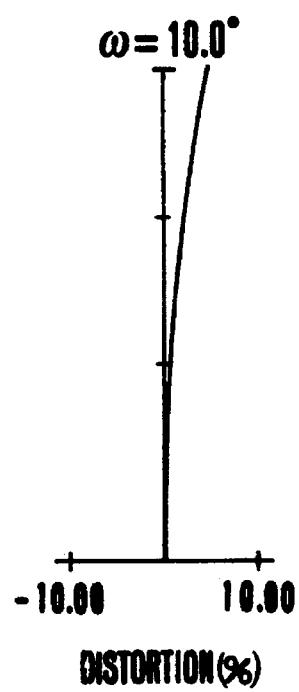
Figures 1, 27A:
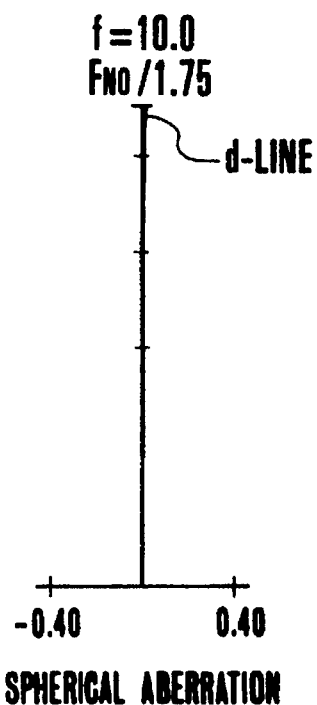
FIGS. 27(A) to 27(E) are aberration curves of the numerical example 11.
Figures 2, 27A:
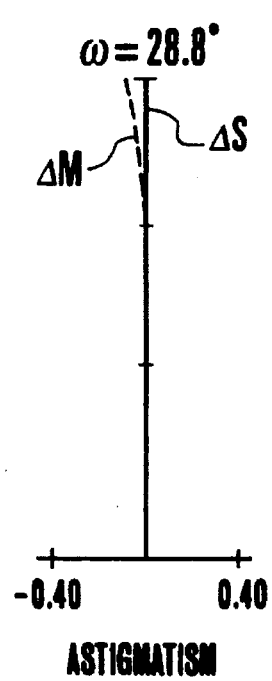
Figures 3, 27A:
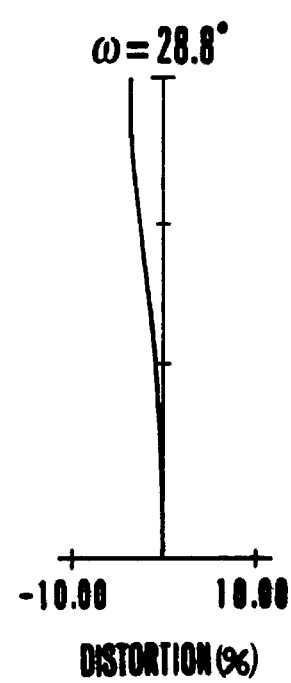
Figures 1, 27B:
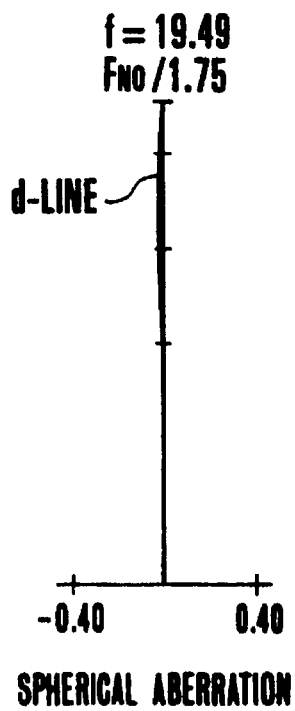
Figures 2, 27B:
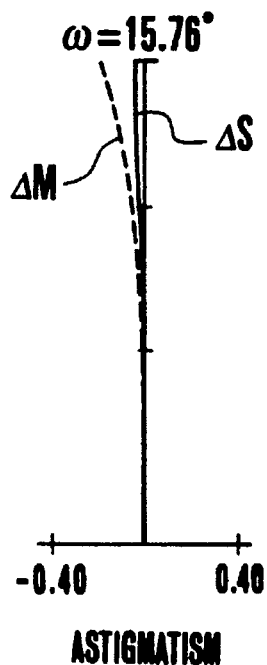
Figures 3, 27B:
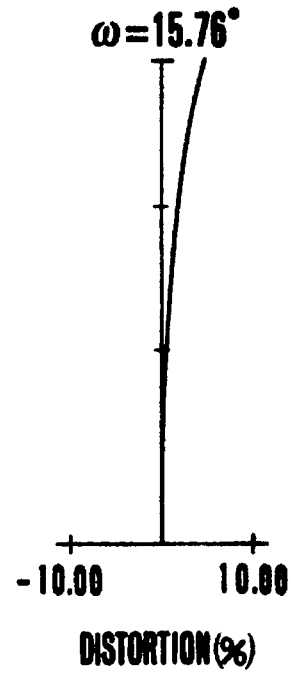
Figures 1, 27C:
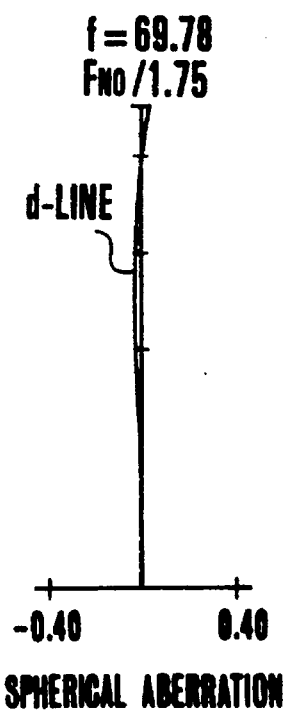
Figures 2, 27C:
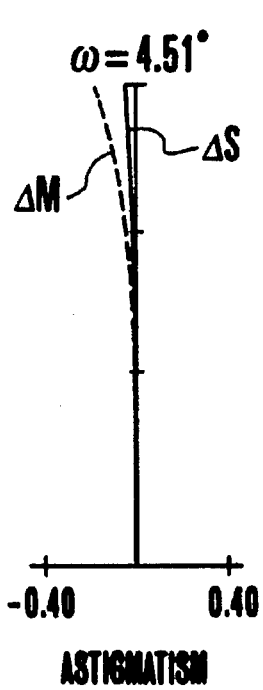
Figures 3, 27C:
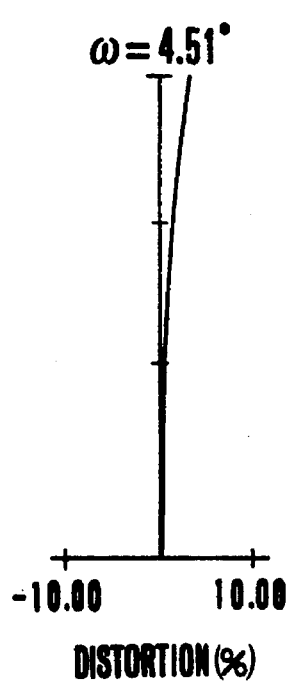
Figures 1, 27D:
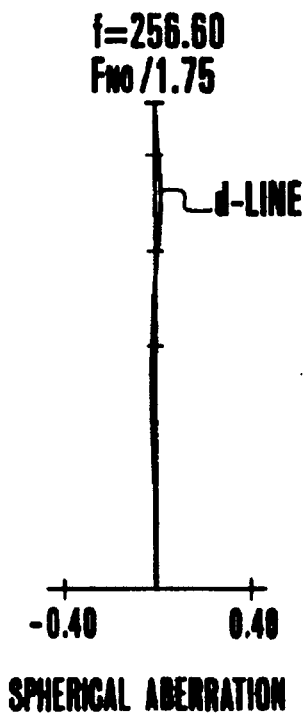
Figures 2, 27D:
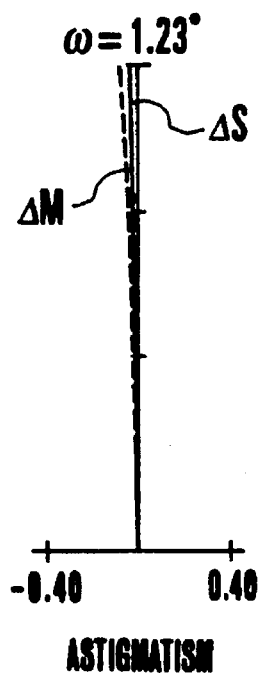
Figures 3, 27D:
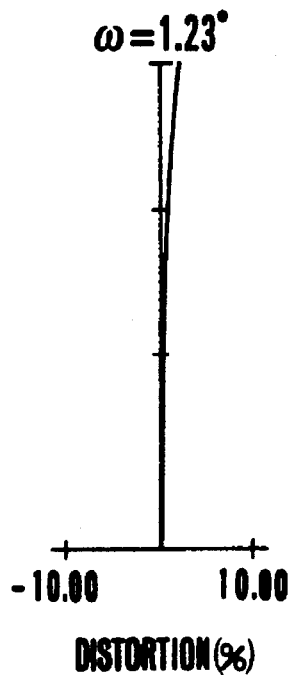
Figures 1, 27E:
Figures 2, 27E:
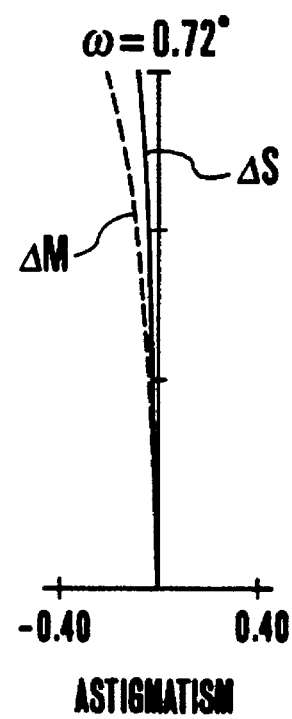
Figures 3, 27E:
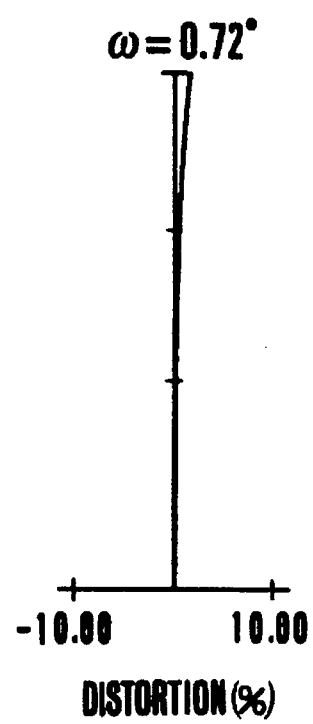
Figure 28:
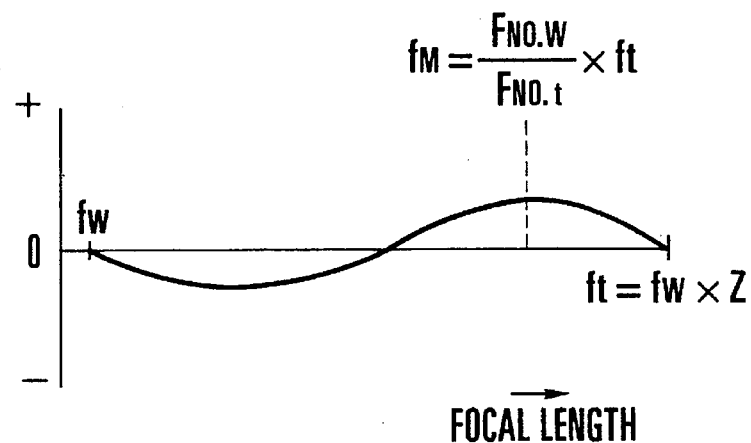
FIG. 28 is a diagram used to explain the variation of aberration of the zoom lens with zooming.

FIG. 22, FIG. 23 and FIG. 24 in lens block diagram show numerical examples 9, 10 and 11 of zoom lenses of the invention in the wide-angle end.

In FIG. 22 and FIG. 23, F denotes a first or focusing lens unit (front lens unit) of positive refractive power which is divided into a front part F1 of negative refractive power and a rear part F2 of positive refractive power. As the object distance varies, focusing is carried out by moving the front focusing unit F1 along an optical axis.

In the example 11 of FIG. 24, the focusing lens unit F is constructed in the unified form so that it is entirely moved axially for focusing.

V denotes a second lens unit for varying the focal length, or variator of negative refractive power. It moves axially toward the image side monotonously to vary the focal length from the wide-angle end to the telephoto end. C denotes a compensator of positive refractive power. To compensate for the image shift with zooming, the compensator C moves axially toward the object side non-linearly. The variator V and the compensator C are used where the magnification takes −1x (unity magnification) at a time during zooming. SP (R31) stands for a stop. R denotes a relay lens unit of positive refractive power. G denotes a color separation prism or an optical filter shown as a glass block in FIGS. 22 to 24.

The features of the zoom lens which are characteristic of the present embodiment are described below.

To realize a zoom lens having a zoom ratio Z of 10 or greater and further whose aperture ratio is much increased over the entire zooming range, the first feature of the invention is to make use of what is so fast as to satisfy the before-described condition (3) in the front lens unit F. Particularly for the telephoto end, the value $F_{NO.t}$ of the F-number is so much fast. Another feature is to employ such a zooming arrangement that the variator V and the compensator C each move past a point for −1x magnification and are given an individual high rate of variable power.

Figure 29:
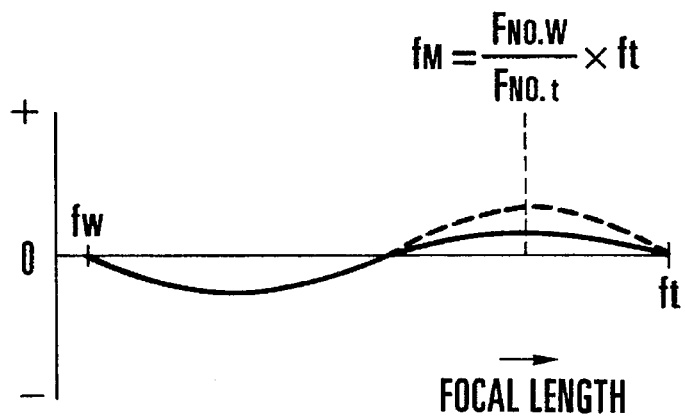
FIG. 29 is a diagram used to explain the variation of aberration of the zoom lens with zooming.

In particular, the variator V takes a rate of variable power that satisfies the before-described conditions (4) and (5). This assures a great increase of the zoom ratio. Moreover, the effective F-number of the compensator C, too, is maintained at so fast a value $F_{NO.3}$ as to satisfy the before-described condition (6), thus making it easier to increase the aperture ratio. With these in effect, of all the aberrations which vary with zooming, the spherical aberration which would otherwise vary to large extent particularly when zooming goes through the neighborhood of the start point fM of F drop, is well suppressed as shown in FIG. 29.

Figure 30A:
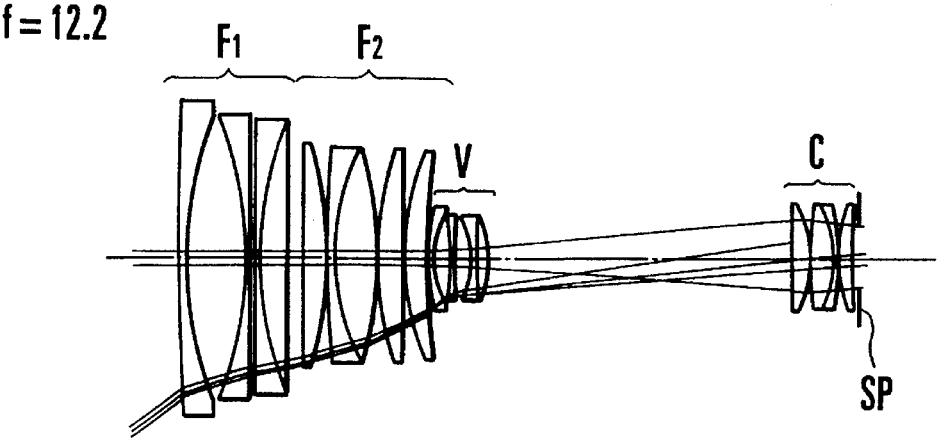
FIGS. 30 (A) to 30 (C) are diagrams showing the optical paths in the operative positions of the zoom lens.
Figure 30B:
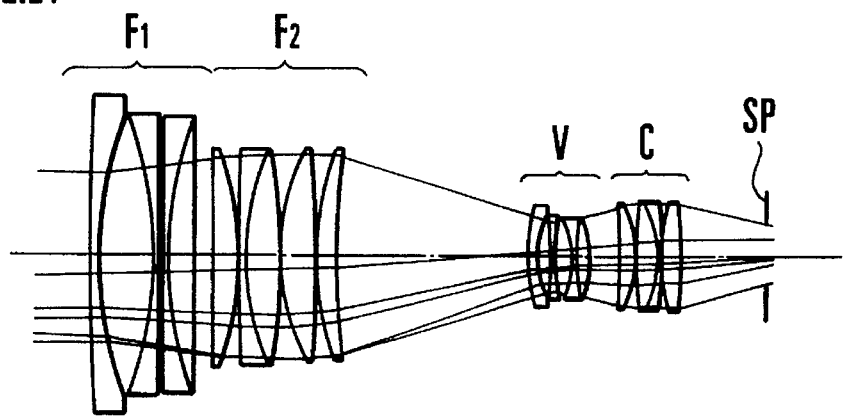
Figure 30C:
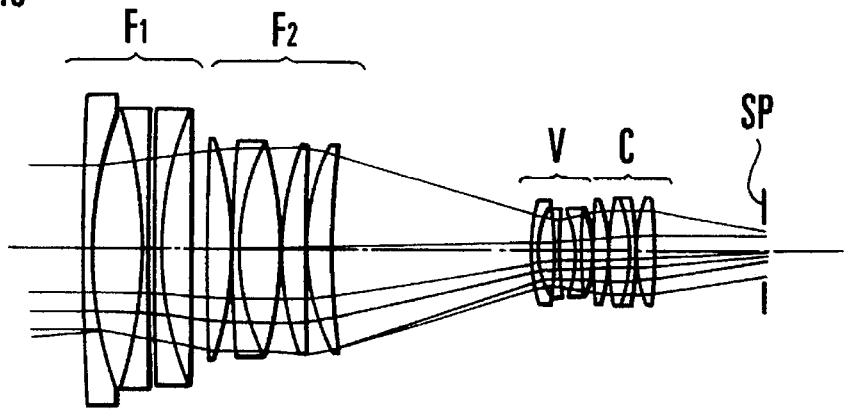

The height of incidence of the ray of maximum diameter of an axial light beam on the lens units increases to the highest at a time when the F drop starts (in the zooming position fM) as shown in FIGS. 30(A) to 30(C), or where spherical aberration is most over-corrected. In the other region of the zooming range, it is lower than that. It is to be noted that FIGS. 30(A) to 30(C) show the optical paths in a partial optical system of the zoom lens of FIG. 22 in different zooming positions.

In the present embodiment, to utilize this optical property, the compensator C, to which the above-stated condition is applied, is provided with a lens surface for correcting spherical aberration. For this purpose, at least one cemented lens is put within the interior of the compensator C and its cemented surface is made to be a divergent surface for spherical aberration. For such a cemented surface to increase the effect of diverging spherical aberration, the media on the front and rear sides of that boundary surface are made to differ in refractive index from each other by an amount $\Delta n$ as defined in the following condition (7):

$$0.17 < \Delta n \ldots \quad (7)$$

When this condition is satisfied, variation with zooming of spherical aberrations in lower terms is corrected well.

According to the invention, the compensator C has its effective F-number $F_{NO.3}$ become very fast. The zoom lens is, therefore, over-corrected for spherical aberrations of higher order. This lays limitation on increasing of the aperture ratio, in the design of using only spherical lenses.

So, in the present embodiment, the compensator C is made up by using at least one aspheric surface. At a time when the F drop starts, the height of incidence of the axial light beam appears highest at a value h3m and, when zoomed to the telephoto end, because of the F drop, lowers to a value h3T. Their ratio lies within the range given by the following condition (8):

$$1.15 < h3m/h3T \ldots \quad (8)$$

Thus, the residual spherical aberrations of higher order are canceled.

Particularly for the spherical aberrations of higher order to correct well, the aspheric surface is formed to such a shape that the central zone of the aspheric surface is almost spherical, and the nearer to the margin, the more aspherical.

It should be explained that the condition described above lets the aspheric surface take full effect on the zooming system of the zoom lens only in that very narrow region of the zooming range which lies around the start point of the F drop and give as little adverse influence to spherical aberration and astigmatism as possible in the other regions of the zooming range.

When the ratio of h3m to h3T in the condition (8) is nearer to 1 than the limit, as this means that the height of incidence of the axial light beam on the aspheric surface changes little during zooming from the neighborhood of the F drop to the telephoto end, the aspheric surface exerts the effect of correcting spherical aberration not only around the start point of the F drop, but also extends its influence up to the telephoto end in respect to spherical aberration.

If the spherical aberration in the zooming position fM ($=(F_{NO.w}/F_{NO.t}) \times ft$) is corrected by the aspheric surface in the under direction, the spherical aberration in the telephoto end, too, would, on receipt of the influence of this aspheric surface, change in the under direction. Hence, the effect of correcting the variation of spherical aberration is objectionably weakened.

It will be appreciated from the above description that in the present embodiment, selection of the lens surface to which the aspheric sphere is to apply is properly specified so that, without having to influence the spherical aberration in the telephoto end, the spherical aberration in the neighborhood of the start point of the F drop is well corrected. Thus, good stability of spherical aberration correction is maintained over the entire zooming range.

Next, the features of numerical examples of the present embodiment are described.

The numerical example 9 shown in FIG. 22 has a zoom ratio of more than 18. R1 to R7 form a front part F1 for focusing of a focusing lens unit, and all of them give it a negative refractive power. R8 to R16 form a rear focusing lens unit F2 which remains stationary during focusing and zooming and all of them give it a positive refractive power. R1 through R16 function as a front lens unit F to focus an object point for a variator V. The front lens unit F has a weak positive refractive power as a whole.

The variator V of R17 to R23 has main contribution to variation of the focal length and, when zooming from the wide-angle end to the telephoto end, moves toward the image side monotonously, while its magnification varies past −1x (unity magnification) on the way. A compensator C of R24 to R30 has a positive refractive power and functions mainly to share the variation of the focal length and to compensate for the image shift with zooming. When zooming from the wide-angle end to the telephoto end, the compensator C moves toward the object side monotonously, while its magnification varies past −1x on the way. SP (R31) stands for a stop. A relay lens unit of R32 to R45 has the image forming function. R46 and R47 define a glass block equivalent to a color separation prism.

In this numerical example 9, to assure a great increase of the zoom ratio, the variator V has an effect of varying 5.31 times the magnification as zooming throughout and, at the same time, the compensator C also contributes to 3.45 times variation of the magnification.

Also for the aperture ratio to increase, the F-number $F_{NO.1}$ of the front lens unit is used as an indicator when $F_{NO.1}= f1/(ft/F_{NO.t})$ is defined. This numerical example then gives $F_{NO.1}=1.62$. With the F-number of the front lens unit when sustained at this value over the entire zooming range, as the F-number $F_{NO.3}$ of the compensator C is defined by $F_{NO.3}= f3/(2\times h3m)$, a large aperture ratio of $F_{NO.3}=1.03$ results.

For these large values of the aperture ratio, the front lens unit takes measure for correcting spherical aberration in the wide-angle end. So, the front lens unit is divided into two parts, of which the front focusing lens unit F1 is of negative refractive power and the rear focusing lens unit F2 is of positive refractive power. These lens units each are constructed with a plurality of lens elements, so that spherical aberration is corrected by the technique of sharing. Furthermore, these lens units each include a cemented lens surface to permit use of the technique of diverging spherical aberration. In such a manner, spherical aberration is suppressed from increasing in the front lens unit.

In general, the compensator C and the variator V are preferably as simple in the construction and arrangement of the constituent lenses and as short in the axial thickness of the block as possible, from the point of view of minimizing the bulk and size of the entire system of the zoom lens and of saving consumption of electric energy by the drive system. For this reason, it is desired that the compensator has as small a number of lens elements as possible.

The F-number $F_{NO.3}$ of the compensator C has, on the other hand, to be very fast as described before. It is, therefore, difficult to correct aberrations of higher order by the compensator C. Particularly in the zooming positions around the F-drop, spherical aberration tends to vary to large extent.

So, in the numerical example 9, the compensator C is constructed with a first lens of positive power having a convex surface facing the image side, followed by a doublet whose cemented surface is concave toward the object side and then by a positive lens having a convex surface facing the object side. The production of spherical aberration is thus suppressed. In addition, the cemented surface forms a refractive index difference $\Delta n$ between the media on the front and rear sides thereof. Given Δn=0.17, its effect as the diverging surface for spherical aberration is heightened.

The aspheric sphere is applied to the surface R29 and the condition (8) has its factor getting h3m/h3T=1.25. The aspheric surface is so oriented that the positive refractive power gets progressively stronger as the height of incidence of the axial beam increases. To avoid steep changes in the shape of the aspheric surface and correct spherical aberration with good efficiency in lower to higher terms, the aspheric coefficients C and D only are in use, so that chief aberration correction is made on spherical aberration. Such an aspheric surface deviates 6.2 μm at 1.0 of the effective diameter.

The numerical example 10 of FIG. 23 has a zoom ratio of 17. Compared with the numerical example 9, the lowered amount of the F-number, or the F-drop, is made small, permitting the compensator to reduce the area through which the axial light beam passes only in the neighborhood of the start point of the F drop. In other words, the value of h3m/h3T is made small, and the degree of freedom on the design of the front lens unit is reduced. Nonetheless, a small aspheric amount suffices for suppressing variation of spherical aberration throughout the zooming range.

A focusing lens unit comprises a front part F1 of R1 to R6 for focusing having a negative refractive power, and a rear part F2 of R7 to R15 having a positive refractive power and stationary during focusing and zooming. The focusing lens unit of R1 to R15 functions as a front lens unit and has a weak positive refractive power.

A variator V of R16 to R22 has a main contribution to variation of the focal length and, when zooming from the wide-angle end to the telephoto end, moves toward the image side monotonously, while its magnification varies past $-1x$ (unity magnification) on the way. A compensator C of R23 to R29 functions mainly to share the variation of the focal length and to compensate for the image shift and has a positive refractive power. When zooming from the wide-angle end to the telephoto end, it moves toward the object side monotonously, while its magnification varies past $-1x$ on the way. SP (R30) stands for a stop. A relay lens unit R of R31 to R44 has the image forming function. R45 and R46 define a glass block equivalent to a color separation prism.

In the numerical example 10, to assure a great increase of the zoom ratio, the variator V has an effect of varying 4.99 times the magnification and the compensator C, too, contributes to 3.41 times the variation of magnification.

Again, the front lens unit F has an F-number of $F_{NO.1}$=1.55 and the compensator C has an F-number of $F_{NO.3}$=0.99. The aperture ratio is found larger.

The compensator C in the numerical example 10, similarly to that in the numerical example 9, comprises a first lens of positive refractive power having a convex surface facing the image side, a doublet whose cemented surface is concave toward the object side, and a positive lens having a convex surface facing the object side. By this, production of spherical aberration is suppressed. Also, the refractive index difference between the media on the front and rear sides of the cemented surface is Δn=0.17. By this, spherical aberration is well corrected.

In this case, to apply an aspheric surface to the compensator C, the surface R25 is selected, so that h3m/h3T=1.19 is obtained. The aspheric surface is so oriented that the positive refractive power gets progressively stronger as the height of incidence of the axial light beam increases. To produce a larger effect by a smaller aspheric amount, the refracting power of the surface to which the aspheric sphere is applied is made higher than in the numerical example 9.

Also, because the ratio of h3m/h3T is smaller, the control of spherical aberration at or near the start point of the F drop is made in view of expanding the degree of freedom on the design of the aspheric surface and improving the efficiency of the aspheric surface. Of the aspheric coefficients in the before-described equation for the aspheric surface, not only C and D, but also up to E is used to correct it well in up to as higher a term as $h^{10}$. In this case the aspheric deviation amounts to about 2 μm at 1.0 of the height of the surface R25.

In the numerical example 11 of FIG. 24, the zoom lens has so much high a range as the zoom ratio is 44, while nevertheless being as fast as the F-number of $F_{NO.T}$=3.0 in the telephoto end. A front lens unit (focusing lens unit F) of R1 to R8 moves to effect focusing, but remains stationary during zooming. To reduce secondary spectrum, the front lens unit F includes two or more convex lenses of which, in particular, the Abbe numbers νd exceed 80. Some of them even exceed 95. The front lens unit F as a whole has a weak positive refractive power.

A variator V of R9 to R15 has main contribution to variation of the focal length and, when zooming from the wide-angle end to the telephoto end, moves toward the image side monotonously, while its magnification varies past $-1x$ (unity magnification) on the way. A compensator C of R16 to R25 functions mainly to share the variation of the focal length and to compensate for the image shift and has a positive refractive power. When zooming from the wide-angle end to the telephoto end, it moves toward the object side monotonously, while its magnification varies past $-1x$ on the way. SP (R26) stands for a stop. A relay lens unit of R27 to R42 has the image forming function. R43 and R44 define a glass block equivalent to a color separation prism.

In the numerical example 11, to assure a great increase of the aperture ratio, the variator V has an effect of varying 9.20 times the focal length and, at the same time, the compensator C, too, contributes to 4.78 times variation of the focal length.

Also, in the numerical example 11, the front lens unit F has an F-number of $F_{NO.1}$=1.28 and the compensator C has an F-number of $F_{NO.3}$=0.83, being very fast.

To reduce the variation of spherical aberration, a solution is searched with a point laid on the compensator C, since it has a fast speed of $F_{NO.3}$=0.83.

A first lens in the compensator C is made positive with its convex surface facing the image side. It is followed by a first doublet whose cemented surface is concave toward the image side, then by a second doublet whose cemented surface is concave toward the object side, and then by a positive lens having a convex surface facing the object side. That is, the compensator is constructed in the symmetric form in itself. In addition, the degree of freedom of design is increased. With the help of these, production of spherical aberration is suppressed.

Then, the second cemented surface is made up with the refractive index difference Δn between the media on the front and rear sides thereof being increased to Δn=0.23. Its effect as the diverging surface for spherical aberration is thus increased. To achieve achromatism within the compensator, the second doublet lens may only be used by largely differentiating the Abbe numbers νd of its constituent lenses from each other. But, the use of the second doublet lens alone would result in a tight curvature of its cemented surface, which in turn gives adverse influence even to spherical aberration. Therefore, the first doublet lens also is made to share the achromatism of the compensator C. Thus, aberrations are reduced in good balance in the compensator C.

In the numerical example 11, the aspheric sphere is applied to the surface R24. Since, in this example, h3m/h3T=1.5, because the area through which the axial light beam passes only when around the start point of F drop, is wider than in the other numerical examples, it becomes easy to bring out the effect of the aspheric surface. For this reason, the aspheric sphere for the surface R24 in a very simple form becomes able to correct aberrations. By virtue of this, of the aspheric coefficients in the equation for the aspheric surface, only D is in use. With such a very low degree of freedom, various aberrations are controlled. In this case, the aspheric amount is about 27 μm at 1.0 of the effective diameter of the surface R24.

Figure 31:
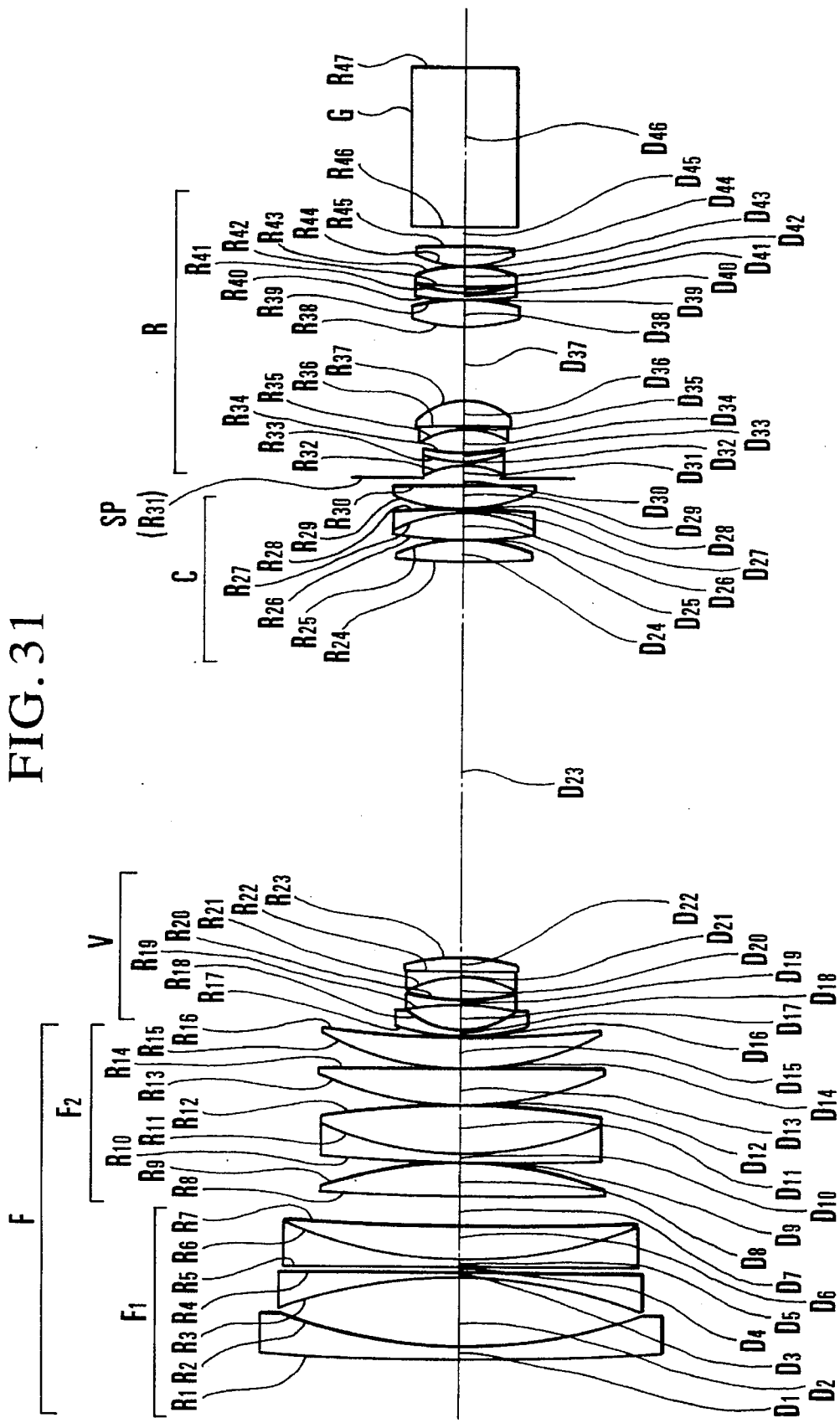
FIG. 31 is a lens block diagram of a numerical example 12 of the invention.
Figures 1, 32A:
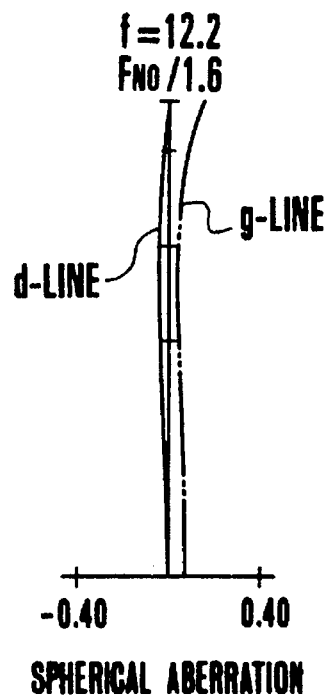
FIGS. 32(A) to 32(E) are aberration curves of the numerical example 12.
Figures 2, 32A:
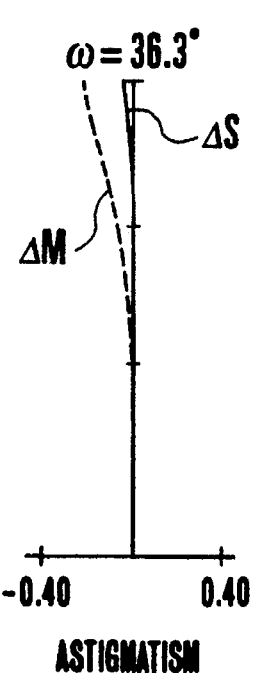
Figures 3, 32A:
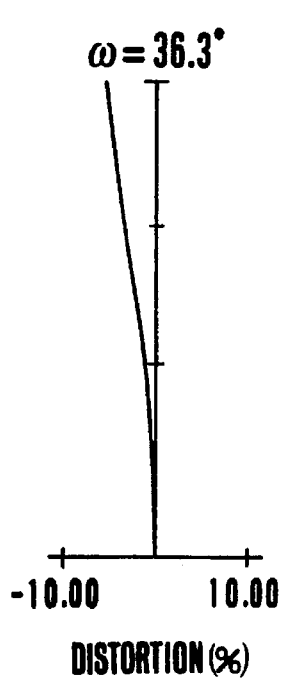
Figures 1, 32B:
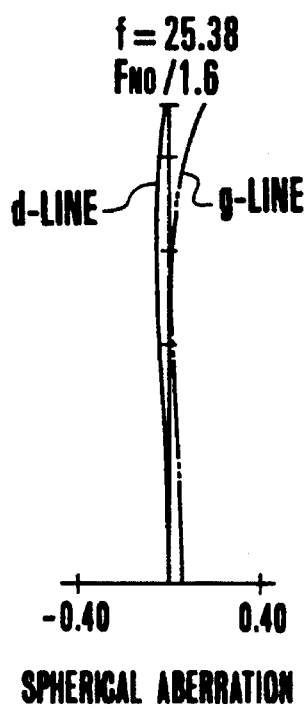
Figures 2, 32B:
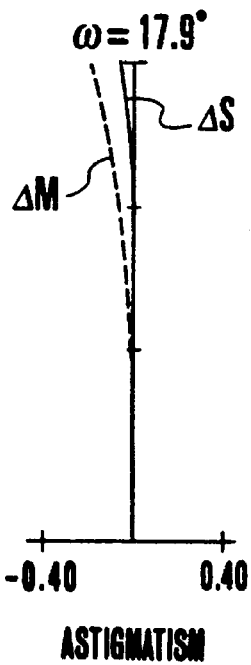
Figures 3, 32B:
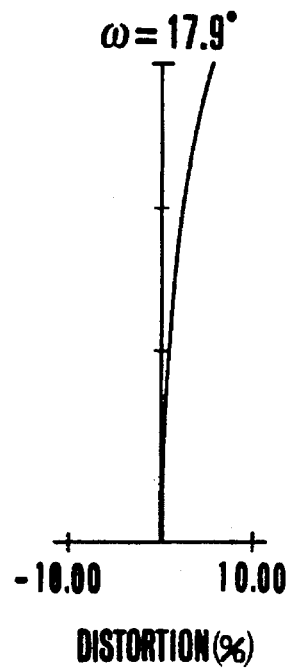
Figures 1, 32C:
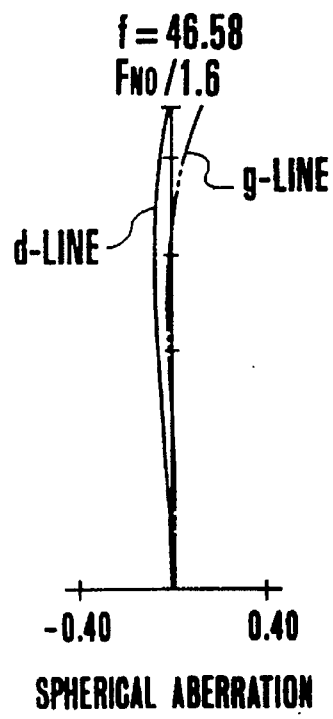
Figures 2, 32C:
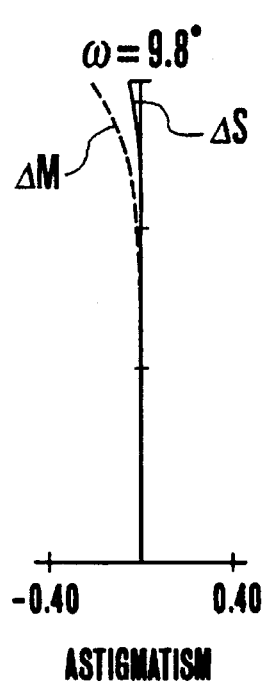
Figures 3, 32C:
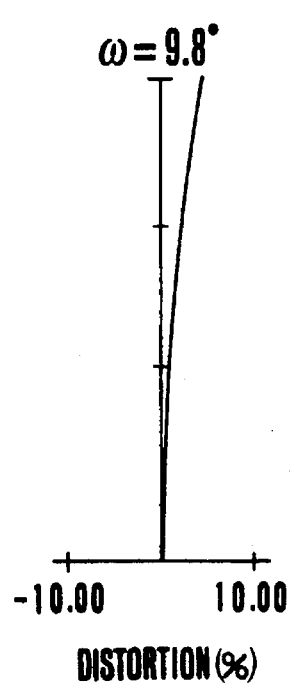
Figures 1, 32D:
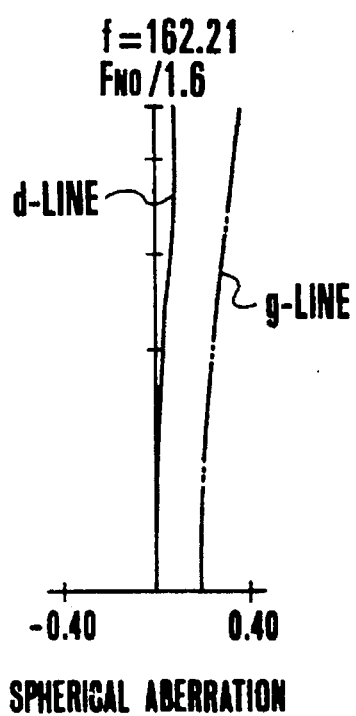
Figures 2, 32D:
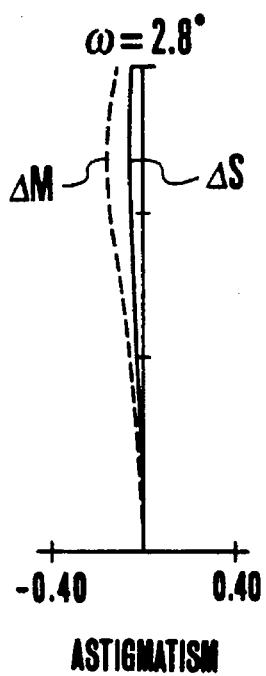
Figures 3, 32D:
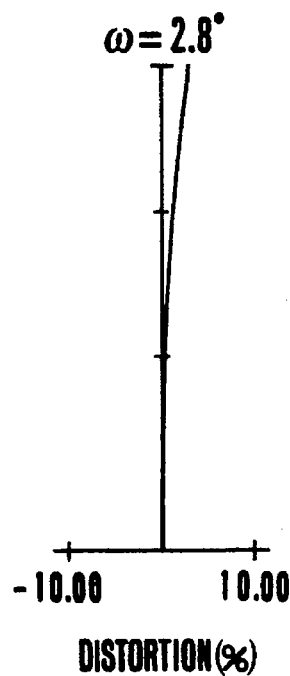
Figures 1, 32E:
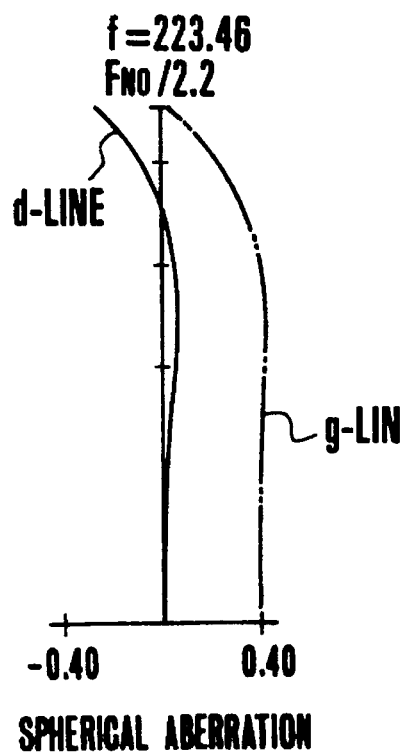
Figures 2, 32E:
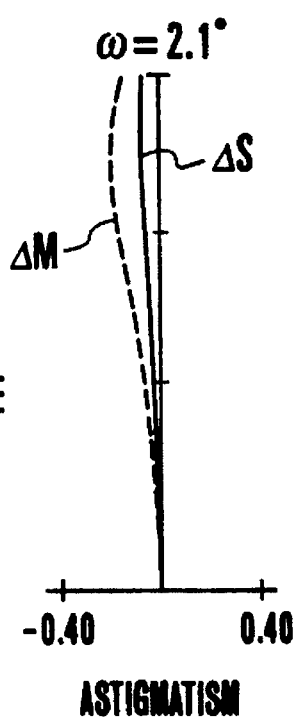
Figures 3, 32E:
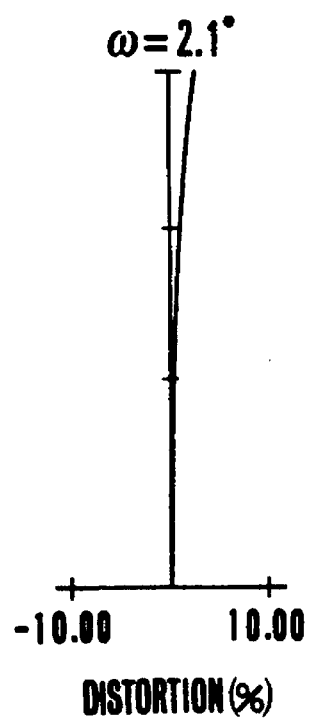

FIG. 31 is a block diagram of a numerical example 12 of a zoom lens of the invention in the wide-angle end.

In FIG. 31, a first or focusing lens unit F (front lens unit) of positive refractive power is comprised of a front focusing lens unit F1 of negative refractive power and a rear focusing lens unit F2 of positive refractive power. As the object distance varies, focusing is performed by moving the front focusing lens unit F1 on an optical axis.

A second lens unit for varying the focal length, or variator V, of negative refractive power moves axially toward the image side monotonously to effect zooming from the wide-angle end to the telephoto end. A compensator C of positive refractive power moves axially toward the object side non-linearly to compensate for the image shift with zooming. The variator V and the compensator C constitute a zooming system H. The variator V and the compensator C are used under the condition that when zooming, the magnification varies in a range including −1x (unity magnification). SP (R31) stands for a stop, and R stands for a relay lens unit of positive refractive power. G denotes a color separation prism or an optical filter, though, in FIG. 31, shown as a glass block.

In the numerical example 12, as in application to such a form of zoom lens, or the so-called 4-unit one, an aspheric sphere of certain figuring is employed in at least one of lens surfaces in the entire system of the zoom lens which satisfies the condition (9) described before. This enables a great increase of the aperture ratio and a great increase to be achieved in such a manner that astigmatism, field curvature and spherical aberration are well corrected for high optical performance throughout the entire zooming range.

In the numerical example 12, on consideration of the ratio of the incident heights hW and hM falling in the range given by the condition (9), the aspheric sphere is applied to the 17th lens surface R17. Astigmatism is then under-corrected in the wide-angle end (for a focal length of 12.2). Thus, the range of variation of astigmatism with zooming in a region between the focal lengths fw and fM is reduced. By the following stage or relay lens system, all aberrations are then corrected in good balance throughout the entire zooming range.

In general, the zoom lens has its image quality in the marginal zone of the full aperture depending largely on variation of, for example, astigmatism and spherical aberration with zooming.

Figure 33A:
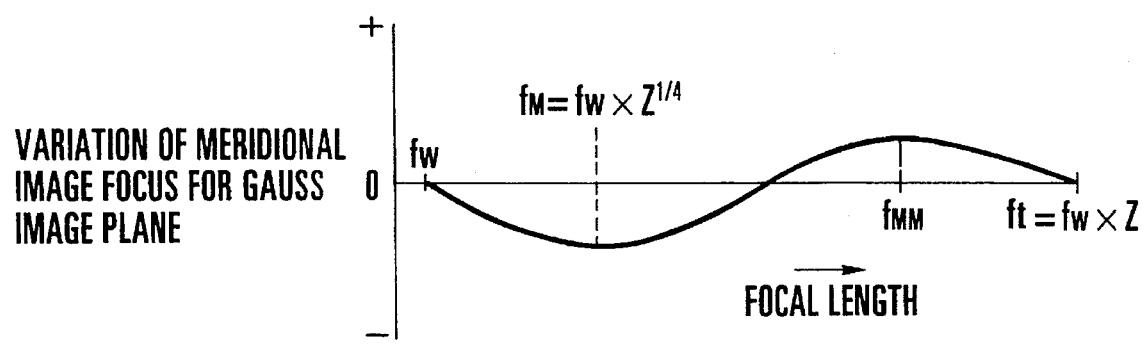
FIGS. 33(A) and 33(B) are diagram used to explain the variation of off-axial aberration of the conventional zoom lens with zooming.
Figure 33B:
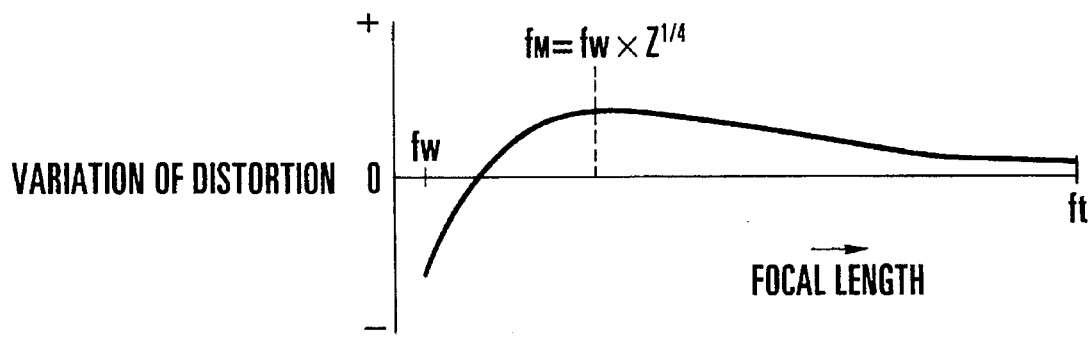

FIGS. 33(A) and 33(B) are diagrams used to explain the typical variations with zooming of astigmatism and distortion of the so-called 4-unit zoom lens by taking the zooming position in the abscissa.

Now suppose the zoom ratio is Z and the focal length for the wide-angle end is fw. In this case, the astigmatism (meridional image focus) is, as shown in FIG. 33(A), under-corrected with respect to the Gauss image plane in a region of from the wide-angle end to a zooming position for a focal length $fM=fw \times Z^{1/4}$.

As zooming then goes from the zooming position of the focal length fM toward the telephoto end, the under amount decreases and, at a certain zooming position, changes to the reverse, or over-correction results. As the F-number of the entire system varies, the lens system then starts to be darker in a zooming position (for a focal length fMM). Around this position, the over-correction reaches the maximum. After that, when further zooming toward the telephoto end, the over amount decreases, reaching almost zero in the telephoto end (for a focal length ft).

Since the image quality of the marginal zone of the full aperture depends on astigmatism (field characteristic) and the best image focus of the central zone depends on spherical aberration, it becomes important from the standpoint of sustaining good optical performance to harmonize the variations of astigmatism and spherical aberration throughout the entire zooming range. If such variations are not made harmonious, the good optical performance cannot be obtained also over the entire area of the image frame.

Usually, it is difficult to bring astigmatism and spherical aberration into harmony at any station in the entire zooming range.

Meanwhile, as shown in FIG. 33(B), the distortion has a considerably large negative value in the wide-angle end (for the focal length fw). As zooming goes from the wide-angle end (fw) to the telephoto end (ft), the distortion increases in the plus direction. The zooming then passes through a position where the distortion is zero to a position for the focal length fM where the distortion takes the largest value of plus sign. When further zooming from the focal length fM to the telephoto end (ft), the distortion gradually decreases.

Hence, the invention sets forth the condition (9) for selection of at least one of the lens surfaces to which an aspheric sphere of certain form is to apply. When this condition is satisfied, the range of variation of astigmatism and distortion with zooming in a region of from the focal length fw in the wide-angle end to the focal length fM is reduced to a minimum.

Figure 34A:
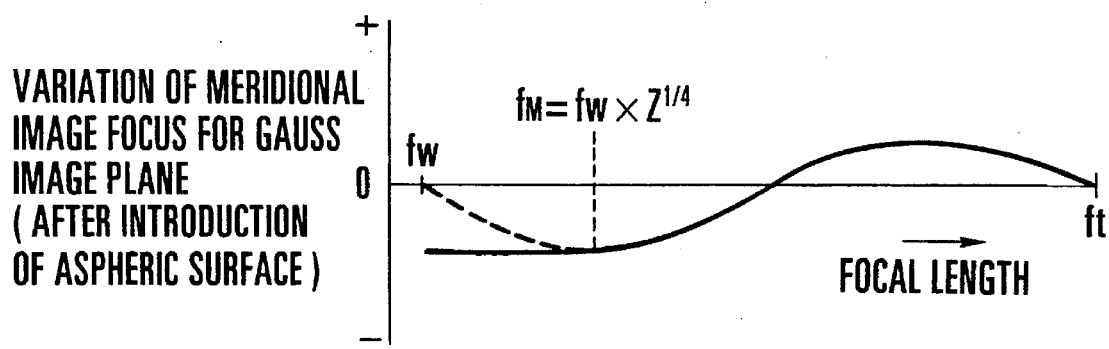
FIGS. 34(A) and 34(B) are diagram used to explain the variation of off-axial aberration of the zoom lens of the invention.

A solid line curve of FIG. 34(A) reveals that the use of such an aspheric surface improves, among others, astigmatism (meridional image focus) for the wide-angle end.

Figure 34B:
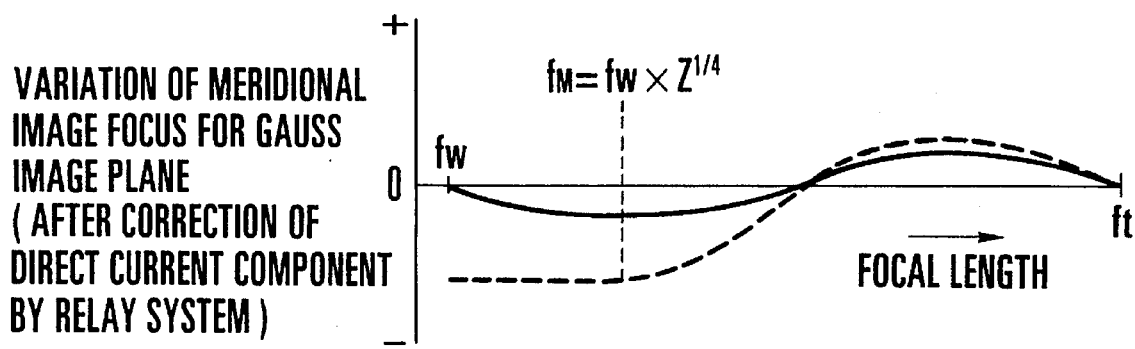

The condition (9) is concerned with the focusing and zooming systems of the zoom lens. As these systems include some lenses whose individual effective diameters are determined depending on part of the entire zooming range, the condition (9), when to introduce an aspheric surface, specifies the one of these lenses which can effect maximum possible improved results of suppressing the variation of aberrations due to the focusing and zooming systems. After the these systems have been corrected for astigmatism in the wide-angle end by the aspheric surface, the resultant balance of aberrations in the wide-angle end is then brought back to a desired one by a suited design of the relay system. In such a manner, good stability of astigmatism correction is maintained throughout the entire zooming range as shown by a solid line curve in FIG. 34(B).

Meanwhile, in the 4-unit zoom lens, as the focal length varies from the shortest to the longest, the height of incidence of the axial light beam gradually increases. Concerning the spherical aberration in the telephoto end, it is not always certain that the orientation of the shape of the aspheric surface as determined to correct astigmatism in the wide-angle end coincides with that which improves spherical aberration in the telephoto end.

So, in the present embodiment, selection of the lens surface to which the aspheric sphere is to apply is limited by the condition in terms of hW/hT.

In a case where the tendencies of the aspheric surface to improve astigmatism and spherical aberration match each other, however, due to the property of the aspheric surface, it becomes possible to control the axial light rays near to the optical axis and the off-axial light rays, when lower aspheric terms are taken into consideration.

If so, the aspheric surface is formed such that in a zone where the on-axial incident height and the off-axial incident height are lower than the value hT, the spherical aberration in the telephoto end is corrected, while in the other zone where these heights are higher than the value hT, the astigmatism in the wide-angle end is corrected.

It will be appreciated from the above description that in the present embodiment, the variation of aberrations produced within the focusing and zooming systems is well corrected not only in themselves but also by using the relay system. Thus, good stability of optical performance is obtained throughout the entire zooming range.

Next, the numerical data for the examples 9 to 12 of the invention are shown in the following tables for the radius of curvature Ri of the i-th lens surface, when counted from the object side, the i-th axial lens thickness or air separation Di and the refractive index Ni and Abbe number vi of the glass of the i-th lens element, respectively.

The shape of the aspheric surface is expressed in the coordinates with an X axis in an axial direction and an H axis in the direction perpendicular to an optical axis, the direction in which light advances being taken as positive, by the following equation:

$$X = (1/R)H^2 / (1 + \sqrt{1 - (H/R)^2}) + AH^2 + BH^4 + CH^6 + DH^8 + EH^{10}$$

where R is the radius of the osculating sphere, and A, B, C, D and E are the aspheric coefficients.

Numerical Example 9 f = 12.2–223.46  Fno = 1:1.6–2.2  2ω = 66.5°–4.2°

| | | | |
|---|---|---|---|
| R1 = 2455.41 | D1 = 5.40 | N1 = 1.69979 | v1 = 55.5 |
| R2 = 271.91 | D2 = 28.94 | | |
| R3 = −267.58 | D3 = 3.00 | N2 = 1.69979 | v2 = 55.5 |
| R4 = −2503.19 | D4 = 1.98 | | |
| R5 = 9738.25 | D5 = 3.00 | N3 = 1.64254 | v3 = 60.1 |
| R6 = 224.83 | D6 = 14.59 | N4 = 1.76168 | v4 = 27.5 |
| R7 = 1879.70 | D7 = 1.84 | | |
| R8 = 1282.45 | D8 = 13.52 | N5 = 1.62286 | v5 = 60.3 |
| R9 = −242.57 | D9 = 0.30 | | |
| R10 = 1074.61 | D10 = 4.50 | N6 = 1.81265 | v6 = 25.4 |
| R11 = 150.07 | D11 = 20.80 | N7 = 1.48915 | v7 = 70.2 |
| R12 = −401.90 | D12 = 0.30 | | |
| R13 = 160.26 | D13 = 16.10 | N7 = 1.48915 | v8 = 70.2 |
| R14 = 45982.91 | D14 = 0.30 | | |
| R15 = 148.13 | D15 = 12.92 | N9 = 1.62286 | v9 = 60.3 |
| R16 = 512.54 | D16 = Variable | | |
| R17 = 95.44 | D17 = 2.40 | N10 = 1.77621 | v10 = 49.6 |
| R18 = 42.25 | D18 = 9.16 | | |
| R19 = −1689.53 | D19 = 2.20 | N11 = 1.77621 | v11 = 49.6 |
| R20 = 84.69 | D20 = 11.71 | | |
| R21 = −46.36 | D21 = 2.20 | N12 = 1.77621 | v12 = 49.6 |
| R22 = 779.13 | D22 = 5.58 | N13 = 1.93306 | v13 = 21.3 |
| R23 = −92.60 | D23 = Variable | | |
| R24 = 1110.01 | D24 = 8.90 | N14 = 1.48915 | v14 = 70.2 |
| R25 = −82.86 | D25 = 0.30 | | |
| R26 = 325.37 | D26 = 12.18 | N15 = 1.64254 | v15 = 60.1 |
| R27 = −71.86 | D27 = 2.40 | N16 = 1.81265 | v16 = 25.4 |
| R28 = −222.32 | D28 = 0.30 | | |
| R29 = 84.97 | D29 = 9.95 | N17 = 1.48915 | v17 = 70.2 |
| (Aspheric Surface) | | | |
| R30 = −1089.44 | D30 = Variable | | |
| R31 = (Stop) | D31 = 5.46 | | |
| R32 = −50.46 | D32 = 1.40 | N18 = 1.65425 | v18 = 58.5 |
| R33 = 40.07 | D33 = 5.03 | N19 = 1.70443 | v19 = 30.1 |
| R34 = 68.80 | D34 = 9.57 | | |
| R35 = −39.21 | D35 = 1.50 | N20 = 1.64254 | v20 = 60.1 |
| R36 = −900.35 | D36 = 9.72 | N21 = 1.69417 | v21 = 31.1 |
| R37 = −37.65 | D37 = 34.00 | | |
| R38 = 70.67 | D38 = 12.47 | N22 = 1.48915 | v22 = 70.2 |
| R39 = −90.22 | D39 = 0.20 | | |
| R40 = −501.75 | D40 = 2.00 | N23 = 1.81265 | v23 = 25.4 |
| R41 = 57.28 | D41 = 2.70 | | |
| R42 = 110.58 | D42 = 8.02 | N24 = 1.48915 | v24 = 70.2 |
| R43 = −75.94 | D43 = 1.10 | | |
| R44 = 54.30 | D44 = 9.15 | N25 = 1.48915 | v25 = 70.2 |
| R45 = 1174.57 | D45 = 8.30 | | |
| R46 = ∞ | D46 = 69.20 | N26 = 1.51825 | v26 = 64.1 |
| R47 = ∞ | | | |

| Variable Separation | Focal Length | | | | |
|---|---|---|---|---|---|
| | 12.20 | 25.38 | 46.58 | 162.21 | 223.46 |
| D16 | 1.69 | 47.69 | 74.09 | 108.72 | 113.29 |
| D23 | 171.63 | 116.40 | 79.82 | 17.81 | 1.12 |
| D30 | 2.00 | 11.24 | 21.41 | 48.80 | 60.92 |

Shape of Asheric Surface

| Osculating Sphere: R = 84.973 | Parameter |
|---|---|
| Aspheric Coefficients | Zv = 5.31 |
| A = B = E = 0 | $F_{NO.1}$ = 1.62 |
| C = 8.0 × 10$^{-12}$ | $F_{NO.3}$ = 1.07 |
| D = −7.88 × 10$^{-16}$ | h3m/h3T = 1.25 |
| | Δn = 0.170 |

| Aspheric Amount | h | ΔX |
|---|---|---|
| 0.7 | (21.56) | 0.77 μm |
| 0.9 | (27.72) | 3.35 μm |
| 1.0 | (30.80) | 6.19 μm |

Numerical Example 10 f = 12.5–212.5  Fno = 1:1.6–2.0  2ω = 65.2°–2.2°

| | | | |
|---|---|---|---|
| R1 = 671.00 | D1 = 5.40 | N1 = 1.69979 | v1 = 55.5 |
| R2 = 231.23 | D2 = 29.79 | | |
| R3 = −209.21 | D3 = 5.009 | N2 = 1.64254 | v2 = 60.1 |
| R4 = 217.15 | D4 = 0.26 | | |
| R5 = 215.45 | D5 = 14.51 | N3 = 1.76168 | v3 = 27.5 |
| R6 = 1673.80 | D6 = 1.84 | | |
| R7 = 722.69 | D7 = 14.642 | N4 = 1.62287 | v4 = 60.3 |
| R8 = −239.18 | D8 = 0.30 | | |
| R9 = 2027.35 | D9 = 4.50 | N5 = 1.81265 | v5 = 25.4 |
| R10 = 152.60 | D10 = 20.85 | N6 = 1.48915 | v6 = 70.2 |
| R11 = −370.46 | D11 = 0.30 | | |
| R12 = 205.51 | D12 = 14.77 | N7 = 1.48915 | v7 = 70.2 |
| R13 = −1091.03 | D13 = 0.30 | | |
| R14 = 140.50 | D14 = 14.37 | N8 = 1.62287 | v8 = 60.3 |
| R15 = 648.10 | D15 = Variable | | |
| R16 = 88.91 | D16 = 2.40 | N9 = 1.77621 | v9 = 49.6 |
| R17 = 41.36 | D17 = 8.20 | | |
| R18 = −1709.46 | D18 = 2.20 | N10 = 1.77621 | v10 = 49.6 |
| R19 = 82.40 | D19 = 12.42 | | |
| R20 = −48.13 | D20 = 2.20 | N11 = 1.77621 | v11 = 49.6 |
| R21 = 447.27 | D21 = 6.43 | N12 = 1.93306 | v12 = 21.3 |
| R22 = −100.96 | D22 = Variable | | |
| R23 = −3606.86 | D23 = 8.89 | N13 = 1.48915 | v13 = 70.2 |
| R24 = −82.70 | D24 = 0.30 | | |
| R25 = 254.65 | D25 = 12.52 | N14 = 1.64254 | v14 = 60.1 |
| (Aspheric Surface) | | | |
| R26 = −74.51 | D26 = 2.40 | N15 = 1.81265 | v15 = 25.4 |
| R27 = −246.12 | D27 = 0.30 | | |
| R28 = 84.85 | D28 = 10.17 | N16 = 1.48915 | v16 = 70.2 |
| R29 = −664.23 | D29 = Variable | | |
| R30 = (Stop) | D30 = 5.46 | | |
| R31 = −51.38 | D31 = 1.40 | N17 = 1.65425 | v17 = 58.5 |
| R32 = 37.53 | D32 = 4.98 | N18 = 1.70443 | v18 = 30.1 |
| R33 = 69.05 | D33 = 9.57 | | |
| R34 = −42.16 | D34 = 1.50 | N19 = 1.64254 | v19 = 60.1 |
| R35 = −1192.59 | D35 = 8.28 | N20 = 1.69417 | v20 = 30.1 |

-continued

| | | | |
|---|---|---|---|
| R36 = −38.86 | D36 = 33.68 | | |
| R37 = 170.41 | D37 = 12.03 | N21 = 1.48915 | ν21 = 70.2 |
| R38 = −42.17 | D38 = 2.20 | N22 = 1.76168 | ν22 = 27.5 |
| R39 = −54.88 | D39 = 0.20 | | |
| R40 = 322.72 | D40 = 1.90 | N23 = 1.76168 | ν23 = 27.5 |
| R41 = 40.32 | D41 = 11.53 | N24 = 1.51356 | ν24 = 51.0 |
| R42 = −298.39 | D42 = 1.10 | | |
| R43 = 59.05 | D43 = 5.64 | N25 = 1.48915 | ν25 = 70.2 |
| R44 = 3002.98 | D44 = 8.30 | | |
| R45 = ∞ | D45 = 69.20 | N26 = 1.51825 | ν26 = 64.2 |
| R46 = ∞ | | | |

| Variable | Focal Length | | | | |
|---|---|---|---|---|---|
| Separation | 12.50 | 22.00 | 45.30 | 170.00 | 212.50 |
| D15 | 3.56 | 40.61 | 74.13 | 109.36 | 113.13 |
| D22 | 171.13 | 127.29 | 82.45 | 15.12 | 3.99 |
| D29 | 2.25 | 9.05 | 20.37 | 52.47 | 59.82 |

Shape of Asheric Surface

Osculating Sphere: R = 254.65  Parameter
Aspheric Coefficients  Zv = 4.99
A = B = 0  Zv/Z = 0.3
C = 2.534 × 10$^{-15}$  $F_{NO.1}$ = 1.55
D = −3.133 × 10$^{-16}$  $F_{NO.3}$ = 0.99
E = 1.845 × 10$^{-18}$  h3m/h3T = 1.19
 Δn = 0.17011

| Aspheric Amount | h | ΔX |
|---|---|---|
| 0.7 | (22.61) | 0.04 μm |
| 0.9 | (29.07) | 0.65 μm |
| 1.0 | (32.30) | 1.94 μm |

Numerical Example 11 f = 10.0–440  Fno = 1:1.75–3.0  2ω = 57.6°–0.72°

| | | | |
|---|---|---|---|
| R1 = 397.20 | D1 = 5.50 | N1 = 1.72311 | ν1 = 29.5 |
| R2 = 182.95 | D2 = 0.70 | | |
| R3 = 181.76 | D3 = 23.08 | N2 = 1.43496 | ν2 = 95.1 |
| R4 = −601.22 | D4 = 0.30 | | |
| R5 = 178.22 | D5 = 18.30 | N3 = 1.43496 | ν3 = 95.1 |
| R6 = −4012.90 | D6 = 0.30 | | |
| R7 = 134.24 | D7 = 11.61 | N4 = 1.49845 | ν4 = 81.6 |
| R8 = 264.84 | D8 = Variable | | |
| R9 = 1978.17 | D9 = 2.00 | N5 = 1.82017 | ν5 = 46.6 |
| R10 = 61.00 | D10 = 4.30 | | |
| R11 = −244.81 | D11 = 1.80 | N6 = 1.77621 | ν6 = 49.6 |
| R12 = 49.97 | D12 = 7.53 | | |
| R13 = −56.56 | D13 = 1.80 | N7 = 1.82017 | ν7 = 46.6 |
| R14 = 48.78 | D14 = 7.71 | N8 = 1.93306 | ν8 = 21.3 |
| R15 = −227.11 | D15 = Variable | | |
| R16 = 1717.21 | D16 = 6.39 | N9 = 1.49845 | ν9 = 81.6 |
| R17 = −106.26 | D17 = 0.30 | | |
| R18 = 200.29 | D18 = 2.50 | N10 = 1.65223 | ν10 = 33.8 |
| R19 = 72.78 | D19 = 12.98 | N11 = 1.59143 | ν11 = 61.2 |
| R20 = −125.34 | D20 = 0.20 | | |
| R21 = 107.54 | D21 = 13.87 | N12 = 1.62032 | ν12 = 63.4 |
| R22 = −71.24 | D22 = 2.50 | N13 = 1.85501 | ν13 = 23.9 |
| R23 = −196.04 | D23 = 0.20 | | |
| R24 = 124.29 | D24 = 3.50 | N14 = 1.48915 | ν14 = 70.2 |
| (Aspheric Surface) | | | |
| R25 = 221.46 | D25 = Variable | | |
| R26 = (stop) | D26 = 3.29 | | |
| R27 = −53.23 | D27 = 1.80 | N15 = 1.79013 | ν15 = 44.2 |
| R28 = 36.14 | D28 = 4.09 | N16 = 1.81265 | ν16 = 25.4 |
| R29 = 167.11 | D29 = 5.57 | | |
| R30 = −34.30 | D30 = 1.60 | N17 = 1.73234 | ν17 = 54.7 |
| R31 = 34.37 | D31 = 10.20 | N18 = 1.59911 | ν18 = 39.2 |
| R32 = −28.89 | D32 = 24.00 | | |
| R33 = −471.13 | D33 = 5.79 | N19 = 1.48915 | ν19 = 70.2 |
| R34 = −32.79 | D34 = 0.20 | | |
| R35 = −53.92 | D35 = 2.20 | N20 = 1.79013 | ν20 = 44.2 |
| R36 = 36.97 | D36 = 7.40 | N21 = 1.50349 | ν21 = 56.4 |
| R37 = −66.22 | D37 = 1.10 | | |
| R38 = 181.90 | D38 = 6.62 | N22 = 1.55099 | ν22 = 45.8 |
| R39 = −30.85 | D39 = 2.20 | N23 = 1.81265 | ν23 = 25.4 |

-continued

| | | | |
|---|---|---|---|
| R40 = −85.03 | D40 = 0.20 | | |
| R41 = 73.62 | D41 = 5.14 | N24 = 1.51977 | ν24 = 52.4 |
| R42 = −67.93 | D42 = 5.00 | | |
| R43 = ∞ | D43 = 50.00 | N25 = 1.51825 | ν25 = 64.2 |
| R44 = ∞ | | | |

| Variable | Focal Length | | | | |
|---|---|---|---|---|---|
| Separation | 10.00 | 19.49 | 69.78 | 256.60 | 440.00 |
| D8 | 4.53 | 46.53 | 94.53 | 118.03 | 123.53 |
| D15 | 178.14 | 131.08 | 68.95 | 21.77 | 2.18 |
| D25 | 3.30 | 8.36 | 22.49 | 46.17 | 60.26 |

Shape of Asheric Surface

Osculating Sphere: R = 124.297  Parameter
Aspheric Coefficients  Zv = 9.19
A = B = C = E = 0  Zv/Z = 0.209
D = 5.997 × 10$^{-14}$  $F_{NO.1}$ = 1.28
 $F_{NO.3}$ = 0.83
 h3m/h3T = 1.5
 Δn = 0.228

| Aspheric Amount | h | ΔX |
|---|---|---|
| 0.7 | (20.03) | 1.55 μm |
| 0.9 | (25.75) | 11.6 μm |
| 1.0 | (28.61) | 29.6 μm |

Numerical Example 12 f = 12.2–223.46  Fno = 1:1.6–7.2  2ω = 66.5°–4.2°

| | | | |
|---|---|---|---|
| R1 = 2455.41 | D1 = 5.40 | N1 = 1.69979 | ν1 = 55.5 |
| R2 = 271.91 | D2 = 28.94 | | |
| R3 = −267.58 | D3 = 3.009 | N2 = 1.69979 | ν2 = 55.5 |
| R4 = −2503.19 | D4 = 1.98 | | |
| R5 = 9738.25 | D5 = 3.00 | N3 = 1.64254 | ν3 = 60.1 |
| R6 = 224.83 | D6 = 14.59 | N4 = 1.76168 | ν4 = 27.5 |
| R7 = 1879.70 | D7 = 1.84 | | |
| R8 = 1282.45 | D8 = 13.52 | N5 = 1.62286 | ν5 = 60.3 |
| R9 = −242.57 | D9 = 0.30 | | |
| R10 = 1074.61 | D10 = 4.50 | N6 = 1.81265 | ν6 = 25.4 |
| R11 = 150.07 | D11 = 20.80 | N7 = 1.48915 | ν7 = 70.2 |
| R12 = −401.90 | D12 = 0.30 | | |
| R13 = 160.26 | D13 = 16.10 | N8 = 1.48915 | ν8 = 70.2 |
| R14 = 45982.91 | D14 = 0.30 | | |
| R15 = 148.13 | D15 = 12.92 | N9 = 1.62286 | ν9 = 60.3 |
| R16 = 512.54 | D16 = Variable | | |
| R17 = 95.44 | D17 = 2.40 | N10 = 1.77621 | ν10 = 49.6 |
| (Aspheric Surface) | | | |
| R18 = 42.25 | D18 = 9.16 | | |
| R19 = −1689.53 | D19 = 2.20 | N11 = 1.77621 | ν11 = 49.6 |
| R20 = 84.69 | D20 = 11.71 | | |
| R21 = −46.36 | D21 = 2.20 | N12 = 1.77621 | ν12 = 49.6 |
| R22 = 779.13 | D22 = 5.58 | N13 = 1.93306 | ν13 = 21.3 |
| R23 = −92.60 | D23 = Variable | | |
| R24 = 1110.01 | D24 = 8.90 | N14 = 1.48915 | ν14 = 70.2 |
| R25 = −82.86 | D25 = 0.30 | | |
| R26 = 325.37 | D26 = 12.18 | N15 = 1.64254 | ν15 = 60.1 |
| R27 = −71.86 | D27 = 2.40 | N16 = 1.81265 | ν16 = 25.4 |
| R28 = −222.32 | D28 = 0.30 | | |
| R29 = 84.97 | D29 = 9.95 | N17 = 1.48915 | ν17 = 70.2 |
| R30 = −1089.44 | D30 = Variable | | |
| R31 = (Stop) | D31 = 5.46 | | |
| R32 = −50.20 | D32 = 1.40 | N18 = 1.65425 | ν18 = 58.5 |
| R33 = 40.78 | D33 = 4.55 | N19 = 1.70443 | ν19 = 30.1 |
| R34 = 70.60 | D34 = 9.57 | | |
| R35 = −39.52 | D35 = 1.50 | N20 = 1.64254 | ν20 = 60.1 |
| R36 = −1029.62 | D36 = 9.38 | N21 = 1.69417 | ν21 = 31.1 |
| R37 = −37.67 | D37 = 34.00 | | |
| R38 = 69.80 | D38 = 12.39 | N22 = 1.48915 | ν22 = 70.2 |
| R39 = −90.33 | D39 = 0.20 | | |
| R40 = −496.87 | D40 = 2.00 | N23 = 1.81265 | ν23 = 25.4 |
| R41 = 56.71 | D41 = 2.73 | | |
| R42 = 111.78 | D42 = 7.91 | N24 = 1.48915 | ν24 = 70.2 |
| R43 = −75.35 | D43 = 1.10 | | |
| R44 = 54.78 | D44 = 8.11 | N25 = 1.48915 | ν25 = 70.2 |
| R45 = 2543.16 | D45 = 8.30 | | |

-continued

| R46 = ∞ | D46 = 69.20 | N26 = 1.51825 | ν26 = 64.1 |
|---|---|---|---|
| R47 = ∞ | | | |

| Variable | Focal Length | | | | |
|---|---|---|---|---|---|
| Separation | 12.20 | 25.38 | 46.58 | 162.21 | 223.46 |
| D16 | 1.69 | 47.69 | 74.09 | 108.72 | 113.29 |
| D23 | 171.63 | 116.40 | 79.82 | 17.81 | 1.12 |
| D30 | 2.00 | 11.24 | 21.41 | 48.80 | 60.92 |

| Aspheric Surface: R17 | Parameter |
|---|---|
| R = 95.446 | $h_W = 29.05$ |
| A = 0 | $h_M = 20.15$ |
| B = 0 | $h_T = 22.82$ |
| C = −6.22 × 10⁻¹¹ | |
| D = 1.5 × 10⁻¹³ | |
| E = −7.48 × 10⁻¹⁷ | |

According to the invention, the design rules as described above for the so-called 4-unit zoom lens are set forth to determine the ranges of variation with zooming of the magnification of the variator and compensator and the refractive powers and F-numbers of the lens units. As the oblique and axial light beams travel through the lens surfaces with variation of their heights of incidence, an additional condition is set forth for application of an aspheric sphere to at least one lens surface. When these conditions are satisfied, the variation of spherical aberration with zooming is reduced to a minimum and, further, the variations of astigmatism, field curvature, distortion and other off-axial aberrations with zooming are corrected in good balance. Hence, it is made possible to achieve realization of a zoom lens having a large relative aperture for the wide-angle end of about 1.6 in F-number and a high range of 18 to 40 or thereabout, while still maintaining high optical performance throughout the entire zooming range.

What is claimed is:

1. A zoom lens comprising, from front to rear, a first lens unit of positive refractive power stationary during zooming, a second lens unit of negative refractive power for zooming, a third lens unit of negative refractive power for compensating for the shift of an image plane with zooming and a fixed fourth lens unit of positive refractive power, said zoom lens having a characteristic that the F-number of the entire system starts to increase at an arbitrary station during zooming from a wide-angle end to a telephoto end, wherein letting the focal length and F-number of said first lens unit be denoted by f1 and $F_{NO.1}$, respectively, the lateral magnification for the wide-angle end of said second lens unit by β2w, and the focal length of said second lens unit and the height of incidence of an axial light beam on the last lens surface of said second lens unit by f2 and h2m, respectively, said second lens unit being constructed in a form having at least four lens surfaces and an aspheric surface being applied to at least one lens surface of the fourth and later lens surfaces of said second lens unit, said aspheric surface satisfying 1.09<hm/ht where hm is the maximum incident height of an axial light beam and ht is the maximum incident height of an axial light beam in the telephoto end, and letting the F-number of said second lens unit be denoted by $F_{NO.2}$, the focal length and F-number for the telephoto end of said zoom lens by ft and $F_{NO.t}$, respectively, and the zoom ratio of said zoom lens by Z, and setting $F_{NO.1}=f1/(ft/F_{NO.t})$ $F_{NO.2}=f2/(2 \times h2m)$ the following conditions are satisfied:

10<Z $1.01<F_{NO.1}<1.65$ $0.65<F_{NO.2}<1.25$

−0.40<β2w<−0.15.

2. A zoom lens according to claim 1, wherein said aspheric surface when applied to a positive refracting surface is in such form that a positive refractive power gets progressively stronger toward a marginal zone of the lens surface, or when applied to the negative refracting surface, in such form that a negative refractive power gets progressively weaker toward a marginal zone of the lens surface, and wherein letting the aspheric amounts at 1.0, 0.9 and 0.7 of an effective lens diameter of said aspheric surface be denoted by Δ10, Δ9, and Δ7, respectively, the following conditions are satisfied:

$3.7 \times 10^{-5}<|\Delta 10/f2|<7.7 \times 10^{-4}$ $1.8 \times 10^{-5}<|\Delta 9/f2|<3.8 \times 10^{-4}$ $0<|\Delta 7/f2|<1.25 \times 10^{-4}$.

3. A zoom lens comprising, from front to rear, a first lens unit of positive refractive power stationary during zooming, a second lens unit of negative refractive power for zooming, a third lens unit of negative refractive power for compensating for the shift of an image plane with zooming and a fixed fourth lens unit of positive refractive power, wherein letting the zoom ratio of said zoom lens be denoted by Z, the focal length and F-number of said first lens unit by f1 and $F_{NO.1}$, respectively, the lateral magnification for a wide-angle end of said second lens unit by β2w, and the focal length of said second lens unit and the height of incidence of an axial light beam on the last lens surface of said second lens unit by f2 and h2m, respectively, said second lens unit being constructed in a form having at least four lens surfaces and an aspheric surface being applied to at least one lens surface of the fourth and later lens surfaces in said second lens unit, said aspheric surface satisfying 1.17<ht/hz where hz is the maximum incident height of an axial light beam in a zooming position for a zoom ratio of $Z^{3/4}$ and ht is the maximum incident height of an axial light beam in a telephoto end, and letting the F-number of said second lens unit be denoted by $F_{NO.2}$, and the focal length and F-numbers in the telephoto and wide-angle ends of said zoom lens by ft, $F_{NO.t}$ and $F_{NO.w}$, respectively, and setting $F_{NO.1}=f1/(ft/F_{NO.t})$ $F_{NO.2}=f2/(2 \times h2m)$ $F_{NO.R}=F_{NO.t}/F_{NO.w}$ the following conditions are satisfied:

10<Z $F_{NO.R}<1.05$ $1.01<F_{NO.1}<1.65$ 0.65<F<1.28

$-0.40 < \beta 2w < -0.16$.

4. A zoom lens according to claim 3, wherein said aspheric surface when applied to a positive refracting surface is in such form that a positive refractive power gets progressively weaker toward a marginal zone of the lens surface, or when applied to a negative refracting surface, in such form that a negative refractive power gets progressively stronger toward a marginal zone of the lens surface, and wherein letting the aspheric amounts at 1.0, 0.9 and 0.7 of an effective lens diameter of said aspheric surface be denoted by $\Delta 10$, $\Delta 9$ and $\Delta 7$, respectively, the following conditions are satisfied:

$3.85 \times 10^{-5} < |\Delta 10/f2| < 7 \times 10^{-4}$ $1.95 \times 10^{-5} < |\Delta 9/f2| < 3.2 \times 10^{-4}$ $0 < |\Delta 7/f2| < 4.7 \times 10^{-5}$.

* * * * *

UNITED STATES PATENT AND TRADEMARK OFFICE
CERTIFICATE OF CORRECTION

PATENT NO. : 5,583,700
DATED : December 10, 1996
INVENTOR(S) : Usui, et al.

Page 1 of 7

It is certified that error appears in the above-indentified patent and that said Letters Patent is hereby corrected as shown below:

COLUMN 2

Line 42, "particularly" should read --and particularly--;

Line 54, "INVENTION:" should read --INVENTION--.

COLUMN 3

Line 15, "f16" should read --f1--;

Line 16, "$\beta$2win" should read --$\beta$2w in--.

UNITED STATES PATENT AND TRADEMARK OFFICE
CERTIFICATE OF CORRECTION

PATENT NO. : 5,583,700
DATED : December 10, 1996
INVENTOR(S) : Usui, et al.

It is certified that error appears in the above-indentified patent and that said Letters Patent is hereby corrected as shown below:

COLUMN 5

Line 31, "1.15<h3m/h3·..." should read --1.15<h3m/h3T...--;

Line 34, "the-marginal" should read --the marginal--;

Line 42, "1.0" should read --1.0,--;

Line 45, "furthermore" should read --further--.

COLUMN 6

Line 62, "diagram" should read --diagrams--;

Line 65, "diagram" should read --diagrams--.

COLUMN 8

Line 27, "made" should be deleted--.

COLUMN 9

Line 54, "in" should read --in a--.

COLUMN 12

Line 11, "V is," should read --V,--;

Line 66, "in" should be deleted.

UNITED STATES PATENT AND TRADEMARK OFFICE
CERTIFICATE OF CORRECTION

Page 3 of 7

PATENT NO. : 5,583,700
DATED : December 10, 1996
INVENTOR(S) : Usui, et al.

It is certified that error appears in the above-indentified patent and that said Letters Patent is hereby corrected as shown below:

COLUMN 14

Line 66, "in" should be deleted.

COLUMN 15

Line 65, "lens-unit" should read --lens unit--;

Line 67, "When" should read --when--.

COLUMN 16

Line 43, "$BH^4+$" should read --$BH^4+CH^6+DH^8+EH^{10}$--;

Line 45, "$CH^6+DH^8+EH^{10}$" should be deleted.

COLUMN 17

Line 30, "Asheric" should read --Aspheric--;

Line 31, "Osculating" should read --Oscillating--.

COLUMN 18

Line 21, "Asheric" should read --Aspheric--;

Line 22, "Osculating" should read --Oscillating--.

UNITED STATES PATENT AND TRADEMARK OFFICE
CERTIFICATE OF CORRECTION

PATENT NO. : 5,583,700
DATED : December 10, 1996
INVENTOR(S) : Usui, et al.

It is certified that error appears in the above-indentified patent and that said Letters Patent is hereby corrected as shown below:

COLUMN 19

Line 13, "Asheric" should read --Aspheric--;

Line 14, "Osculating" should read --Oscillating--.

COLUMN 20

Line 4, "Asheric" should read --Aspheric--;

Line 6, "Osculating" should read --Oscillating--;

Line 45, "N18=2.48915" should read --N18=1.48915--;

Line 60, "Asheric" should read --Aspheric--;

Line 62, "Osculating" should read --Oscillating--.

COLUMN 21

Line 52, "Asheric" should read --Aspheric--;

Line 54, "Osculating" should read --Oscillating--.

COLUMN 22

Line 46, "Asheric" should read --Aspheric--;

Line 47, "Osculating" should read --Oscillating--.

UNITED STATES PATENT AND TRADEMARK OFFICE
CERTIFICATE OF CORRECTION

PATENT NO. : 5,583,700
DATED : December 10, 1996
INVENTOR(S) : Usui, et al.

It is certified that error appears in the above-indentified patent and that said Letters Patent is hereby corrected as shown below:

COLUMN 23

Line 14, "R20=-24.510" should read --R20=-245.10--;

Line 38, "Asheric" should read --Aspheric--;

Line 39, "Osculating" should read --Oscillating--.

COLUMN 24

Line 42, "fast." should read --faster--.

COLUMN 26

Line 58, "to large" should read --to a large--.

COLUMN 30

Line 50, "the these" should read --these--.

COLUMN 31

Line 7, "that" should read --that,--;

Line 31, "$BH^4+$" should read --$BH^4+CH^6+DH^8+EH^{10}$--;

Line 33, "$CH^6+DH^8+EH^{10}$ should be deleted;

Line 51, "N7=1.48915" should read --N8=1.48915--.

UNITED STATES PATENT AND TRADEMARK OFFICE
CERTIFICATE OF CORRECTION

PATENT NO. : 5,583,700
DATED : December 10, 1996
INVENTOR(S) : Usui, et al.

It is certified that error appears in the above-indentified patent and that said Letters Patent is hereby corrected as shown below:

COLUMN 32

Line 22,   "Asheric" should read --Aspheric--;

Line 24,   "Osculating" should read --Oscillating--.

COLUMN 33

Line 18,   "Asheric" should read --Aspheric--;

Line 20,   "Osculating" should read --Oscillating--.

COLUMN 34

Line 14,   "Asheric" should read --Aspheric--;

Line 16,   "Osculating" should read --Oscillating--.

UNITED STATES PATENT AND TRADEMARK OFFICE
CERTIFICATE OF CORRECTION

PATENT NO. : 5,583,700
DATED : December 10, 1996
INVENTOR(S) : Usui, et al.

It is certified that error appears in the above-indentified patent and that said Letters Patent is hereby corrected as shown below:

COLUMN 36

Line 9, "$-0.40<\beta 2w<<-0.15.$" should read --$-0.40<\beta 2w<-0.15.$--;

Line 27, "$0<|\Delta 7/f2|<1.25 \times 10^{-4}.$" should read --$0<|\Delta 7/f2|<1.25 \times 10^{-4}.$--

Line 67, "$0.65<F<1.28$" should read --$0.65<F_{NO.2}<1.28$--.

Signed and Sealed this

Twenty-first Day of October 1997

BRUCE LEHMAN

Attest:

Attesting Officer

Commissioner of Patents and Trademarks